United States Patent
Kinugasa et al.

[11] Patent Number: 6,109,024
[45] Date of Patent: Aug. 29, 2000

[54] EXHAUST GAS PURIFICATION DEVICE FOR AN INTERNAL COMBUSTION ENGINE

[75] Inventors: Yukio Kinugasa, Susono; Takaaki Itou, Mishima; Koichi Takeuchi, Susono, all of Japan

[73] Assignee: Toyota Jidosha Kabushiki Kaisha, Aichi-Ken, Japan

[21] Appl. No.: 09/075,358

[22] Filed: May 8, 1998

[30] Foreign Application Priority Data

May 12, 1997 [JP] Japan ................................. 9-121170
Apr. 1, 1998 [JP] Japan ................................. 10-88985

[51] Int. Cl.[7] .................................................. F01N 3/00
[52] U.S. Cl. .............................................. 60/285; 60/286
[58] Field of Search ............................ 60/285, 286, 301, 60/303

[56] References Cited

U.S. PATENT DOCUMENTS

| | | |
|---|---|---|
| 3,767,764 | 10/1973 | Dolbear . |
| 4,395,875 | 8/1983 | Virk ....................... 60/286 X |
| 5,056,308 | 10/1991 | Kume, et al. . |
| 5,207,058 | 5/1993 | Sasaki et al. ............ 60/286 X |
| 5,313,792 | 5/1994 | Katoh et al. . |
| 5,410,873 | 5/1995 | Tashiro .................. 60/285 X |
| 5,412,946 | 5/1995 | Oshima et al. . |
| 5,419,121 | 5/1995 | Sung et al. . |
| 5,461,857 | 10/1995 | Itou et al. ................. 60/276 |
| 5,473,887 | 12/1995 | Takeshima et al. . |
| 5,479,775 | 1/1996 | Kraemer et al. ........ 60/285 X |
| 5,595,060 | 1/1997 | Togai et al. . |
| 5,657,625 | 8/1997 | Koga et al. . |
| 5,661,971 | 9/1997 | Waschatz et al. ....... 60/285 X |
| 5,740,669 | 4/1998 | Kinugasa et al. ........... 60/285 |
| 5,746,052 | 5/1998 | Kinugasa et al. ........... 60/274 |
| 5,758,493 | 6/1998 | Asik et al. . |
| 5,778,667 | 7/1998 | Kinugasa et al. ....... 60/301 X |
| 5,782,087 | 7/1998 | Kinugasa et al. ....... 60/285 X |
| 5,791,139 | 8/1998 | Atago et al. . |
| 5,802,845 | 9/1998 | Abe et al. . |
| 5,826,425 | 10/1998 | Sebastiano et al. ..... 60/285 X |

FOREIGN PATENT DOCUMENTS

| | | |
|---|---|---|
| 4-365920 | 12/1992 | Japan . |
| 5-131118 | 5/1993 | Japan . |
| 6-108827 | 4/1994 | Japan . |
| 6-330741 | 11/1994 | Japan . |
| 8-4522 | 1/1996 | Japan . |
| 9-4441 | 1/1997 | Japan . |
| WO93/07363 | 4/1993 | WIPO . |

*Primary Examiner*—John E. Ryznic
*Attorney, Agent, or Firm*—Kenyon & Kenyon

[57] ABSTRACT

In an exhaust gas purification device, a three-way catalyst, an $NO_x$ absorbing-reducing catalyst and an $NH_3$ adsorbing-denitrating catalyst are disposed in an exhaust gas passage of the internal combustion engine. The engine is provided with direct cylinder injection valves which inject fuel directly into the respective cylinders. A control circuit controls the amount of fuel injected from the injection valve so that the air-fuel ratio of the combustion in the cylinders becomes a lean air-fuel ratio during the normal operation of the engine. Therefore, a lean air-fuel ratio exhaust gas is discharged from the cylinders during the normal operation and $NO_x$, in the exhaust gas is absorbed by the $NO_x$ absorbing-reducing catalyst. When the amount of $NO_x$ absorbed in the $NO_x$ absorbing-reducing catalyst increases to a predetermined level, the control circuit performs an additional fuel injection during the expansion stroke or exhaust stroke of cylinders in order to adjust the air-fuel ratio of the exhaust gas leaving the cylinders to a rich air-fuel ratio. The rich air-fuel ratio exhaust gas leaving the cylinders flows into the three-way catalyst and $NO_x$ in the exhaust gas is converted into $NH_3$ at the three-way catalyst. When the rich air-fuel ratio exhaust gas flows through the $NO_x$ absorbing-reducing catalyst, $NO_x$ is released from the $NO_x$ absorbing-reducing catalyst and is reduced to $N_2$ by $NH_3$ in the exhaust gas.

18 Claims, 29 Drawing Sheets

EXHAUST GAS PURIFICATION DEVICE FOR AN INTERNAL COMBUSTION ENGINE

BACKGROUND OF THE INVENTION

1. Field of the Invention

The present invention relates to an exhaust gas purification device for an internal combustion engine. More specifically, the invention relates to a device which is capable of removing $NO_x$ from the exhaust gas of a lean burn engine with high efficiency.

2. Description of the Related Art

An exhaust gas purification device utilizing a three-way reducing and oxidizing catalyst (hereinafter referred to as a "three-way catalyst") is commonly used for removing HC, CO and $NO_x$ from the exhaust gas of an internal combustion engine (in this specification, the term $NO_x$ means a nitrogen oxide such as NO, $NO_2$, $N_2O$ and $N_2O_4$, in general). The three-way catalyst is capable of oxidizing HC and CO, and reducing $NO_x$, in the exhaust gas when the exhaust gas is at a stoichiometric air-fuel ratio. Namely, the three-way catalyst is capable of simultaneously removing these harmful compounds from exhaust gas when the air-fuel ratio of the exhaust gas is the stoichiometric air-fuel ratio.

However, the ability of the three-way catalyst for reducing $NO_x$ becomes lower as the air-fuel ratio of the exhaust gas becomes leaner (i.e., as the air-fuel ratio becomes higher than the stoichiometric air-fuel ratio). Therefore, it is difficult to remove $NO_x$ in the exhaust gas from a lean burn engine, which is operated, on the whole, at a lean air-fuel ratio, using a three-way catalyst.

To solve this problem, Japanese Unexamined Patent Publication (Kokai) No. 4-365920 discloses an exhaust gas purification device utilizing a denitrating reaction.

When the air-fuel ratio of the exhaust gas is lower than the stoichiometric air-fuel ratio (i.e., when the air-fuel ratio of the exhaust gas is rich), the three-way catalyst converts a portion of $NO_x$ in the exhaust gas to $NH_3$ while reducing most of $NO_x$ in the exhaust gas and converting it into $N_2$. The device in the '920 publication produces $NH_3$ from $NO_x$ in the exhaust gas using a three-way catalyst, and reacts the produced $NH_3$ with the $NO_x$ in the exhaust gas to reduce $NO_x$ to $N_2$ and $H_2O$ by a denitrating reaction.

In the '920 publication, a multi-cylinder internal combustion engine is used, and a group of cylinders of the engine are operated at a rich air-fuel ratio while other cylinders are operated at a lean air-fuel ratio, and the operating air-fuel ratio of the engine, as a whole, is kept at a lean air-fuel ratio. Further, a three-way catalyst having a high capability for converting $NO_x$ to $NH_3$ is disposed in an exhaust gas passage connected to the rich air-fuel ratio cylinders (i.e., the cylinders operated at a rich air-fuel ratio). After it flows through the three-way catalyst, the exhaust gas from the rich air-fuel ratio cylinders mixes with the exhaust gas from the lean air-fuel ratio cylinders. When the exhaust gas from the rich air-fuel ratio cylinders flows through the three-way catalyst, a portion of the $NO_x$ in the exhaust gas is converted to $NH_3$. Thus, the exhaust gas downstream of the three-way catalyst contains a relatively large amount of $NH_3$. On the other hand, the exhaust gas from the lean air-fuel ratio cylinders contains a relatively large amount of $NO_x$. Therefore, by mixing the exhaust gas from the three-way catalyst and the exhaust gas from the lean air-fuel ratio cylinders, $NH_3$ in the exhaust gas from the three-way catalyst reacts with $NO_x$ in the exhaust gas from the lean air-fuel ratio cylinder, and $NH_3$ and $NO_x$ produce $N_2$ and $H_2O$ by a denitrating reaction. Thus, according to the device in the '920 publication, $NO_x$ is removed from the exhaust gas.

In the device of the '920 publication, it is required that the amount of $NH_3$ produced by the three-way catalyst is sufficient for reducing all of the $NO_x$ in the exhaust gas from the lean air-fuel ratio cylinders. For example, the greatest part of $NO_x$ in the exhaust gas discharged from the engine is composed of NO (nitrogen monoxide) and $NO_2$ (nitrogen dioxide) components. These NO and $NO_2$ components react with $NH_3$ and produce $N_2$ and $H_2O$ by the following denitrating reactions.

$$4NH_3 + 4NO + O_2 \rightarrow 4N_2 + 6H_2O$$

$$8NH_3 + 6NO_2 \rightarrow 7N_2 + 12H_2O$$

Therefore, in the device of the '920 publication, an amount of $NH_3$ which equals the total of the number of moles of NO and 4/3 times the number of moles of $NO_2$ is required in order to remove all of the $NO_x$ in the exhaust gas from the lean air-fuel ratio cylinders. When the exhaust gas contains other $NO_x$ components such as $N_2O_4$, $N_2O$, the amount of $NH_3$ stoichiometrical to the amount of these components is required in addition to the above noted amount on $NH_3$.

However, the amount of $NO_x$ produced in the cylinders of the engine becomes the maximum when the cylinders are operated at a lean air-fuel ratio (for example, at an excess air ratio about 1.2), and decreases rapidly when the cylinders are operated at a rich air-fuel ratio. Since the device in the '920 publication converts $NO_x$ in the exhaust gas of the rich air-fuel ratio cylinder to produce $NH_3$, the amount of produced $NH_3$ is limited by the amount of $NO_x$ produced in the rich air-fuel ratio cylinders. Therefore, in the device of the '920 publication, the amount of $NH_3$ produced by the three-way catalyst is not sufficient to reduce all of the $NO_x$ in the exhaust gas from the lean air-fuel ratio cylinders, and a part of $NO_x$ in the exhaust gas from the lean air-fuel ratio cylinder is released to the atmosphere without being reduced.

Further, in the device of the '920 publication, a group of the cylinders are operated at a lean air-fuel ratio, while other cylinders of the engine is operated at a rich air-fuel ratio. This causes a difference in the output torque of the cylinders, and causes fluctuations in the output torque of the engine.

SUMMARY OF THE INVENTION

In view of the problems in the related art as set forth above, the object of the present invention is to provide an exhaust gas purification device for an internal combustion engine which is capable of removing $NO_x$ in the exhaust gas of a lean burn engine, with high efficiency, by producing a sufficient amount of $NH_3$ and removing $NO_x$ from the exhaust gas by reacting the produced $NH_3$ and $NO_x$ in the exhaust gas and without causing fluctuations in the output torque of the engine.

This object is achieved by an exhaust gas purification device for an internal combustion engine according to the present invention in which the engine is provided with a direct cylinder injection valve for injecting fuel directly into the cylinder thereof and is capable of operating on a lean air-fuel ratio combustion in the cylinder. The exhaust gas purification device comprises exhaust gas air-fuel ratio adjusting means for adjusting the air-fuel ratio of the lean air-fuel ratio exhaust gas produced by the lean air-fuel ratio combustion in the cylinder to a rich air-fuel ratio by injecting fuel into the cylinder from the direct cylinder injection valve during an expansion stroke or an exhaust stroke of the cylinder, $NH_3$ conversion means disposed in an exhaust gas passage through which the exhaust gas after its air-fuel ratio is adjusted flows and for producing $NH_3$ by converting at least a part of $NO_x$ contained in the exhaust gas to $NH_3$ and purification means disposed in an exhaust gas passage into which the exhaust gas from the $NH_3$ conversion means flows and for purifying both $NO_x$ and $NH_3$ in the exhaust gas by reacting $NO_x$ with $NH_3$ in the exhaust gas.

In the present invention, the combustion in the cylinder of the engine is performed at a lean air-fuel ratio. Therefore, the amount of $NO_x$ produced by the combustion in the cylinder is larger than the amount of the same when the cylinder is operated at a rich air-fuel ratio. Thus, exhaust gas with a lean air-fuel ratio and containing a relatively large amount of $NO_x$ is formed in the cylinder. The exhaust gas air-fuel ratio adjusting means adds fuel to this lean air-fuel ratio exhaust gas by injecting fuel into cylinder during the expansion stroke or the exhaust stroke using the direct cylinder injection valve. Since fuel is added to the exhaust gas, the air-fuel ratio of the exhaust gas changes to a rich air-fuel ratio. Further, since the amount of $NO_x$ produced by the lean air-fuel ratio combustion does not change by the fuel injection during the expansion or the exhaust stroke, the exhaust gas still contains a relatively large amount of $NO_x$ even after the fuel injection during the expansion or the exhaust stroke is performed. Thus, exhaust gas with a rich air-fuel ratio which contains a relatively large amount of $NO_x$ is formed in the cylinder by the direct cylinder fuel injection during the expansion or the exhaust stroke. It will be understood that the amount of $NO_x$ contained in this rich air-fuel ratio exhaust gas is larger than the amount of $NO_x$ contained in the exhaust gas formed by a rich air-fuel ratio combustion.

This exhaust gas, having a rich air-fuel ratio and containing a relatively large amount of $NO_x$, is supplied to the $NH_3$ conversion means such as a three-way catalyst or a $NO_x$ absorbing-reducing catalyst. Since the amount of $NO_x$ in the exhaust gas is large, a large amount of $NH_3$ is produced by the $NH_3$ conversion means and is supplied to the purification means. Therefore, a sufficient amount of $NH_3$ for reducing $NO_x$ in the exhaust gas is supplied to the purification means.

Further, since the fuel injected into the cylinder during the expansion stroke or the exhaust stroke does not generate output torque at the cylinder, the engine output torque is not affected by the fuel injection during the expansion stroke or the exhaust stroke. Therefore, according to the present invention, $NO_x$ in the exhaust gas is purified with high efficiency without causing fluctuations in the output torque of the engine.

BRIEF DESCRIPTION OF THE DRAWINGS

The present invention will be better understood from the description as set forth hereinafter, with reference to the accompanying drawings in which.

DESCRIPTION OF THE PREFERRED EMBODIMENT

Figure 1:
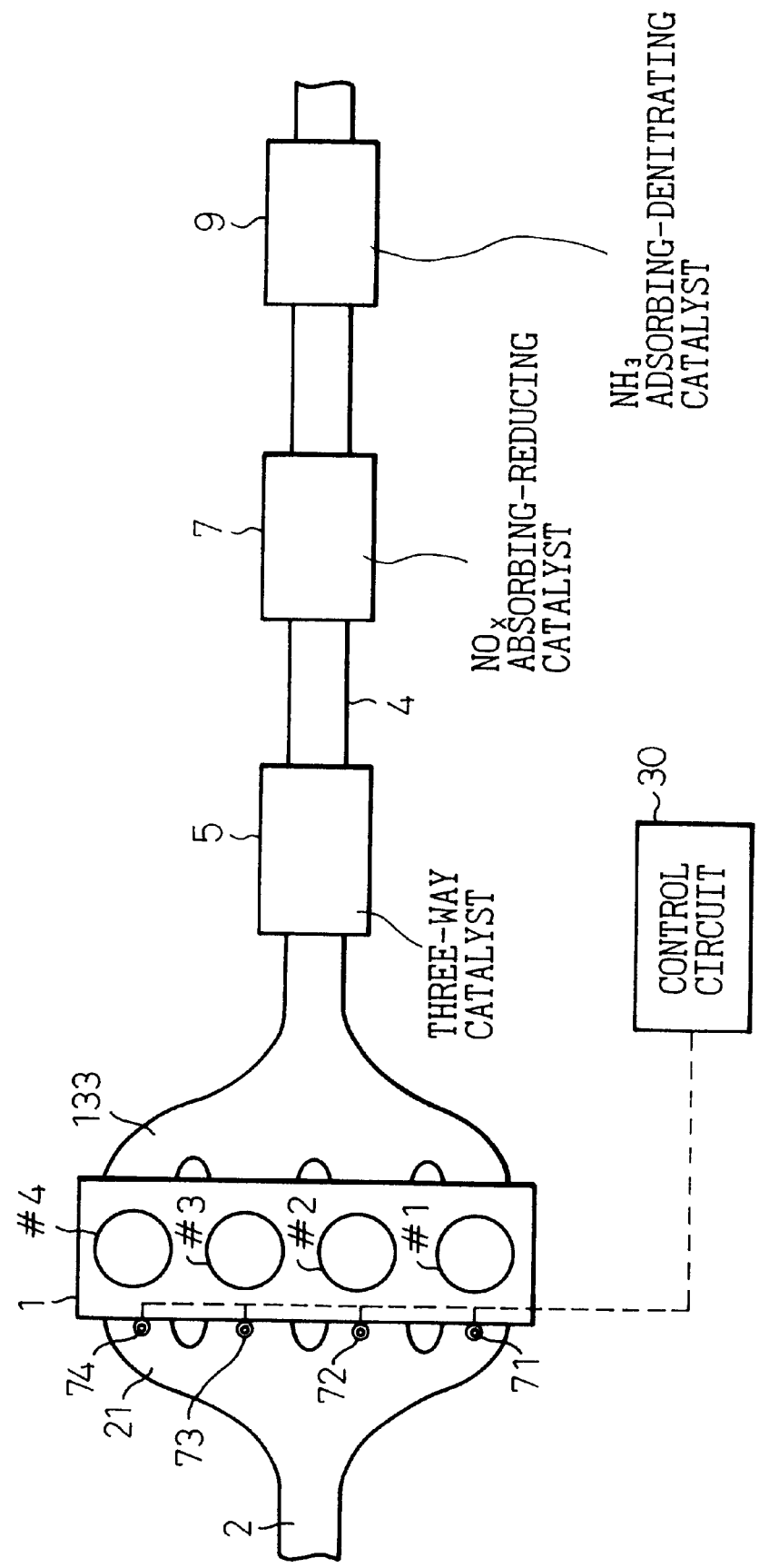
FIG. 1 schematically illustrates the general configuration of an embodiment of the exhaust gas purification device according to the present invention.

Hereinafter, embodiments of the present invention will be explained, in detail, with reference to the accompanying drawings. In the accompanying drawings, the same reference numerals designate similar elements. In the embodiments explained hereinafter, FIGS. 1, 8 through 10 and 23 through 26 show the embodiments in which all the exhaust gas from the cylinders flows through the $NH_3$ conversion means, and FIGS. 12, 15, 16, 19 and 27 show the embodiments in which only the exhaust gas from specific cylinder (s) flows through the $NH_3$ conversion means and the exhaust gas which has passed through the $NH_3$ conversion means mixes with the exhaust gas from other cylinders.

Further, in the embodiments in FIGS. 1, 8 through 10, 12, 15, 16 and 19, a three-way catalyst is used as $NH_3$ conversion means. In these embodiments, FIGS. 1, 8, 12 and 15 represent the case where both of a $NO_x$ absorbing-reducing catalyst and a $NH_3$ adsorbing-denitrating catalyst are used as the purification means. In contrast to this, only the $NO_x$ absorbing-reducing catalyst is used in FIG. 10 and only the $NH_3$ adsorbing-denitrating catalyst is used in FIGS. 10, 16 and 17 as the purification means.

Further, in the embodiments in FIGS. 23 through 27, the $NO_x$ absorbing-reducing catalyst is used as the $NH_3$ conversion means. Namely, the $NO_x$ absorbing-reducing catalysts in these embodiments are used as the $NH_3$ conversion means as well as the purification means.

The three-way catalyst, the $NO_x$ absorbing-reducing catalyst and the $NH_3$ adsorbing-denitrating catalyst will be explained later in detail.

Hereinafter, the respective embodiments will be explained.

FIG. 1 shows the general configuration of an embodiment of the present invention when it is applied to a vehicle engine. In FIG. 1, reference numeral 1 designates a multi-cylinder type internal combustion engine for an automobile. In this embodiment, the engine 1 is a 4-cylinder engine having No. 1 through No. 4 cylinders. As explained later, each of the cylinders is provided with a direct cylinder injection valve (71 through 74 in FIG. 1) which injects fuel directly into the cylinder and is operated at a lean air-fuel ratio during the normal operation of the engine. Namely, during the normal operation of the engine, the combustion in the cylinders of the engine is performed at a lean air-fuel ratio.

As can be seen from FIG. 1, the exhaust gas from No. 1 through No. 4 cylinders flows into a common exhaust gas passage 4 through an exhaust gas manifold 133. In the exhaust gas passage 4, a three-way catalyst 5 which acts as the $NH_3$ conversion means in this embodiment, and a $NO_x$ absorbing-reducing catalyst 7 and a $NH_3$ adsorbing-denitrating catalyst 9, both act as purification means are disposed in this order from the upstream end.

Numeral 30 in FIG. 1 designates a control circuit of the engine 1. The control circuit 30 may, for example, consist of a microcomputer of a conventional type which comprises a ROM (read-only memory), a RAM (random access memory), a CPU (microprocessor). The control circuit 30 performs basic control of the engine such as a fuel injection control and an ignition timing control.

Figure 2:
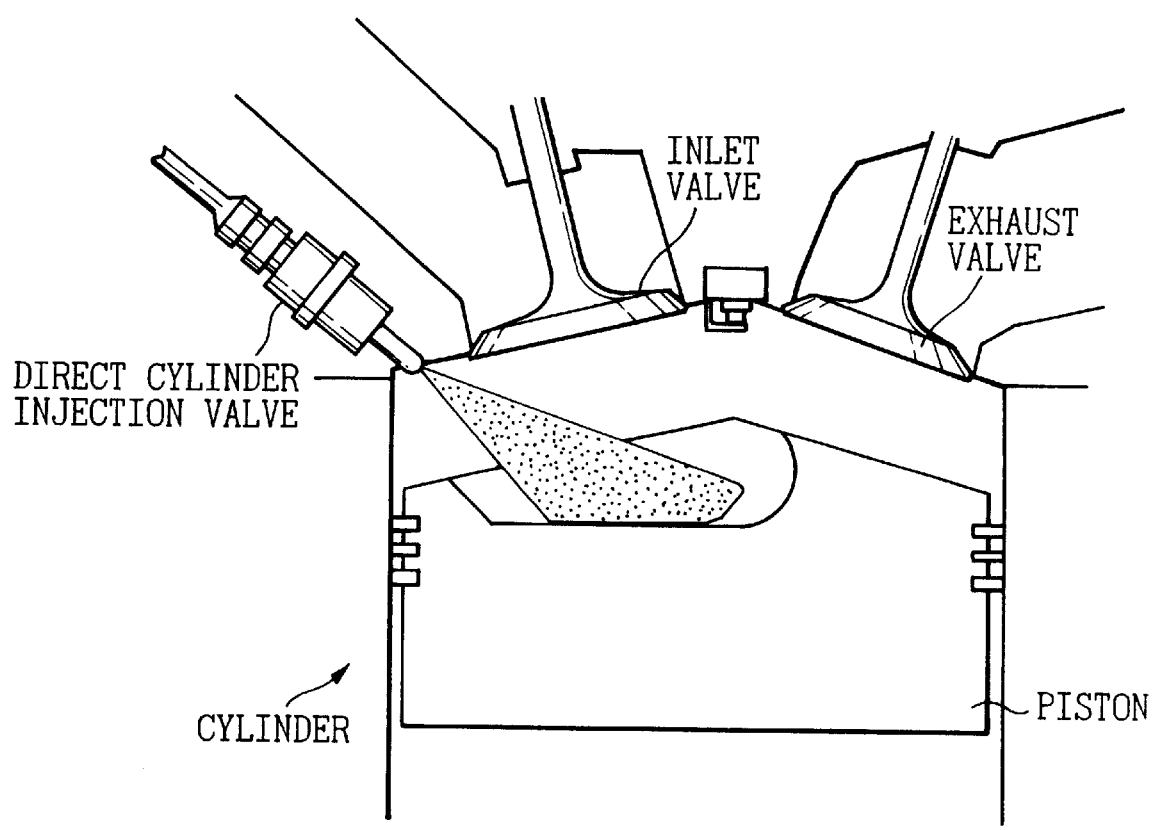
FIG. 2 is a sectional view of the cylinder for illustrating the direct cylinder injection valve.

Numeral 21 in FIG. 1 is an intake manifold connecting the intake port of the respective cylinders to a common intake air passage 2. The direct cylinder injection valve, as shown in FIG. 2, injects fuel directly into the cylinder in response to a fuel injection signal from the control circuit 30. In this embodiment, the direct cylinder injection valve of each cylinder injects fuel during the intake stroke or the compression stroke of the cylinder in order to cause the combustion of air-fuel mixture with a lean air-fuel ratio in the cylinder. This fuel injection performed during the intake stroke or the compression stroke in order to cause the combustion in the cylinder is hereinafter referred to as "the primary fuel injection".

Further, when it acts as the exhaust gas air-fuel ratio adjusting means, the direct cylinder injection valve injects fuel during the expansion stroke (preferably, during the latter half thereof) or the exhaust stroke of the cylinder in addition to the primary fuel injection. By performing fuel injection during the expansion stroke or the exhaust stroke, fuel is further added to the combustion gas generated by the lean air-fuel ratio combustion in the cylinder and, thereby, the air-fuel ratio of the exhaust gas leaving the cylinder is adjusted to a rich air-fuel ratio. This fuel injection performed during the expansion stroke or the exhaust stroke in order to adjust the air-fuel ratio of the exhaust gas at a rich air-fuel ratio is hereinafter referred to as "the additional fuel injection". The fuel injected by the additional fuel injection does not burn in the cylinder, but is vaporized by the heat of the combustion gas in the cylinder and uniformly mixes with the combustion gas in the cylinder. Therefore, a uniform mixture of exhaust gas and the vaporized fuel is discharged from the cylinder. Since the fuel injected by the additional fuel injection does not burn in the cylinder, it does not contribute to the generation of output torque at the cylinder. Therefore, the output torque of the respective cylinders stays the same even when the additional fuel injection is performed. Further, even when the additional fuel injection is performed only in the specific cylinder(s) of the engine, fluctuations in the engine output torque does not occur.

Usually, fuel such as gasoline or diesel fuel contains a large amount of hydrocarbons having relatively large molecular weights. When such fuel is injected into the cylinder by the additional fuel injection, a cracking of the heavy hydrocarbons occurs due to a high temperature and a high pressure in the cylinder, and hydrocarbons having smaller molecular weights are produced. These hydrocarbons having smaller molecular weights easily produce CO and $H_2$ in the exhaust gas by water gas reactions. Therefore, when the additional fuel injection is performed, the exhaust gas leaving the cylinders contains relatively large amounts of CO, $H_2$ and active light hydrocarbons.

In this embodiment, the primary fuel injection may be performed during the intake stroke of the cylinder in order to form a uniform air-fuel mixture with a lean air-fuel ratio in the cylinder. In this case, a lean air-fuel ratio combustion of a uniform air-fuel mixture occurs in the cylinder. Alternatively, the primary fuel injection may be performed during the period from the latter half of the intake stroke to the former half of the compression stroke in order to stratify a combustible air-fuel mixture near the ignition plug. In this case, a lean air-fuel ratio stratified charge combustion occurs in the cylinder.

Next, the three-way catalyst 5 in this embodiment will be explained.

The three-way catalyst 5 uses, for example, a honeycomb type substrate made of cordierite, and a thin alumina layer, which acts as a carrier for the catalyst, is coated on the surface of the substrate. On this carrier, precious metals such as platinum Pt, rhodium Rh, and palladium Pd are attached. The three-way catalyst 5 converts HC, CO, $NO_x$ in the exhaust gas with high efficiency when the air-fuel ratio of the exhaust gas is the stoichiometric air-fuel ratio (i.e., excess air ratio $\lambda=1.0$). The conversion rates of HC and CO become higher than that of the stoichiometric air-fuel ratio when the air-fuel ratio becomes lean ($\lambda>1.0$). Conversely, the conversion rate of $NO_x$ becomes higher than that of the stoichiometric air-fuel ratio when the air-fuel ratio becomes rich ($\lambda<1.0$).

As stated before, most of the $NO_x$ in the exhaust gas from the engine 1 consists of NO. When $\lambda$ is smaller than 1.0 (i.e., when the air-fuel ratio of the exhaust gas is rich), a part of this NO is converted by the three-way catalyst 5 by reducing reactions $$2CO+2NO \rightarrow N_2+2CO_2,$$

and $$2H_2+2NO \rightarrow N_2+2H_2O.$$

However, a remaining part of NO is converted to $NH_3$ by the reaction $$5H_2+2NO \rightarrow 2NH_3+2H_2O.$$

The conversion rate of NO to $NH_3$ becomes higher as the amount of rhodium Rh contained in the three-way catalyst increases. Further, as a catalytic component, palladium Pd shows a relatively high conversion rate of NO to $NH_3$, and also shows a high oxidizing ability for HC and CO.

In this embodiment, since $NH_3$ is used for reducing $NO_x$ on the denitrating catalyst 9 downstream of the three-way catalyst 5, it is preferable to produce as much $NH_3$ as possible at the three-way catalyst 5. Therefore, three-way catalyst 5 in this embodiment carries a relatively large amount of rhodium Rh or palladium Pd.

Figure 3:
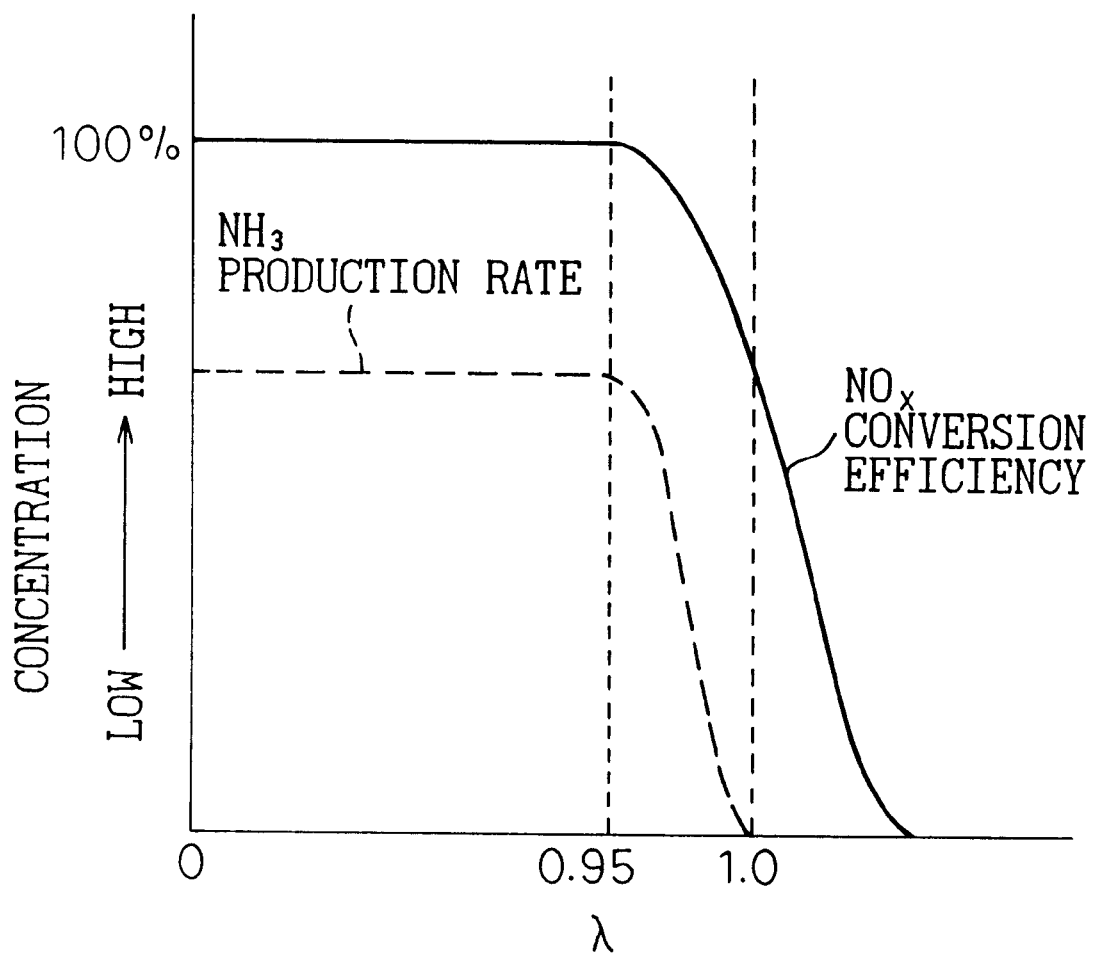
FIG. 3 is a graph showing typical changes in the total conversion efficiency of $NO_x$ and in the production rate of $NH_3$ of a three-way catalyst in accordance with the change in the excess air ratio of the exhaust gas.

FIG. 3 shows the changes in the total conversion rate of $NO_x$ (i.e., the ratio of the amount of $NO_x$ converted to $N_2$ and $NH_3$ to the amount of $NO_x$ flowing into the catalyst) and the production rate of $NH_3$ (i.e., the ratio of the amount of $NO_x$ converted to $NH_3$ to the amount of $NO_x$ flowing into the catalyst) of the three-way catalyst 5 in accordance with the change in the air-fuel ratio of the exhaust gas. As can be seen from FIG. 3, the total conversion rate of $NO_x$ (the solid line in FIG. 3) rapidly decreases as the air-fuel ratio of the exhaust gas becomes larger than the stoichiometric air-fuel ratio ($\lambda=1.0$). Therefore, when the exhaust gas flowing into the three-way catalyst 5 becomes lean ($\lambda>1.0$), the amount of $NO_x$ passing through the three-way catalyst 5 without being converted to $N_2$ and $NH_3$ rapidly increases.

Conversely, when the air-fuel ratio becomes rich, total conversion rate of $NO_x$ increases and becomes almost 100% when the excess air ratio $\lambda$ of the exhaust gas is smaller than approximately 0.95. Therefore, when the excess air ratio of the exhaust gas is smaller than 0.95, all of the $NO_x$ in the exhaust gas flowing into the catalyst 5 is converted to $N_2$ and $NH_3$, and the exhaust gas flowing out from the catalyst 5 does not contain $NO_x$.

The production rate of $NH_3$ (the broken line in FIG. 3) is almost zero when the air-fuel ratio becomes higher than the stoichiometric air-fuel ratio. However, in the region $\lambda<1.0$, the production rate of $NH_3$ increases as the excess air ratio $\lambda$ decreases, and becomes substantially constant in the region where $\lambda \leq 0.95$. Therefore, when the excess air ratio of the exhaust gas is in the region $\lambda \leq 0.95$, all of the $NO_x$ is converted to $N_2$ and $NH_3$ and, further, the production rate of $NH_3$ becomes the maximum.

Next, the $NO_x$ absorbing-reducing catalyst 7 in this embodiment will be explained.

The $NO_x$ absorbing-reducing catalyst 7 in this embodiment uses, for example, an alumina as a carrier and, on this carrier, precious metals such as platinum Pt and at least one substance selected from alkali metals such as potassium K, sodium Na, lithium Li and cesium Cs; alkali-earth metals such as barium Ba and calcium Ca; and rare-earth metals such as lanthanum La and yttrium Y are carried. The $NO_x$ absorbing-reducing catalyst 7 absorbs $NO_x$ in the exhaust gas in the form of nitric acid ions when the air-fuel ratio of the exhaust gas is lean (i.e., when the excess air ratio $\lambda$ is larger than 1.0), and releases the absorbed $NO_x$ when the excess air ratio $\lambda$ of the exhaust gas flowing the $NO_x$ absorbing-reducing catalyst becomes smaller than 1.0 (i.e., the air-fuel ratio becomes rich).

Namely, considering the case where platinum Pt and barium Ba are carried on the $NO_x$ absorbing-reducing catalyst 7, when the concentration of $O_2$ in the exhaust gas increases, i.e., when the excess air ratio $\lambda$ of the exhaust gas becomes larger than 1.0, the oxygen $O_2$ in the exhaust gas is deposited on the surface of platinum Pt in the form of $O_2^-$ or $O^{2-}$. The NO in the exhaust gas reacts with $O_2^-$ or $O^{2-}$ on the surface of the platinum Pt and becomes $NO_2$ by the reaction $2NO+O_2 \rightarrow 2NO_2$. Then, $NO_2$ in the exhaust gas and the $NO_2$ produced on the platinum Pt are further oxidized on the surface of platinum Pt and absorbed into the catalyst while bonding with the barium oxide BaO and diffusing in the catalyst in the form of nitric acid ions $NO_3^-$. Thus, $NO_x$ in the exhaust gas is absorbed by the $NO_x$ absorbing-reducing catalyst 7 when the excess air ratio $\lambda$ of the exhaust gas is larger than 1.0.

On the other hand, when the oxygen concentration in the exhaust gas becomes low, i.e., when the excess air ratio $\lambda$ of the exhaust gas becomes $\lambda \leq 1.0$, the production of $NO_2$ on the surface of the platinum Pt is lowered and the reaction proceeds in an inverse direction ($NO_3^- \rightarrow NO_2$), and thus nitric acid ions $NO_3^-$ in the catalyst are released, in the form of $NO_2$, from the $NO_x$ absorbing-reducing catalyst 7.

In this case, if a reducing substance such as $NH_3$, CO, $H_2$, or a substance such as HC, $CO_2$ exist in the exhaust gas, released $NO_x$ is reduced on the platinum Pt by these components.

As explained before, when the additional fuel injection is performed, the exhaust gas leaving the cylinders of the engine 1 contains a large amount of HC, CO, and $CO_2$ as well as $H_2$ produced by the water gas reactions. Further, in this condition, a part of $NO_x$ in the exhaust gas reacts with $H_2$ and CO in the exhaust gas at the three-way catalyst 5 and produces $NH_3$ in the exhaust gas. Therefore, when the additional fuel injection is performed, the $NO_x$ released from the $NO_x$ absorbing-reducing catalyst 7 is reduced to $N_2$ by HC, CO, $H_2$ and $NH_3$ in the exhaust gas. Especially, since the reducing ability of $NH_3$ is large, $NO_x$ is reduced with high efficiency as the concentration of $NH_3$ in the exhaust gas becomes higher.

In addition, the $NO_x$ absorbing-reducing catalyst also converts $NO_x$ in the exhaust gas to $NH_3$ by a mechanism exactly the same as that of the three-way catalyst. Therefore, a $NO_x$ absorbing-reducing catalyst can be used as the $NH_3$ conversion means in lieu of the three-way catalyst. Embodiments in which the $NO_x$ absorbing-reducing catalyst is used as the $NH_3$ conversion means will be explained later.

Next, the $NH_3$ adsorbing-denitrating catalyst 9 in this embodiment will be explained.

The $NH_3$ adsorbing-denitrating catalyst in the embodiments of the present invention uses, for example, a honeycomb type substrate made of cordierite, and an alumina layer which acts as a carrier for the catalyst is coated on the cell surface of the honeycomb substrate. On this carrier, at least one substance selected from elements belong to the fourth period or the eighth group in the periodic table of elements, such as copper Cu, chrome Cr, vanadium V, titanium Ti, iron Fe, nickel Ni, cobalt Co, platinum Pt, palladium Pd, rhodium Rh and iridium Ir are carried as a catalyst. Further, in this embodiment, "an $NH_3$ adsorbing substance", which is explained later, is also attached to the substrate of the $NH_3$ adsorbing-denitrating catalyst 9 in order to provide the catalyst 9 with an $NH_3$ adsorbing capability.

The $NH_3$ adsorbing-denitrating catalyst is capable of converting all the $NH_3$ in the exhaust gas flowing into the catalyst to $N_2$ provided the exhaust gas is in an oxidizing atmosphere (i.e., $\lambda > 1.0$) and the temperature of the catalyst is within a specific temperature range as determined by the substance being used as the catalyst. Namely, when the temperature of the $NH_3$ adsorbing-denitrating catalyst 9 is in the specific temperature range and the excess air ratio $\lambda$ of the exhaust gas flowing into the catalyst is larger than 1.0, the denitrating reactions $$8NH_3 + 6NO_2 \rightarrow 12H_2O + 7N_2$$

$$4NH_3 + 4NO + O_2 \rightarrow 6H_2O + 4N_2$$

occur in the $NH_3$ adsorbing-denitrating catalyst, in addition to the oxidizing reactions $$4NH_3 + 7O_2 \rightarrow 4NO_2 + 6H_2O$$

$$4NH_3 + 5O_2 \rightarrow 4NO + 6H_2O$$

Due to these denitrating reactions, the $NO_x$ components produced by the oxidizing reactions are immediately converted to the $N_2$ component. As a result, of these sequential reactions, all of the $NH_3$ flowing into the $NH_3$ adsorbing-denitrating catalyst 9 is converted to $N_2$.

Further, if the exhaust gas contains $NO_x$ in addition to $NH_3$, $NO_x$ is reduced by the above-explained denitrating reactions to $N_2$. In this case, if the amount of $NH_3$ in the exhaust gas is larger than the amount required to reduce all the $NO_x$ contained in the exhaust gas, a surplus of $NH_3$ is converted to $N_2$ by the above-explained sequential oxidizing and denitrating reactions and does not pass through the $NH_3$ adsorbing-denitrating catalyst 9. Further, if HC and CO are contained in the exhaust gas in addition to $NH_3$, HC and CO are oxidized by the $NH_3$ adsorbing-denitrating catalyst 9 and do not pass through the $NH_3$ adsorbing-denitrating catalyst provided the excess air ratio $\lambda$ of the exhaust gas is larger than 1.0.

The specific temperature range explained above varies in accordance with the substance used as the catalyst. However, the specific temperature range of the $NH_3$ adsorbing-denitrating catalyst is generally lower than the temperature range where other catalysts such as the three-way catalyst are used. For example, the specific temperature range is approximately 100° C.–400° C. when the substance such as platinum Pt, palladium Pd, rhodium Rh are used as the catalyst. More specifically, when platinum Pt is used, a temperature range 100° C.–300° C. is more preferable, and a temperature range 150° C. to 250° C. is most preferable. When palladium Pd and rhodium Rh are used, a temperature range 150° C.–400° C. is more preferable, and a temperature range 150° C. to 300° C. is most preferable. Further, when substances such as copper Cu, chrome Cr and iron Fe are used, the specific temperature range is approximately 150° C.–650° C., and a temperature range 150° C.–500° C. is preferable.

When the temperature of the $NH_3$ adsorbing-denitrating catalyst is above the specific temperature range, the oxidizing reactions become dominant in the catalyst and the amount of $NH_3$ which is oxidized by the catalyst increases. Thus, the denitrating reactions hardly occur in the catalyst due to the shortage of $NH_3$ in the exhaust gas, and the $NO_x$ produced by the oxidizing reactions flows out from the $NH_3$ adsorbing-denitrating catalyst without being reduced by the denitrating reactions.

On the other hand, when the temperature of $NH_3$ adsorbing-denitrating catalyst is below the specific temperature range, the oxidizing reactions hardly occur due to the low temperature. This causes the $NH_3$ in the exhaust gas to pass through the $NH_3$ adsorbing-denitrating catalyst without being oxidized due to the shortage of $NO_x$ produced by the oxidizing reactions.

In the embodiments explained below, the $NH_3$ adsorbing-denitrating catalyst 9 is disposed in the exhaust gas passage 4 at the position where the temperature of the catalyst 9 falls within the specific temperature range as explained above during the operation of the engine 1. The temperature of the $NH_3$ adsorbing-denitrating catalyst 9 may be controlled in the specific temperature range by providing a cooling water jacket or cooling fins to the $NH_3$ adsorbing-denitrating catalyst 9.

Next, the $NH_3$ adsorbing substance attached to the substrate of the catalyst 9 will be explained. It is known in the art that an acidic inorganic substance (which includes Broensted acids such as zeolite, silica $SiO_2$, silica-alumina $SiO_2-Al_2O_3$, and titania $TiO_2$ as well as Lewis acids including oxides of transition metals such as copper Cu, cobalt CO, nickel Ni and iron Fe) adsorb $NH_3$, and especially when the temperature is low, the substances adsorb a large amount of $NH_3$. In this embodiment, one or more of these acidic inorganic substances is carried on the substrate of the $NH_3$ adsorbing-denitrating catalyst 9, or the substrate itself may be formed by a porous material made of such acidic inorganic substances. When the concentration of $NH_3$ in the exhaust gas is high, $NH_3$ in the exhaust gas is adsorbed by the acidic inorganic substance of the $NH_3$ adsorbing-denitrating catalyst 9, further, when the concentration of $NH_3$ in the exhaust gas becomes low, the $NH_3$ adsorbed in the acidic inorganic substance is released. Therefore, the $NH_3$ adsorbing-denitrating catalyst 9 is capable of reducing $NO_x$ by the denitrating reactions, even when $NH_3$ does not exist in the exhaust gas, using the $NH_3$ it has adsorbed when the $NH_3$ concentration was high.

As an $NH_3$ adsorbing-denitrating catalyst 9, other types of catalyst may be used. For example, a catalyst which uses, for example, zeolite ZSM-5 as a substrate, with metals such as copper Cu, iron Fe or platinum Pt attached thereto by an ion exchange method (a copper-zeolite catalyst, an iron-zeolite catalyst, platinum-zeolite catalyst, respectively) may be used as the $NH_3$ adsorbing-denitrating catalyst. Alternatively, a substrate made of zeolite such as mordenite and a precious metal such as platinum Pt and/or other metals attached thereon (for example, a platinum-mordenite catalyst or a platinum-copper-mordenite catalyst) can also be used as the $NH_3$ adsorbing-denitrating catalyst. These zeolite $NH_3$ adsorbing-denitrating catalysts trap $NH_3$, HC and CO components in the exhaust gas in the pores of the porous zeolite, and selectively reduce $NO_x$ in the exhaust gas using these trapped components (as well as $NH_3$, HC, CO in the exhaust gas) even in an oxidizing atmosphere.

Next, the exhaust gas purifying operation of the embodiment in FIG. 1 will be explained.

In the explanation hereinafter, the term "an air-fuel ratio of the combustion" (or "an excess air ratio of the combustion") means an air-fuel ratio (an excess air ratio) of the air-fuel mixture in the whole cylinder in the case where the combustion of the uniform air-fuel mixture as explained before takes place in the cylinder and, an air-fuel ratio (an excess air ratio) of the stratified air-fuel mixture in the case where the stratified charge combustion takes place in the cylinder.

In the embodiment in FIG. 1, all of the No. 1 through No. 4 cylinders are operated at a lean air-fuel ratio during the normal operation. In this case, the excess air ratio of the combustion in the respective cylinders is set at a value at which the amount of $NO_x$ produced by the combustion becomes as small as possible (for example, $\lambda \cong 1.4$). Further, the additional fuel injection is not performed during the normal operation. Therefore, the exhaust gas leaving the cylinders during the normal operation is at a lean air-fuel ratio and contains a relatively small amount of $NO_x$. This lean air-fuel ratio exhaust gas flows into the three-way catalyst 5 during the normal operation. However, since the conversion efficiency of $NO_x$ falls rapidly when the air-fuel ratio of the exhaust gas is lean as explained in FIG. 3, a large part of the $NO_x$ in the exhaust gas passes through the three-way catalyst 5 without being reduced and flows into the $NO_x$ absorbing-reducing catalyst 7. Since the $NO_x$ absorbing-reducing catalyst 7 absorbs $NO_x$ when the exhaust gas is at a lean air-fuel ratio, the $NO_x$ passing through the three-way catalyst 5 without being reduced is absorbed in the $NO_x$ absorbing-reducing catalyst 7.

Namely, $NO_x$ produced by the lean air-fuel ratio combustion in the cylinder during the normal operation is stored temporarily in the $NO_x$ absorbing-reducing catalyst 7. Therefore, if the normal operation of the engine continues for a long time, the amount of the $NO_x$ absorbed in the $NO_x$ absorbing-reducing catalyst 7 increases and this may cause the $NO_x$ absorbing-reducing catalyst to be saturated with the absorbed $NO_x$. In order to prevent this problem, the additional fuel injection is performed on all cylinders for a short period when the amount of $NO_x$ absorbed in the $NO_x$ absorbing-reducing catalyst 7 increases. By performing the additional fuel injection, the air-fuel ratio of the exhaust gas from the cylinders shifts to a rich air-fuel ratio, and a part of $NO_x$ in the exhaust gas is converted into $NH_3$ on the three-way catalyst 5. Thus, when the additional fuel injection is started, a rich air-fuel ratio exhaust gas containing a relatively large amount of $NH_3$ flows into the $NO_x$ absorbing-reducing catalyst 7 and, thereby, the $NO_x$ absorbed in the $NO_x$ absorbing-reducing catalyst 7 is released due to the rich air-fuel ratio exhaust gas and is reduced by $NH_3$, HC and CO in the exhaust gas.

As explained above, $NO_x$ absorbed in the $NO_x$ absorbing-reducing catalyst 7 is released and reduced by shifting the air-fuel ratio of the exhaust gas to a rich air-fuel ratio by performing the additional fuel injection periodically for a short time during the normal operation. In this specification, the operation for shifting the air-fuel ratio of the exhaust gas to a rich air-fuel ratio in order to cause the $NO_x$ absorbing-reducing catalyst 7 to release the absorbed $NO_x$ is referred to as "a rich spike operation".

In order to reduce all of the $NO_x$ released from the $NO_x$ absorbing-reducing catalyst 7, a large amount of $NH_3$ is required during the rich spike operation. Therefore, the air-fuel ratio of the combustion in the cylinder during the rich spike operation is set at a value where the amount of $NO_x$ produced by the combustion becomes the maximum (for example, at the excess air ratio $\lambda \cong 1.4$) in order to increase the amount of $NO_x$ supplied to three-way catalyst 5 and converted into $NH_3$ thereon. Further, the amount of additional fuel injection is set in such a manner that the air-fuel ratio of the exhaust gas after the additional fuel injection becomes a value where the conversion rate of $NO_x$ into $NH_3$ by the three-way catalyst 5 becomes the maximum (for example, at the excess air ratio $\lambda \cong 0.95$).

Next, the function of the $NH_3$ adsorbing-denitrating catalyst 9 in this embodiment will be explained. In this embodiment, a relatively large amount of $NH_3$ is produced at the three-way catalyst 5 during the rich spike operation. Therefore, in some cases, a surplus of $NH_3$, which is not used for reducing $NO_x$ on the $NO_x$ absorbing-reducing catalyst 7 passes through the $NO_x$ absorbing-reducing catalyst 7. This surplus of $NH_3$ is adsorbed by the $NH_3$ adsorbing-denitrating catalyst 9 and stored temporarily therein. On the other hand a small amount of $NO_x$ also passes through the $NO_x$ absorbing-reducing catalyst 7 during the normal operation and flows into the $NH_3$ adsorbing-denitrating catalyst 9. In this embodiment, $NO_x$ passing through the $NO_x$ absorbing-reducing catalyst 7 during the normal operation is reduced by the $NH_3$ adsorbing-denitrating catalyst 9 using the $NH_3$ adsorbed and stored therein during the rich spike operation. Therefore, in this embodiment, the total conversion efficiency of $NO_x$ is improved by the $NH_3$ adsorbing-denitrating catalyst 9 disposed in the exhaust gas passage downstream of the $NO_x$ absorbing-reducing catalyst 7.

As explained above, the amount of $NH_3$ produced by the three-way catalyst 5 largely increases by performing the additional fuel injection. The reason why the amount of the $NH_3$ production increases due to the additional fuel injection will be explained with reference to FIGS. 4 and 5.

Figure 4:
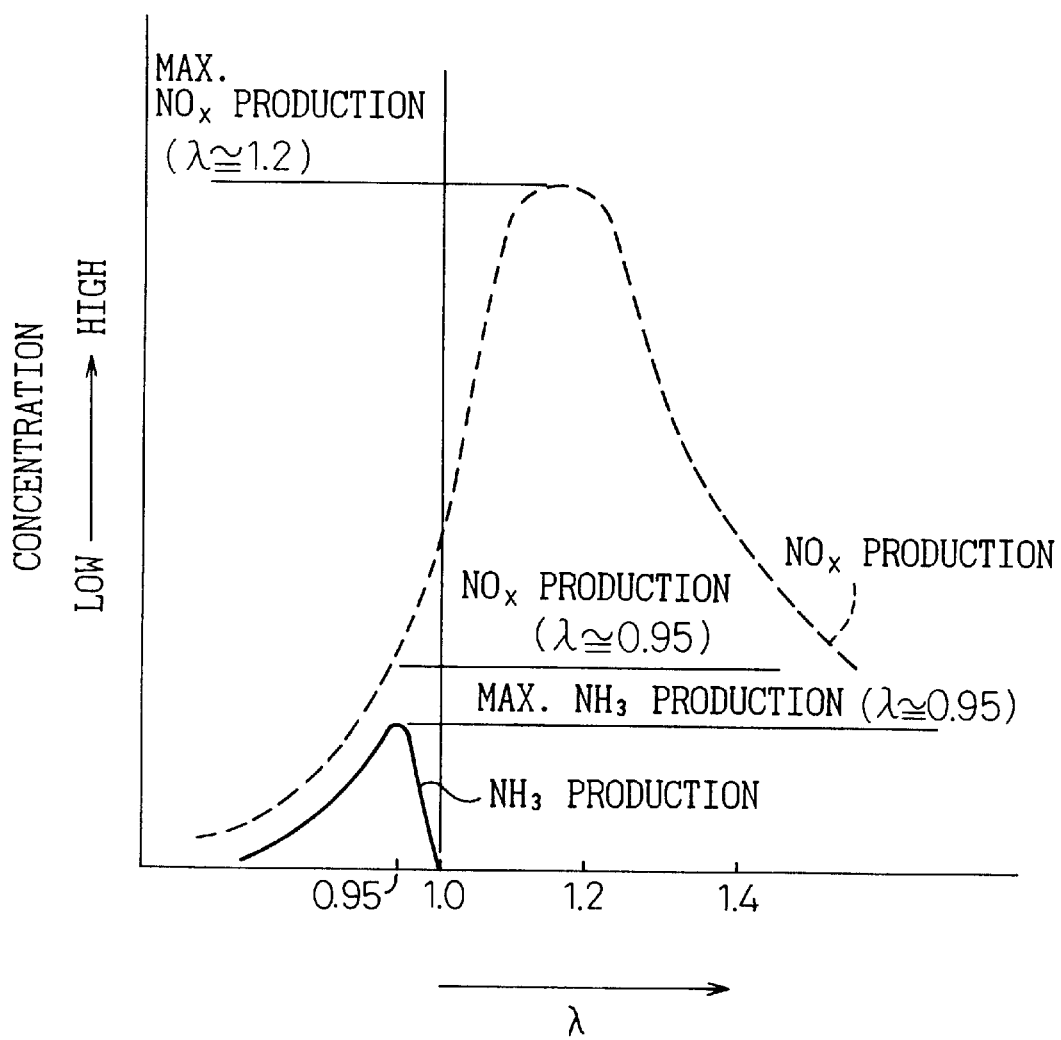
FIG. 4 is a graph showing a typical changes in the amount of $NO_x$ produced in the cylinder and the amount of $NH_3$ produced by a three-way catalyst in accordance with the changes in the excess air ratio of the combustion in the cylinder and the exhaust gas.

In FIG. 4, the broken line represents the change in the amount (the concentration) of $NO_x$ produced by the combustion in the cylinder in accordance with the change in the excess air ratio $\lambda$ of the combustion. As can be seen from FIG. 4, the amount of the $NO_x$ production increases as the excess air ratio $\lambda$ becomes large in the region where the $\lambda$ is relatively small. The amount of the $NO_x$ production in the exhaust gas reaches its maximum value at $\lambda \cong 1.2$ and, in the region where $\lambda \geqq 1.2$, the $NO_x$ production decreases as the $\lambda$ increases. In the embodiment in FIG. 1, since the excess air ratio of the exhaust gas flowing into the three-way catalyst 5 is the same as the excess air ratio of the combustion in the cylinder when the additional fuel injection is not performed, the amount of $NO_x$ in the exhaust gas flowing into the three-way catalyst 5 changes in accordance with the excess air ratio $\lambda$ as shown by the broken line in FIG. 4 when the additional fuel injection is not performed. As explained before, the production rate of $NH_3$ by the three-way catalyst 5 ((i.e., the ratio of the amount of $NO_x$ converted to $NH_3$ to the amount of $NO_x$ flowing into the catalyst 5) changes in accordance with the excess air ratio of the exhaust gas as shown in FIG. 3. Since the amount of $NH_3$ actually produced at the three-way catalyst 5 is given by the product of the amount of $NO_x$ in the exhaust gas (the broken line in FIG. 4) and the production rate of $NH_3$ (the broken line in FIG. 3), the amount of $NH_3$ actually produced at the three-way catalyst changes in accordance with the excess air ratio $\lambda$ of the combustion as shown by the solid line in FIG. 4. Namely, as can be seen from the solid line in FIG. 4, when the excess air ratio $\lambda$ of the combustion is larger than 1.0, $NH_3$ is not produced at all even though the amount of $NO_x$ produced by the combustion is relatively large. In contrast to this, when the λ of the combustion is smaller than 1.0, though the production rate of $NH_3$ of the three-way catalyst increases, the amount of $NO_x$ actually produced by the three-way catalyst 5 becomes relatively small since the amount of $NO_x$ produced by the combustion becomes small in this region of λ. Further, though the production rate of $NH_3$ becomes maximum when the excess air ratio λ becomes smaller than about 0.95, since the amount of $NO_x$ in the exhaust gas further decreases, the amount of the $NH_3$ production decreases as the excess air ratio λ of the combustion decreases. Therefore, as can be seen from the solid line in FIG. 4, though the amount of $NH_3$ produced by the three-way catalyst becomes the maximum at λ≅0.95, the amount of $NH_3$ actually produced is small even at λ≅0.95.

Thus, when the excess air ratio of the combustion in the cylinder and the excess air ratio of the exhaust gas flowing into the three-way catalyst 5 is the same, the excess air ratio of the combustion must be set at the value smaller than 1.0 in order to produce $NH_3$ at the three-way catalyst 5. This causes the decrease in the amount of $NO_x$ produced in the cylinder, and the amount of $NH_3$ actually produced at the three-way catalyst 5 also decreases due to the decrease in the raw material ($NO_x$) in the exhaust gas used for producing $NH_3$.

Figure 5:
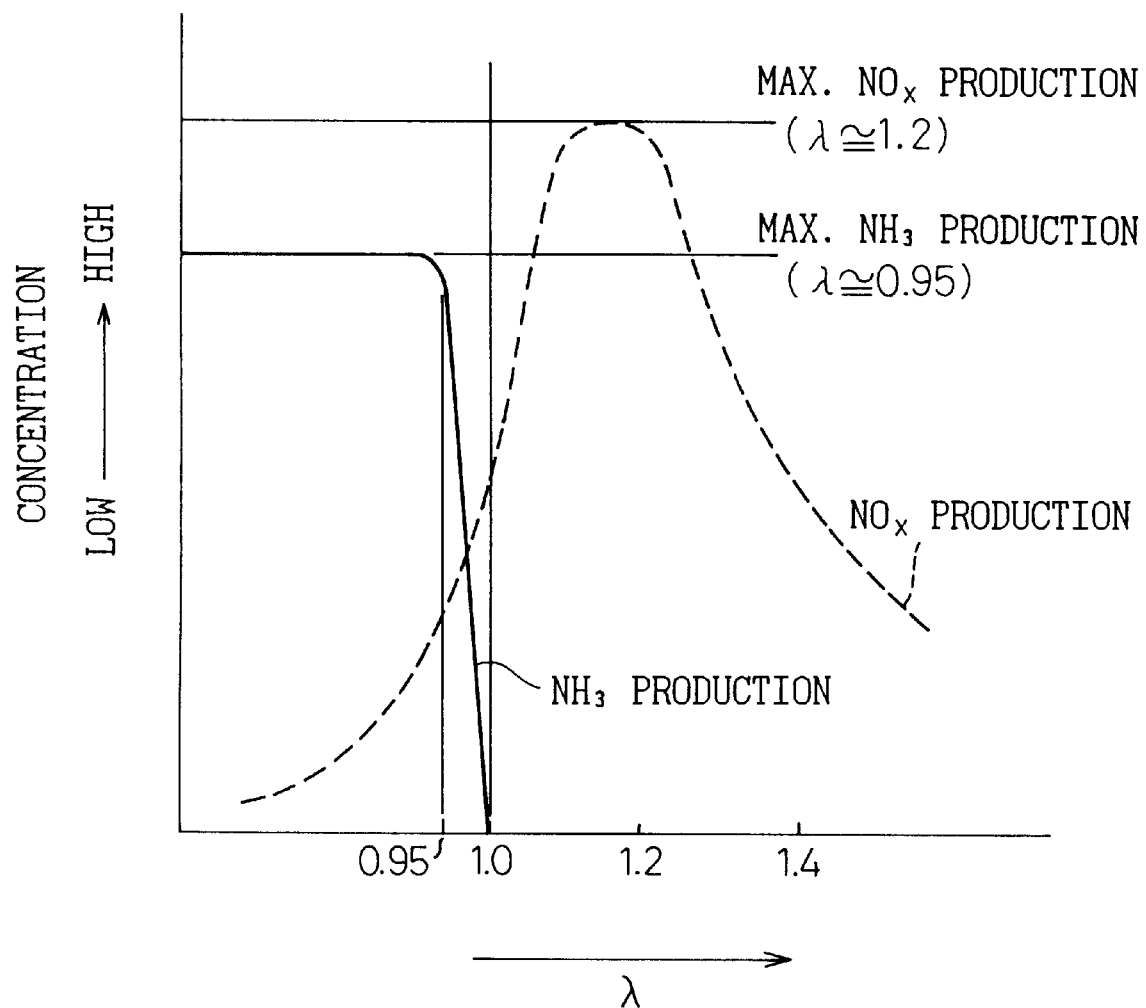
FIG. 5 is a graph showing the change in the amount of $NH_3$ produced by the three-way catalyst in accordance with the change in the excess air ratios of the combustion in the cylinder and the exhaust gas.

FIG. 5 is a graph similar to FIG. 4, showing the amount of $NH_3$ produced by the three-way catalyst 5 when the additional fuel injection is performed. By performing the additional fuel injection, the excess air ratio of the exhaust gas flowing into the three-way catalyst 5 can be changed independently from the excess air ratio of the combustion in the cylinder. Therefore, the excess air ratio of the exhaust gas flowing into the three-way catalyst 5 can be set at 0.95 where the production rate of $NH_3$ becomes the maximum while fixing the excess air ratio of the combustion in the cylinder at 1.2 where the amount of $NO_x$ produced by the combustion becomes the maximum. The solid line in FIG. 5 represents the amount of $NH_3$ produced at the three-way catalyst 5 when the excess air ratio of the combustion in the cylinder is fixed at λ=1.2. In this case, the amount of $NH_3$ produced at the catalyst 5 changes in the manner similar to the solid line in FIG. 3 and, when the excess air ratio of the exhaust gas flowing into the catalyst 5 becomes lower than about 0.95, a large amount of $NH_3$ is produced by the three-way catalyst 5.

Further, when the additional fuel injection is performed, the amount of the smaller molecular weight hydrocarbons increases due to the cracking of fuel injected by the additional fuel injection. Smaller molecular weight (light) hydrocarbons have higher activities compared to heavy hydrocarbons and readily produce CO and $H_2$, by the water gas reactions, on the three-way catalyst. As explained before, CO and $H_2$ are required for converting $NO_x$ to $NH_3$. Therefore, since the amount of CO and $H_2$ are also increased due to the additional fuel injection, the amount of $NH_3$ produced at the three-way catalyst further increases due to the additional fuel injection. Further, the light hydrocarbons, CO and $H_2$ in the exhaust gas are very capable of reducing $NO_x$ by themselves on the $NO_x$ absorbing-reducing catalyst and $NH_3$ adsorbing-denitrating catalyst. Therefore, light hydrocarbons, CO and $H_2$ produced by the additional fuel injection are utilized to reduce $NO_x$ at the $NO_x$ absorbing-reducing catalyst and $NH_3$ adsorbing-denitrating catalyst even if those components are not converted into $NH_3$ at the three-way catalyst.

In the embodiment in FIG. 1, the excess air ratio of the combustion in the cylinders is set at λ≅1.2 during the rich spike operation, and the excess air ratio of the exhaust gas flowing into the three-way catalyst 5 is adjusted at λ≅0.95 by the additional fuel injection in order to increase the amount of $NH_3$ produced at the three-way catalyst 5 to the maximum.

Figure 6:
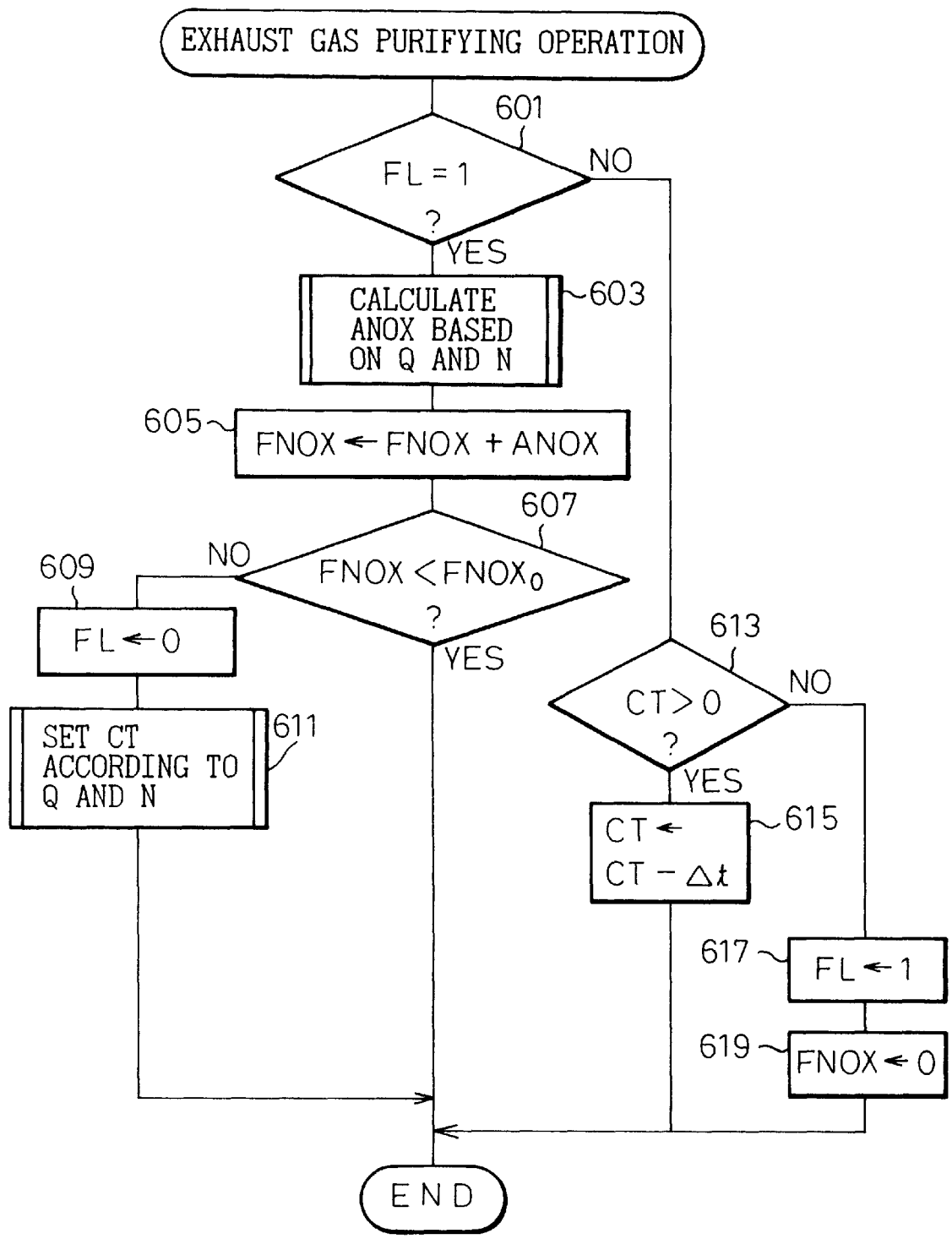
FIG. 6 is a flowchart explaining the exhaust gas purifying operation of the embodiment in FIG. 1.

FIG. 6 is a flowchart explaining the exhaust gas purifying operation of the present embodiment. This operation is performed by a routine executed by the control circuit 30 at predetermined intervals.

In FIG. 6, at step 601, the operation determines whether the value of a lean operation flag FL is set at 1. The value of the lean operation flag FL represents whether the rich spike operation (and the additional fuel injection) should be performed and, FL=1 means that the rich spike operation should not be performed. When FL=1 at step 601, this means that the exhaust gas with the excess air ratio same as that of the combustion in the cylinders flows into the three-way catalyst 5. The value of the flag FL is set at steps 609 and 617 as explained later.

If FL=1 at step 601, the operation performs step 603 and 605 to calculate the amount FNOX of $NO_x$ absorbed and stored in the $NO_x$ absorbing-reducing catalyst 7.

In this embodiment, the amount of $NO_x$ produced by the engine 1 per unit time (ANOX) is actually measured beforehand by operating the actual engine under various engine load conditions (such as air intake amount Q, engine speed N), and the measured amounts of produced $NO_x$ are stored in the ROM of the ECU 30 in the form of a numerical table using the engine air intake amount Q and speed N as parameters. At step 603, the amount of $NO_x$ (ANOX) produced by the engine per unit time is determined from this numerical table based on Q and N. The unit time used for measuring ANOX is set at, for example, a time the same as the interval of the execution of the routine for performing the operation in FIG. 6. At step 605, the amount FNOX of $NO_x$ stored in the $NO_x$ absorbing-reducing catalyst is obtained by accumulating the values of ANOX. The amount of $NO_x$ absorbed in the $NO_x$ absorbing-reducing catalyst per unit time is proportional to the amount of $NO_x$ flows into the catalyst per unit time (i.e. ANOX). Since FNOX is the integrated value of ANOX, the value of FNOX represents the amount of $NO_x$ stored in the $NO_x$ absorbing-reducing catalyst.

After calculating the amount FNOX, the operation determines whether the amount FNOX, i.e., the amount of $NO_x$ stored in the $NO_x$ absorbing-reducing catalyst 7 reaches a predetermined value $FNOX_0$. The value $FNOX_0$ corresponds to an amount of the absorbed $NO_x$ where the capability of the $NO_x$ absorbing-reducing catalyst for absorbing $NO_x$ in the exhaust gas starts to decrease and, in this embodiment, is set at a value around 70% of the maximum amount of $NO_x$ which the $NO_x$ absorbing-reducing catalyst can store (i.e., about 70% of the saturating amount). If FNOX<$FNOX_0$ at step 607, since the $NO_x$ absorbing-reducing catalyst still has a sufficient capacity for absorbing $NO_x$ in the exhaust gas, the operation immediately terminates, i.e., the lean air-fuel ratio operation of the engine is continued.

However, if FNOX≧$FNOX_0$ at step 607, since the ability of the $NO_x$ absorbing-reducing catalyst started to decrease due to the increase in the absorbed $NO_x$, the operation performs step 609 to reset the value of the lean operation flag FL to 0 and step 611 to determine the value of a counter CT which represents the length of the period for performing the rich spike operation.

The value of the counter CT, i.e., the length of the period for performing the rich spike operation must be determined in such a manner that the total amount of $NH_3$, HC and CO produced by the additional fuel injection during the rich spike operation is sufficiently large for reducing the amount of $NO_x$ stored in the $NO_x$ absorbing-reducing catalyst 7. Though the amount of the $NO_x$ when the rich spike operation starts is a fixed value (for example, about 70% of the saturation amount), the amount of $NO_x$ and HC, CO produced by the engine per unit time varies depending on the operating condition (air intake amount Q and engine speed N) of the engine during the rich spike operation. Therefore, the amount of $NH_3$ produced at the three-way catalyst 5 per unit time also varies depending on the operating condition of the engine. Thus, in this embodiment, the length of the period for performing the rich spike operation is changed in accordance with the operating condition of the engine so that a sufficient amount of $NH_3$, for reducing all the $NO_x$ stored in the $NO_x$ absorbing-reducing catalyst 7 is produced during the rich spike operation. For example, when the amount of $NO_x$ produced by the engine per unit time is small, the length of the period for performing the rich spike operation (the additional fuel injection) must be set longer, and if the amount of $NO_x$ produced by the engine per unit time is large, the length of the period must be set shorter in this embodiment.

In this embodiment, the amount of $NH_3$ required for reducing the amount of $NO_x$ corresponding to the value $FNOX_0$ of the counter FNOX is measured previously, and the time required for producing this amount of $NH_3$ on the $NH_3$ conversion means are measured by operating the engine under various load conditions. The measured time required for producing the required amount of $NH_3$ for reducing the amount of $NO_x$ corresponding to the value $FNOX_0$ is stored in the ROM of the control circuit 30 in the form of a numerical table using Q and N as parameters. The required time CT is determined from Q and N at step 611 using this numerical table.

When the value of the lean operation flag FL is set to 0 (step 609), step 613 is performed after step 601 when the operation is next performed. In the steps 613 through 619, the value of the counter CT is reduced by $\Delta t$ every time the operation is performed at step 615 ($\Delta t$ is the interval of the execution of the operation). When the time CT has elapsed, i.e., when the value of the CT becomes less than 0 at step 613, the value of the lean operation flag FL is set to 1 at step 617. Further, the counter FNOX which represents the amount of $NO_x$ stored in the $NO_x$ absorbing-reducing catalyst 7 is reset to 0 at step 619. By the operation in FIG. 6, the rich spike operation is performed for a time period CT determined by the engine operating condition. During the rich spike operation, the additional fuel injection is performed for adjusting the air-fuel ratio of the exhaust gas to a rich air-fuel ratio. Therefore, the exhaust gas with a rich air-fuel ratio and containing a large amount of $NO_x$ flows into the three-way catalyst 5 and, thereby, a large amount of $NH_3$ is produced at the three-way catalyst 5. Thus, the exhaust gas flowing through the three-way catalyst 5 which contains a large amount of $NH_3$ is supplied to the $NO_x$ absorbing-reducing catalyst 7, and the $NO_x$ released from the $NO_x$ absorbing-reducing catalyst 7 is reduced by reacting with $NH_3$ in the exhaust gas.

When the predetermined time CT has elapsed, the lean operation flag FL is set to 1 (step 617), and the lean air-fuel ratio operation of the engine is resumed. Thus, the $NO_x$ absorbing-reducing catalyst 7, after releasing and reducing all the absorbed $NO_x$, restarts the absorbing of $NO_x$ in the exhaust gas.

Figure 7:
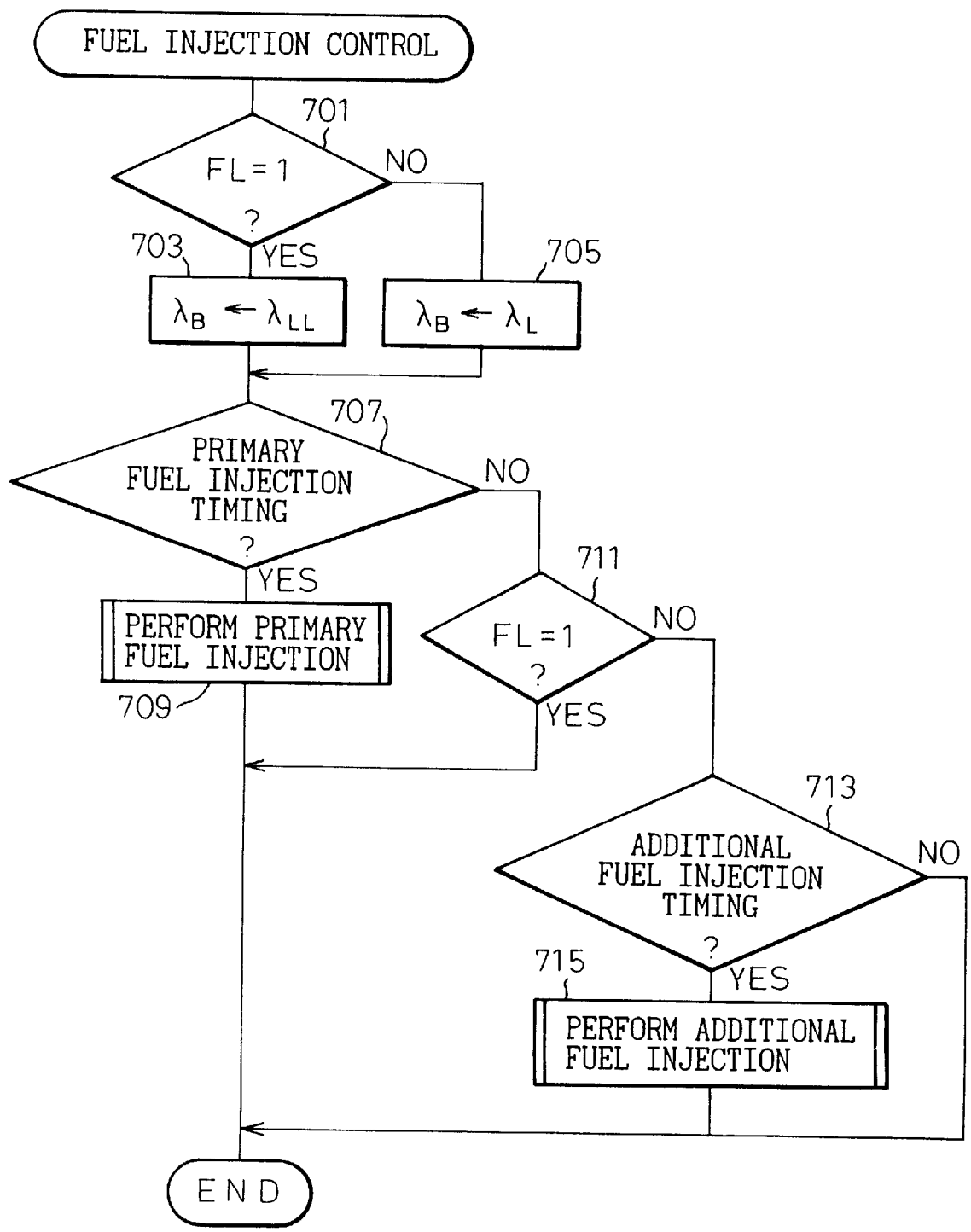
FIG. 7 is a flowchart explaining the fuel injection control operation performed in the exhaust gas purifying operation in FIG. 6.

FIG. 7 is a flowchart explaining the fuel injection control operation in the present embodiment. This operation is performed by a routine executed by the control circuit 30 at a predetermined rotation angle of the crankshaft of the engine 1.

In FIG. 7, at step 701, the operation determines whether the value of the lean operation flag FL is set at 1. The fuel injection is performed in steps 703 through 715 in accordance with the value of the flag FL.

When FL=1 at step 701, i.e., when the rich spike operation is not performed, the excess air ratio $\lambda_B$ of the combustion of the respective cylinders is set at $\lambda_{LL}$ at step 703. $\lambda_{LL}$ is an excess air ratio of the combustion where the amount of $NO_x$ produced by the combustion becomes small and, in this embodiment, $\lambda_{LL}$ is set at about 1.4. If FL$\neq$1 at step 701, i.e., if the rich spike operation is being performed, $\lambda_B$ of the respective cylinders is set at a value $\lambda_L$ where the amount of $NO_x$ produced by the combustion becomes the maximum ($\lambda_L \approx 1.2$).

When the excess air ratio $\lambda_B$ of the respective cylinders is set at either of steps 703 and 705, the fuel injection amount required for setting the excess air ratio of the combustion at $\lambda_B$ is calculated by the fuel injection amount calculating operation (not shown) performed by the control circuit 30. In this embodiment, the required fuel injection amount is calculated based on, for example, an air intake amount per one revolution of the engine (Q/N).

Then, at step 707, the operation determines whether it is the primary fuel injection timing of any one of the cylinders. If it is the primary fuel injection timing of any of the cylinders, the primary fuel injection is performed in that cylinder. Thus, combustion with the excess air ratio $\lambda_B$ is performed in the cylinder. If it is not the primary fuel injection timing of any of the cylinders, the operation executes step 711 to determine whether an additional fuel injection is required, based on the value of the flag FL. If FL$\neq$1 at step 711, since this means that the additional fuel injection is required, the operation proceeds to step 713 to determine whether it is the timing for the additional fuel injection of any of the cylinders. If it is the additional fuel injection timing of any of the cylinders, the additional fuel injection is performed in that cylinder at step 715. The amount of additional fuel injection is determined by the operation performed by the control circuit 30 (not shown) so that the excess air ratio of the exhaust gas leaving the cylinder becomes the value $\lambda_A$ where the production rate of $NH_3$ by the three-way catalyst 5 becomes the maximum (for example, $\lambda_A$=0.95).

As explained above, in the operations in FIGS. 6 and 7, the additional fuel injection is performed in the respective cylinders every time the amount of $NO_x$ absorbed in the $NO_x$ absorbing-reducing catalyst 7 reaches a predetermined value, in order to release $NO_x$ from the $NO_x$ absorbing-reducing catalyst and reduce the same. The length of the period for performing the additional fuel injection is determined in accordance with the operating condition of the engine such as the amount of $NO_x$ produced by the engine per unit time.

Further, though the total amount of $NH_3$ produced by the three-way catalyst 5, i.e., the total amount of $NH_3$ supplied to the $NO_x$ absorbing-reducing catalyst 7, is controlled by adjusting the length of the period for performing additional fuel injection, the total amount of $NH_3$ supplied to the $NO_x$ absorbing-reducing catalyst may be controlled by adjusting the air-fuel ratio of the exhaust gas flowing into the three-way catalyst 5. Namely, as can be seen from FIG. 5, the production rate of $NH_3$ of the three-way catalyst 5 can be changed between 0 and its maximum value by changing the excess air ratio of the exhaust gas within the range $\lambda=0.95-1.0$. Therefore, the total amount of $NH_3$ produced by the three-way catalyst may be controlled by adjusting the excess air ratio of the exhaust gas flowing into the three-way catalyst within the range $\lambda=0.95-1.0$. Since the amount of $NH_3$ produced by the three-way catalyst 5 per unit time changes in accordance with the excess air ratio of the exhaust gas, the total amount of $NH_3$ produced by the three-way catalyst 5 can be adjusted by changing the excess air ratio of the exhaust gas without changing the length of the period for performing the additional fuel injection. In this case, for example, the value of CT is set at a constant at step 611 in FIG. 6. Further, the operation calculates the required production rate of $NH_3$ based on the amount of $NH_3$ required for reducing the amount of $NO_x$ absorbed in the $NO_x$ absorbing-reducing catalyst and the fixed time CT. The additional fuel injection amount is determined in such a manner that the excess air ratio $\lambda_A$ of the exhaust gas flowing into the three-way catalyst 5 becomes a value which gives the required production rate of $NH_3$.

Figure 8:
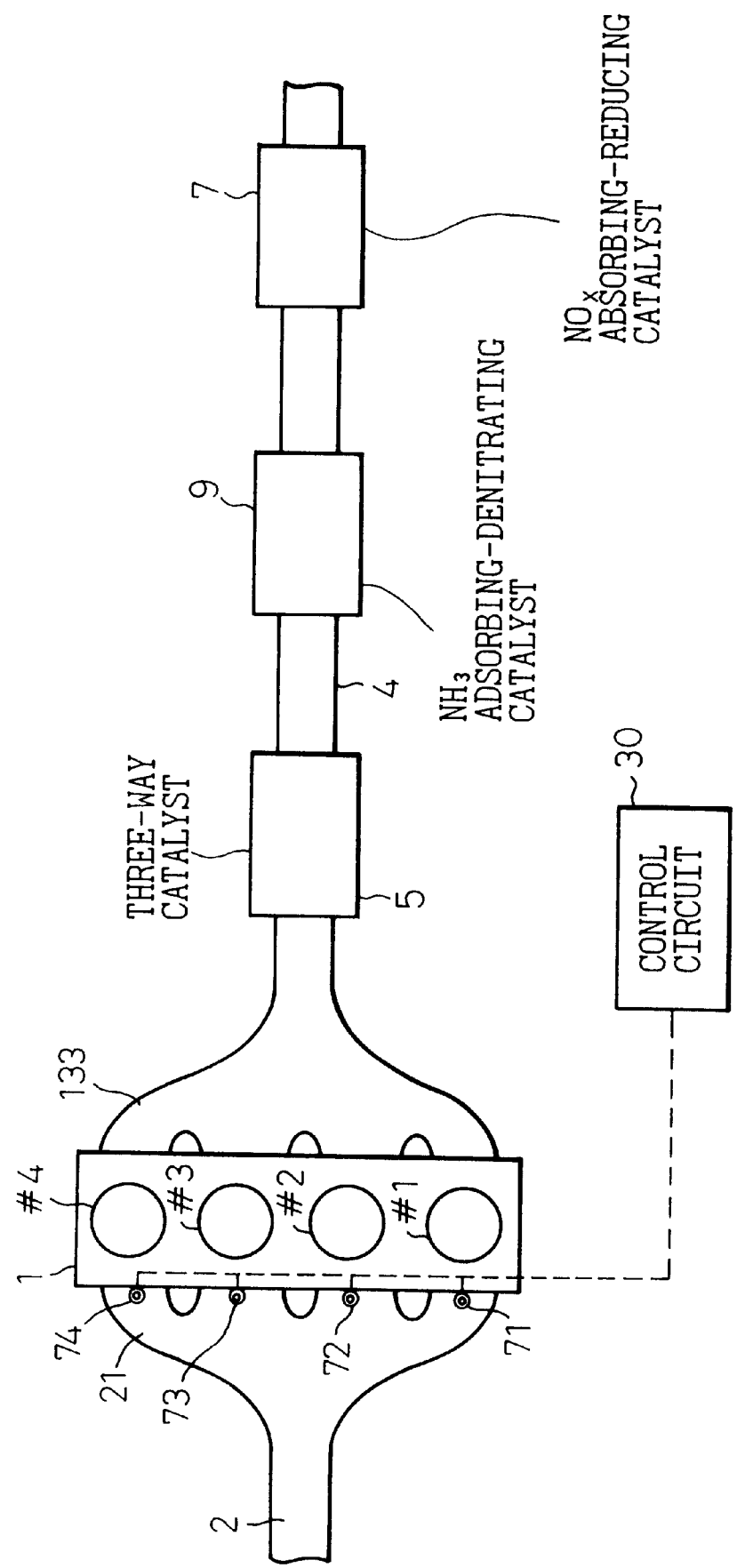
FIG. 8 schematically illustrates the general configuration of another embodiment of the exhaust gas purification device according to the present invention.

In this embodiment, the three-way catalyst 5, $NO_x$ absorbing-reducing catalyst 7 and $NH_3$ adsorbing-denitrating catalyst 9 are disposed in the exhaust gas passage 4 in this order from the upstream end. In this arrangement, the $NO_x$ absorbing-reducing catalyst 7 mainly purifies $NO_x$ in the exhaust gas, and the $NH_3$ adsorbing-denitrating catalyst 9 only purifies a small amount of $NO_x$ passing through the $NO_x$ absorbing-reducing catalyst 7. However, the positions of the $NO_x$ absorbing-reducing catalyst 7 and the $NH_3$ adsorbing-denitrating catalyst 9 may be interchanged. Namely, the three-way catalyst 5, the $NH_3$ adsorbing-denitrating catalyst 9 and $NO_x$ absorbing-reducing catalyst 7 may be disposed in the exhaust gas passage 4 in this order from the upstream end, as shown in FIG. 8. In this case, the $NH_3$ adsorbing-denitrating catalyst 9 mainly purifies $NO_x$ in the exhaust gas. During the normal operation (i.e., when the rich spike operation is not performed), since the air-fuel ratio of the exhaust gas flowing into the three-way catalyst 5 is lean, $NH_3$ is not produced at the three-way catalyst 5. Therefore, the $NH_3$ adsorbing-denitrating catalyst 9 purifies $NO_x$ in the exhaust gas during the normal operation using $NH_3$ it has adsorbed and stored therein. Thus, the amount of $NH_3$ stored in the $NH_3$ adsorbing-denitrating catalyst 9 decreases during the normal operation of the engine. Further, the $NO_x$ absorbing-reducing catalyst 7 absorbs $NO_x$ passing through the $NH_3$ adsorbing-denitrating catalyst 9 without being reduced during the normal operation. Thus, the amount of $NO_x$ absorbed in the $NO_x$ absorbing-reducing catalyst 7 gradually increases during the normal operation. Therefore, in this case, the rich spike operation is performed when the amount of $NH_3$ stored in the $NH_3$ adsorbing-denitrating catalyst 9 decreases to a predetermined value. When the rich spike operation is performed, $NH_3$ is produced at the three-way catalyst and the exhaust gas with a rich air-fuel ratio and containing $NH_3$ flows into the $NH_3$ adsorbing-denitrating catalyst 9. This causes the $NH_3$ adsorbing-denitrating catalyst 9 to adsorb $NH_3$ in the exhaust gas. Further, a rich air-fuel ratio exhaust gas containing a surplus of $NH_3$ flows into the downstream $NO_x$ absorbing-reducing catalyst 7, $NO_x$ absorbed in the $NO_x$ absorbing-reducing catalyst is released and reduced by the rich air-fuel ratio exhaust gas containing $NH_3$. The detail of the exhaust gas purifying operation of the embodiment in FIG. 8 will be explained later using FIG. 11.

Figure 9:
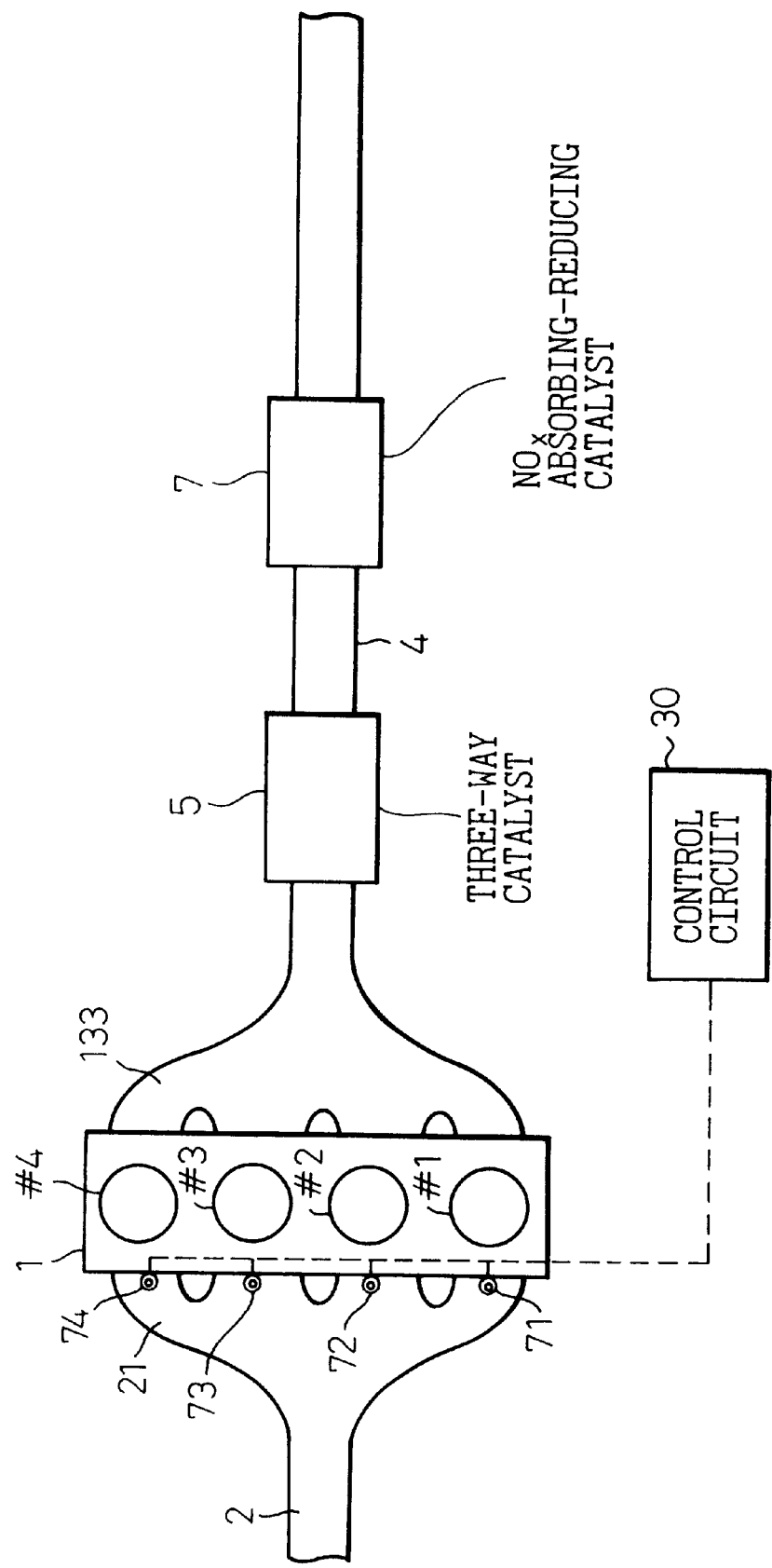
FIG. 9 schematically illustrates the general configuration of another embodiment of the exhaust gas purification device according to the present invention.

FIG. 9 is a drawing similar to FIG. 1 showing the general configuration of another embodiment of the present invention. The arrangement of FIG. 9 is different from that of FIG. 1 in that the $NH_3$ adsorbing-denitrating catalyst 9 in FIG. 1 is removed in FIG. 9. Namely, only the three-way catalyst 5 and the $NO_x$ absorbing-reducing catalyst 7 are disposed in the exhaust gas passage 4 from the upstream end in this order in FIG. 9. Since the $NH_3$ adsorbing-denitrating catalyst 9 in the embodiment in FIG. 1 only acts as an ancillary means for purifying $NO_x$ in the exhaust gas, the efficiency for purifying $NO_x$ does not lower largely even if the $NH_3$ adsorbing-denitrating catalyst 9 is removed. Therefore, by using only the three-way catalyst 5 and the $NO_x$ absorbing-reducing catalyst 7 as shown in FIG. 9, the exhaust gas purification device can be largely simplified. The exhaust gas purifying operation of the embodiment in FIG. 9 is the same as those in FIGS. 6 and 7.

Figure 10:
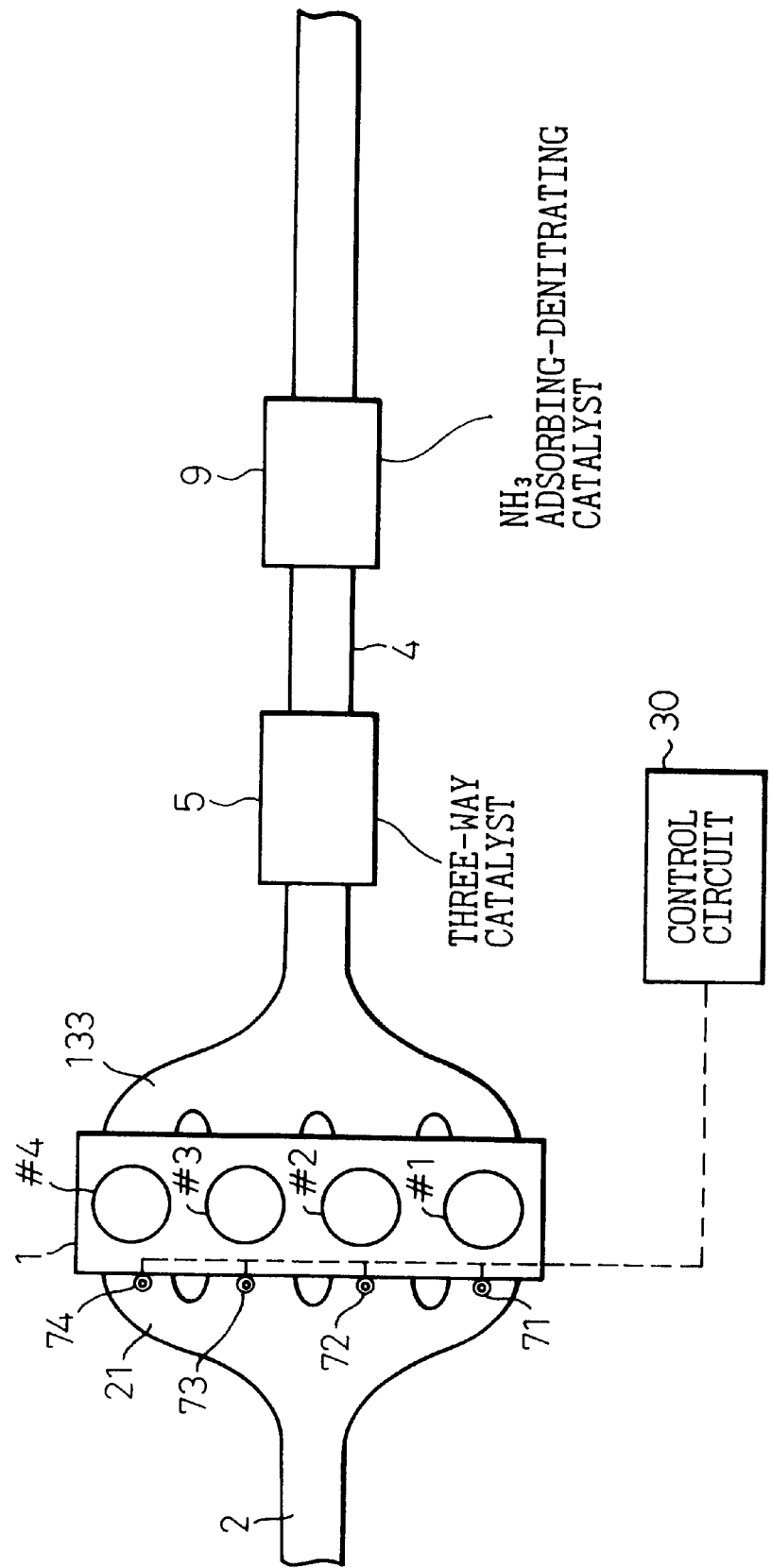
FIG. 10 schematically illustrates the general configuration of another embodiment of the exhaust gas purification device according to the present invention.

Next, another embodiment of the present invention is explained with reference to FIG. 10. As can be seen from FIG. 10, the $NO_x$ absorbing-reducing catalyst 7 is not provided in this embodiment, and only the three-way catalyst 5 and the $NH_3$ adsorbing-denitrating catalyst 9 are disposed in the exhaust gas passage 4 in this order from the upstream end.

As explained before, the $NH_3$ adsorbing-denitrating catalyst 9 is capable of reducing $NO_x$ in the exhaust gas by reacting $NO_x$ with $NH_3$. Further, since the $NH_3$ adsorbing-denitrating catalyst is capable of adsorbing and storing $NH_3$ in the exhaust gas which is not used for reducing $NO_x$, the $NH_3$ adsorbing-denitrating catalyst is also capable of reducing $NO_x$ using $NH_3$ adsorbed and stored therein even when $NH_3$ is not contained in the exhaust gas. In this embodiment, the rich spike operation is performed for producing $NH_3$ at the three-way catalyst 5 and for causing the $NH_3$ adsorbing-denitrating catalyst 9 to adsorb and store $NH_3$. The $NH_3$ adsorbing-denitrating catalyst 9 reduces $NO_x$ in the lean air-fuel ratio exhaust gas during the normal operation using $NH_3$ stored therein. Therefore, $NH_3$ stored in the $NH_3$ adsorbing-denitrating catalyst 9 is used for reducing $NO_x$ in the exhaust gas and decreases during the normal operation. Therefore, it is necessary to replenish $NH_3$ adsorbing-denitrating catalyst 9, with $NH_3$, before it uses up all the stored $NH_3$.

In the exhaust gas purifying operation of the present embodiment, the operation estimates the amount of $NH_3$ stored in the $NH_3$ adsorbing-denitrating catalyst 9 during the normal operation of the engine. When the amount of $NH_3$ stored in the $NH_3$ adsorbing-denitrating catalyst decreases to a predetermined value, the operation performs rich spike operation in order to replenish the $NH_3$ adsorbing-denitrating catalyst with $NH_3$. Thus, according to this embodiment, a shortage of $NH_3$ required for reducing $NO_x$ in the exhaust gas does not occur.

Figure 11:
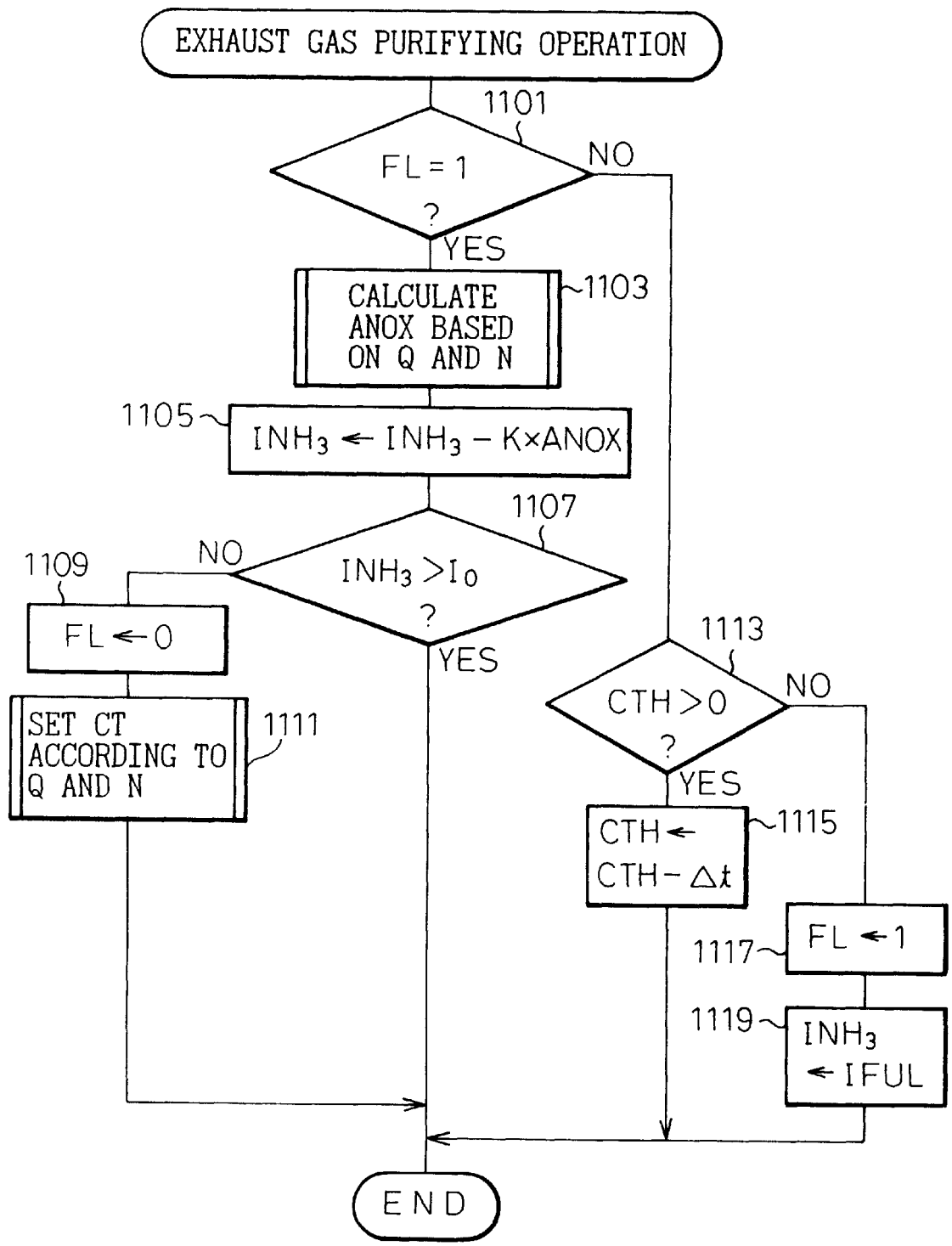
FIG. 11 is a flowchart explaining the exhaust gas purifying operation of the embodiment in FIG. 10.

FIG. 11 is a flowchart explaining the exhaust gas purifying operation of the present embodiment. This operation is performed by a routine executed by the control circuit 30 at predetermined intervals.

In the operation in FIG. 11, the operation estimates the amount of $NH_3$ ($INH_3$) stored in the $NH_3$ adsorbing-denitrating catalyst 9 based on the amount of $NO_x$ produced by the engine per unit time (ANOX). Further, when $INH_3$ decreases to a lower limit $I_0$, the operation performs the rich spike operation in order to increase the amount of $NH_3$ stored in the $NH_3$ adsorbing-denitrating catalyst to the value IFUL near the saturation amount.

In FIG. 11, at step 1101, the operation determines whether the lean operation flag FL is set to 1. If FL=1, then, the operation continues the lean air-fuel ratio operation of the engine and calculates ANOX (the amount of $NO_x$ produced by the engine per unit time) based on the air intake amount Q and the engine speed N at step 1103. Steps 1101 and 1103 are operations the same as steps 601 and 603 in FIG. 6. At step 1105, $INH_3$ (the amount of $NH_3$ stored in the $NH_3$ adsorbing-denitrating catalyst 9) is calculated by $INH_3 = INH_3 - K \times ANOX$. During the lean air-fuel ratio operation, the $NH_3$ adsorbing-denitrating catalyst 9 reduces $NO_x$ in the exhaust gas using $NH_3$ stored in the catalyst 9. Therefore, the decrease in the $NH_3$ held in the $NH_3$ adsorbing-denitrating catalyst 9 per unit time is proportional to the amount of $NO_x$ produced by the engine per unit time. Thus, if the amount ANOX of $NO_x$ is produced by the engine per unit time, the amount of $NO_x$ held (stored) in the $NH_3$ adsorbing-denitrating catalyst 9 decreases by $K \times ANOX$ per unit time (K is a constant). Therefore, the amount of $NO_x$ held in the $NH_3$ adsorbing-denitrating catalyst 9 is obtained by subtracting ($K \times ANOX$) from the value $INH_3$ at step 1105.

At step 1107, the operation determines whether the amount $INH_3$ calculated at step 1105 decreases to a predetermined value $I_0$. The value $I_0$ is, for example, set at 20 to 30% of the maximum amount of $NH_3$ which the $NH_3$ adsorbing-denitrating catalyst can hold (i.e., 20 to 30% of the saturating amount). If $INH_3 > I_0$ at step 1107, the operation continues the lean air-fuel ratio operation of the engine 1. However, if $INH_3 \leq I_0$ at step 1107, the operation performs the rich spike operation of the engine to supply $NH_3$ to the $NH_3$ adsorbing-denitrating catalyst 9.

In this case, the lean operation flag FL is set to 0 at step 1109, and the length CTH of the period for performing the additional fuel injection is determined at step 1111 in accordance with the air intake amount Q and speed N of the engine 1. As explained in FIG. 6, the amount of $NH_3$ produced by the three-way catalyst 5 per unit time during the rich spike operation changes in accordance with the engine operating condition (i.e., the amount of $NO_x$ produced by the engine per unit time). Further, in this embodiment, it is necessary to supply the amount of $NO_x$ sufficient for increasing the $NH_3$ stored in the $NH_3$ adsorbing-denitrating catalyst 9 from the lower limit $I_0$ to the maximum value IFUL during the rich spike operation. Therefore, the length CTH of the period for performing the additional fuel injection is determined based on the amount of $NO_x$ produced by the engine per unit time. The period CTH is the time sufficient for increasing the amount of $NH_3$ stored in the $NH_3$ adsorbing-denitrating catalyst 9 from $I_0$ to IFUL. The value of CTH is measured previously by operating the actual engine under various conditions of the air intake amount Q and the speed N, and stored in the ROM of the control circuit 30 in the form of a numerical table using Q and N as parameters. At step 1111, CTH is determined from the air intake amount Q and the speed N based on the numerical table.

When the lean operation flag FL is set to 0 at step 1109, step 1113 is executed after step 1101 when the operation is next performed, and the additional fuel injection is performed for the period CTH. When the time CTH has elapsed (step 1113), the lean operation flag FL is set to 1 (step 1117) to terminate the additional fuel injection, and the value of the counter $INH_3$ which represents the amount of $NH_3$ stored in the $NH_3$ adsorbing-denitrating catalyst 9 is set to IFUL (step 1119). The fuel injection control operation in FIG. 7 is performed also in this embodiment in order to perform the primary fuel injection and/or the additional fuel injection according to the value of the lean operation flag FL.

As explained above, in the operations in FIG. 11 and FIG. 7, the additional fuel injection of the respective cylinders is performed when the amount of $NH_3$ stored in the $NH_3$ adsorbing-denitrating catalyst 9 decreases to a predetermined value, and increases the amount of $NH_3$ in the $NH_3$ adsorbing-denitrating catalyst 9 to a value near the saturating amount. Further, the period for performing the additional fuel injection is determined in accordance with the engine operating condition such as the amount of $NO_x$ produced by the engine per unit time.

Further, as explained before, the operations of FIGS. 11 and 7 are performed also in the embodiment in FIG. 8. The amount of the additional fuel injection instead of the length CTH of the period for performing the additional fuel injection may also be adjusted in accordance with the engine operating condition in the embodiment in FIG. 10.

Next, embodiments different from the embodiments in FIGS. 1 and 8 through 10 will be explained using FIGS. 12 through 22. In the embodiments in FIGS. 1 and 8 through 10, the exhaust gas from all of the cylinders flows through the three-way catalyst 5 which acts as the $NH_3$ conversion means. However, in the embodiments explained hereinafter, the exhaust gas from only some of the cylinders flows through the $NH_3$ conversion means.

First, the embodiment in FIG. 12 will be explained.

Figure 12:
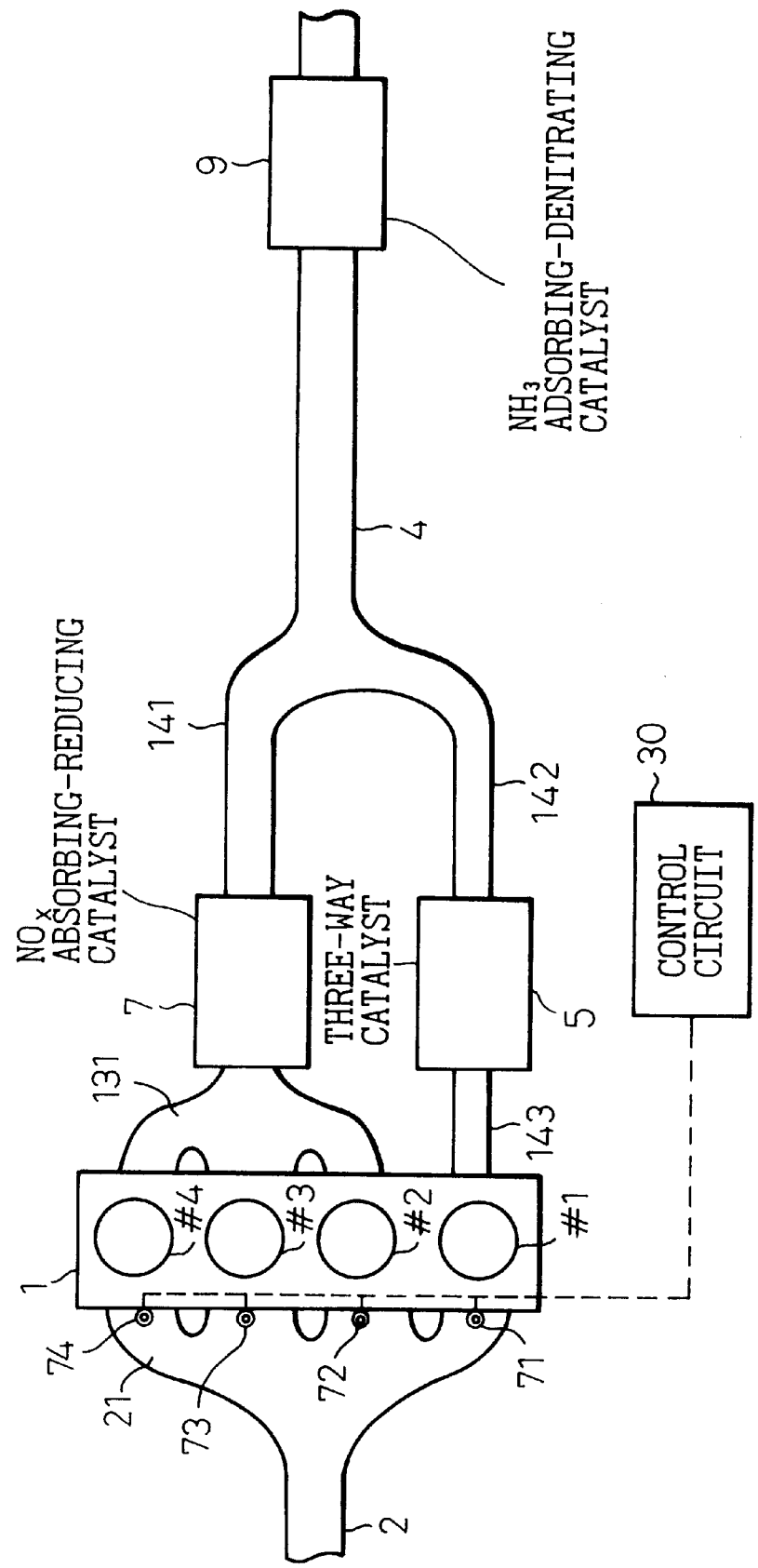
FIG. 12 schematically illustrates the general configuration of another embodiment of the exhaust gas purification device according to the present invention.

As can be seen from FIG. 12, No. 1 cylinder of the engine 1 is directly connected to a three-way catalyst 5 via an exhaust gas passage 143, and No. 2 through No. 4 cylinders are connected to a $NO_x$ absorbing-reducing catalyst 7 via an exhaust manifold 131. The three-way catalyst 5 and the $NO_x$ absorbing-reducing catalyst 7 are connected to a common exhaust gas passage 4 through exhaust gas passages 142 and 141 downstream thereof, respectively. An $NH_3$ adsorbing-denitrating catalyst 9 is disposed in the common exhaust gas passage 4. Namely, $NH_3$ produced by the three-way catalyst 5 is supplied only to the $NH_3$ adsorbing-denitrating catalyst 9 in this embodiment. Further, the additional fuel injection is performed on No. 1 cylinder during the normal operation as well as during the rich spike operation of the engine in this embodiment.

The exhaust gas purifying operation in this embodiment is now explained.

In the normal operation, No. 2 through No. 4 cylinders are operated at an excess air ratio where the amount of $NO_x$ produced by the combustion becomes the minimum (for example, excess air ratio about 1.4). Therefore, the air-fuel ratio of the exhaust gas flowing into the $NO_x$ absorbing-reducing catalyst 7 from No. 2 through No. 4 cylinders are lean during the normal operation. Thus, $NO_x$ produced in No. 2 through No. 4 cylinders during the normal operation is absorbed by the $NO_x$ absorbing-reducing catalyst 7 and removed from the exhaust gas.

On the other hand, No. 1 cylinder is always operated at an excess air ratio where the amount of $NO_x$ produced by the combustion becomes the maximum (for example, excess air ratio about 1.2) in this embodiment. Further, the additional fuel injection is always performed on the No. 1 cylinder to adjust the excess air ratio of the exhaust gas from No. 1 cylinder at a value where the production rate of $NH_3$ by the three-way catalyst 5 becomes the maximum (for example, the excess air ratio about 0.95). Thus, a part of $NO_x$ in the exhaust gas from No. 1 cylinder is reduced at the three-way catalyst 5, and a portion of the remaining part of $NO_x$ is converted into $NH_3$. Namely, a relatively large amount of $NH_3$ is produced at the three-way catalyst 5.

The exhaust gas from the $NO_x$ absorbing-reducing catalyst 7 and the exhaust gas from the three-way catalyst 5 flow into the common exhaust gas passage 4 through the exhaust gas passages 141 and 142, and mix with each other in the passage 4. The exhaust gas from the $NO_x$ absorbing-reducing catalyst 7 is at a lean air-fuel ratio (an excess air ratio about 1.4) and contains a very small amount of $NO_x$ which passes through the $NO_x$ absorbing-reducing catalyst 7. The exhaust gas from the three-way catalyst 5 is at a rich air-fuel ratio (an excess air ratio about 0.95) and contains a large amount of $NH_3$. When these exhaust gases mix with each other, exhaust gas at a lean air-fuel ratio (an excess air ratio about 1.3) and containing a very small amount of $NO_x$ and a large amount of $NH_3$ is formed. When this exhaust gas flows into the $NH_3$ adsorbing-denitrating catalyst 9 in the common exhaust gas passage 4, all the $NO_x$ in the exhaust gas is reduced by reacting with $NH_3$ at the $NH_3$ adsorbing-denitrating catalyst, and a part of surplus $NH_3$ (i.e., $NH_3$ not used for reducing $NO_x$) is adsorbed by the $NH_3$ adsorbing-denitrating catalyst 9. Further, since the air-fuel ratio of the exhaust gas flowing into the $NH_3$ adsorbing-denitrating catalyst 9 is lean, the remaining part of $NH_3$ is purified on the $NH_3$ adsorbing-denitrating catalyst 9 and, thereby, the exhaust gas flowing through the $NH_3$ adsorbing-denitrating catalyst 9 does not contain $NO_x$ nor $NH_3$.

However, when the normal operation continues for a certain period, the amount of $NO_x$ absorbed in the $NO_x$ absorbing-reducing catalyst 7 increases. Therefore, when the amount of $NO_x$ absorbed in the $NO_x$ absorbing-reducing catalyst 7 increases to a predetermined value, a rich spike operation similar to that in the previous embodiments is performed on No. 2 through No. 4 cylinders in order to release $NO_x$ from the $NO_x$ absorbing-reducing catalyst 7.

Figure 13:
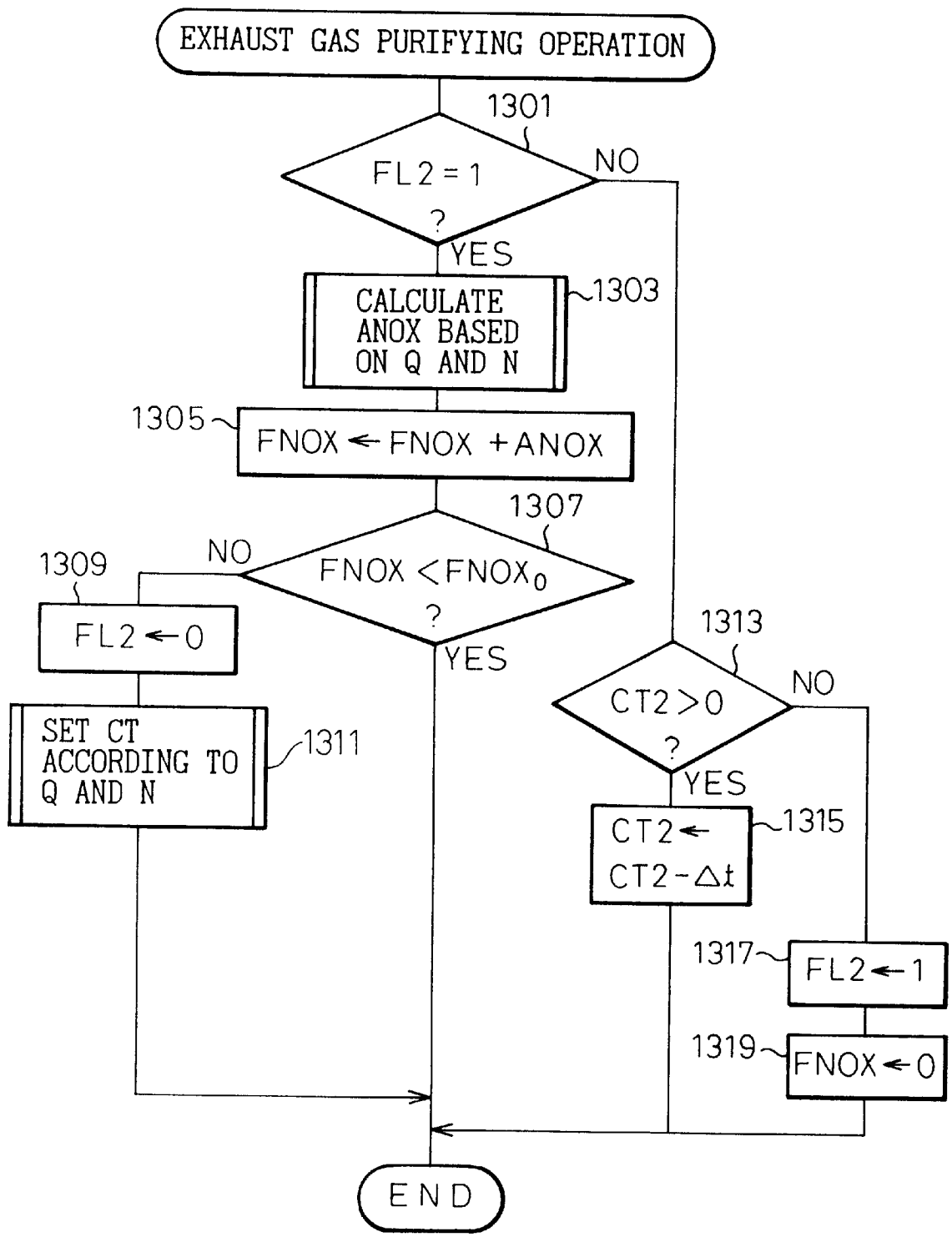
FIG. 13 is a flowchart explaining the exhaust gas purifying operation of the embodiment in FIG. 12.

FIGS. 13 is a flowchart explaining the exhaust gas purifying operation in this embodiment. This operation is performed by a routine executed by the control circuit 30 at predetermined intervals.

The flowchart in FIG. 13 is substantially the same as the flowchart in FIG. 6. However, in FIG. 13, FL2 in steps 1301, 1309 and 1317 is a flag representing whether the rich spike operation is required for No. 2 through No. 4 cylinders and, FL2=1 means that the rich spike operation is not required. Further, CT2 in steps 1311 and 1313 is a counter for determining the length of the period for performing the rich spike operation. Similarly to CT in FIG. 6, the value of the CT2 is determined in accordance with the engine operating condition at step 1311. The value of CT2 corresponds to the time sufficient for reducing $NO_x$ of the amount $FNOX_0$ absorbed in the $NO_x$ absorbing-reducing catalyst 7 and, similarly to CT, is determined based on experiment. The values of CT is stored in the ROM of control circuit 30 in the form of a numerical table using the air intake amount Q and the speed N of the engine as parameters. In the operation of FIG. 13, the rich spike operation is performed on No. 2 through No. 4 cylinders for a period CT2 determined by the engine operating condition every time the amount of $NO_x$ absorbed in the $NO_x$ absorbing-reducing catalyst 7 reaches the value $FNOX_0$. Thus, $NO_x$ is released and reduced every time the amount of $NO_x$ in the $NO_x$ absorbing-reducing catalyst 7 reaches the value $FNOX_0$.

Figure 14:
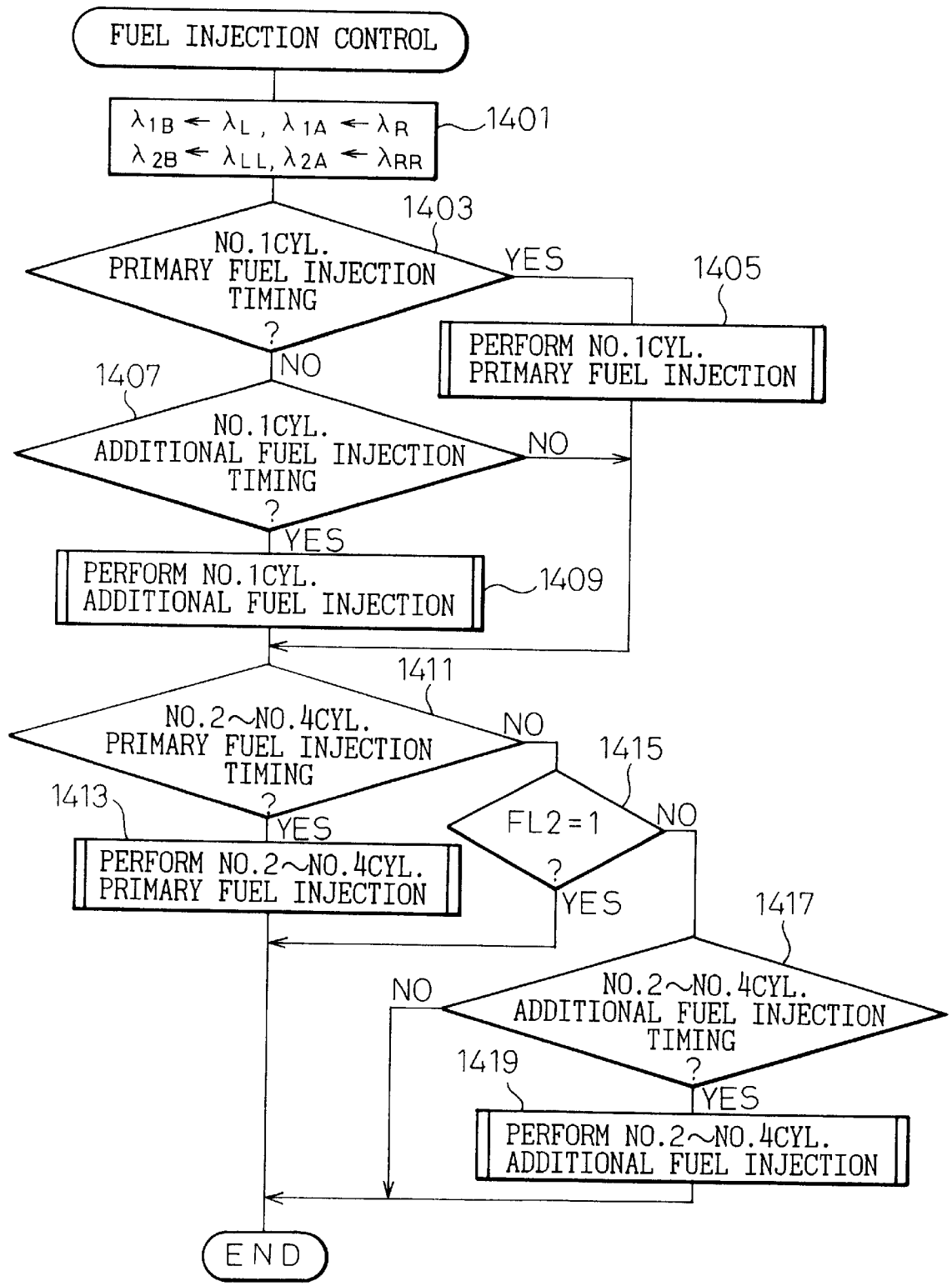
FIG. 14 is a flowchart explaining the fuel injection control operation performed in the exhaust gas purifying operation in FIG. 12.

FIG. 14 is a flowchart similar to FIG. 7 which explains the fuel injection control operation in the present embodiment. This operation is performed by a routine executed by the control circuit 30 at a predetermined rotation angle of the crankshaft of the engine 1.

In FIG. 14, at step 1401, the excess air ratio $\lambda_{1B}$ of the combustion (the excess air ratio of the air-fuel mixture obtained by the primary fuel injection) in No. 1 cylinder is set at $\lambda_L$, and the excess air ratio $\lambda_{1A}$ of the exhaust gas leaving No. 1 cylinder (the excess air ratio of the exhaust gas after the additional fuel injection) is set at $\lambda_R$, respectively. $\lambda_L$ is an excess air ratio where the amount of $NO_x$ produced by the combustion becomes the maximum (for example, $\lambda_L \cong 1.2$), and $\lambda_R$ is an excess air ratio where the amount of $NH_3$ produced by the three-way catalyst 5 becomes the maximum (for example, $\lambda_R \cong 0.95$). Further, at step 1401, the excess air ratios $\lambda_{2B}$ and $\lambda_{2A}$ of No. 2 through No. 4 cylinders are set at $\lambda_{LL}$ and $\lambda_{RR}$, respectively. $\lambda_{2B}$ is the excess air ratio of the combustion in No. 2 through No. 4 cylinders and $\lambda_{LL}$ is an excess air ratio where $NO_x$ produced by the combustion becomes the minimum (for example, $\lambda_{LL} \cong 1.4$). $\lambda_{2A}$ is the excess air ratio of the exhaust gas leaving No. 2 through No. 4 cylinders, and $\lambda_{RR}$ is an excess air ratio required for releasing $NO_x$ from the $NO_x$ absorbing-reducing catalyst 7. In this embodiment, $\lambda_{RR}$ is set at an appropriate value lower than 1.0 ($\lambda_{RR} < 1.0$).

After setting excess air ratios of the cylinders at step 1401, the operation determines whether it is the primary fuel injection timing of No. 1 cylinder (step 1403), and whether it is the additional fuel injection timing of No. 1 cylinder (step 1407). If it is the timing for the primary fuel injection or the additional fuel injection of the No. 1 cylinder, the primary fuel injection and the additional fuel injection are performed at steps 1405 and 1409, respectively. By executing steps 1403 through 1409, the primary fuel injection of No. 1 cylinder is performed so that the excess air ratio of the combustion in No. 1 cylinder is always kept at $\lambda_L$, and the additional fuel injection of No. 1 cylinder is performed so that the excess air ratio of the exhaust gas leaving No. 1 cylinder is always kept at 0.95.

At steps 1411 through 1419, the primary fuel injection and the additional fuel injections of No. 2 through No. 4 cylinders are performed in the manner similar to steps 1403 through 1409. However, the additional fuel injections of No. 2 through No. 4 cylinders are performed only when the flag FL2 is set at 0. By executing steps 1411 through 1419, the excess air ratio of the combustion in No. 2 through No. 4 cylinders is always kept at $\lambda_{LL}$ where the amount of $NO_x$ produced by the combustion becomes small and, when rich spike operation is performed, the excess air ratio of the exhaust gas leaving No. 2 through No. 4 cylinders is adjusted to $\lambda_{RR}$ by the additional fuel injection.

Although the $NO_x$ absorbing-reducing catalyst 7 is disposed in the exhaust gas passage 141 in the embodiment in FIG. 12, the $NO_x$ absorbing-reducing catalyst 7 may be disposed in the common exhaust gas passage 4 upstream of the $NH_3$ adsorbing-denitrating catalyst 9. An exhaust gas purifying operation the same as those in FIGS. 13 and 14 can be performed also in this case.

Next, another embodiment of the present invention will be explained with reference to FIG. 15.

Figure 15:
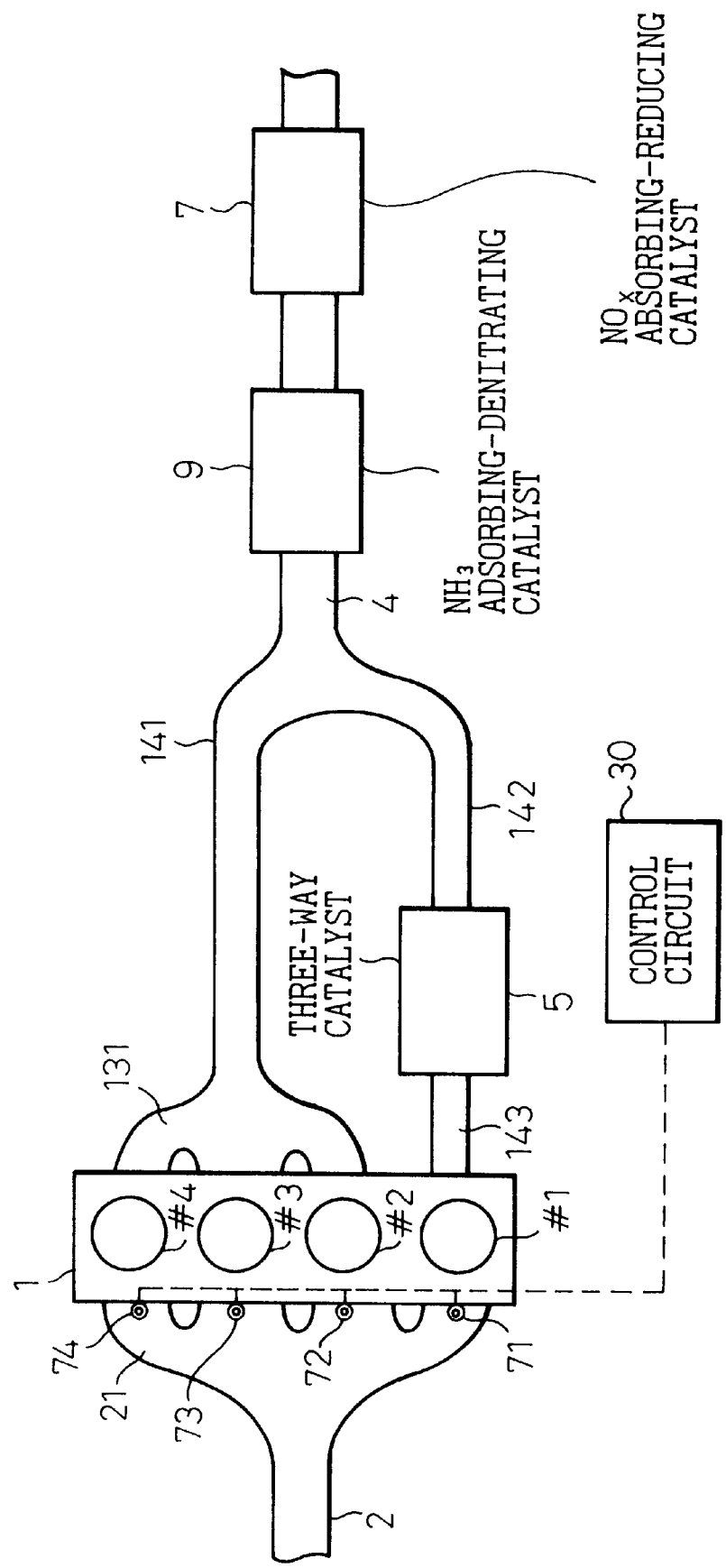
FIG. 15 schematically illustrates the general configuration of another embodiment of the exhaust gas purification device according to the present invention.

The embodiment in FIG. 15 is similar to the embodiment in FIG. 12 except that the $NO_x$ absorbing-reducing catalyst 7 is disposed in the common exhaust gas passage 4 downstream of the $NH_3$ adsorbing-denitrating catalyst 9. Namely, in this embodiment, $NH_3$ adsorbing-denitrating catalyst 9 mainly purifies $NO_x$ in the exhaust gas, and the $NO_x$ absorbing-reducing catalyst 7 downstream of the $NH_3$ adsorbing-denitrating catalyst 9 purifies only a small amount of $NO_x$ which has passed through the $NH_3$ adsorbing-denitrating catalyst 9 without being reduced.

In this embodiment, the additional fuel injection of No. 1 cylinder is always performed to produce a large amount of $NH_3$ at the three-way catalyst 5. The exhaust gas flowing through the three-way catalyst 5 mixes with a lean air-fuel ratio exhaust gas from No. 2 through No. 4 cylinders and forms an exhaust gas with a lean air-fuel ratio as a whole. When this lean air-fuel ratio exhaust gas containing $NH_3$ flows into $NH_3$ adsorbing-denitrating catalyst 9, $NO_x$ in the exhaust gas reacts with $NH_3$ on the $NH_3$ adsorbing-denitrating catalyst 9 and is reduced to $N_2$. In this case, a very small amount of $NO_x$ may pass through the $NH_3$ adsorbing-denitrating catalyst 9 without being reduced. However, even if $NO_x$ passes through the $NH_3$ adsorbing-denitrating catalyst 9, the $NO_x$ passing through the catalyst 9 is absorbed by the $NO_x$ absorbing-reducing catalyst 7 downstream of the catalyst 9 and removed from the exhaust gas. Similarly to the embodiment in FIG. 12, the rich spike operation is performed on No. 2 through No. 4 cylinders when the amount of $NO_x$ absorbed in the $NO_x$ absorbing-reducing catalyst 7 reaches a predetermined value in this embodiment, in order to prevent the $NO_x$ absorbing-reducing catalyst 7 from being saturated with the absorbed $NO_x$.

Since the exhaust gas purifying operation in this embodiment is the same as those in FIGS. 13 and 14, a detailed explanation is omitted. However, ANOX in steps 1303 and 1305 in FIG. 13 represents the amount of $NO_x$ passing through the $NH_3$ adsorbing-denitrating catalyst 9 without being reduced and flows into the $NO_x$ absorbing-reducing catalyst 7 per unit time instead of the whole amount of $NO_x$ produced by the engine per unit time. Therefore, the values of ANOX in this embodiment are far smaller than the values used in the embodiment in FIG. 12. The values of ANOX are preferably determined based on experiment also in this embodiment.

Next, another embodiment of the present invention will be explained with reference to FIG. 16.

Figure 16:
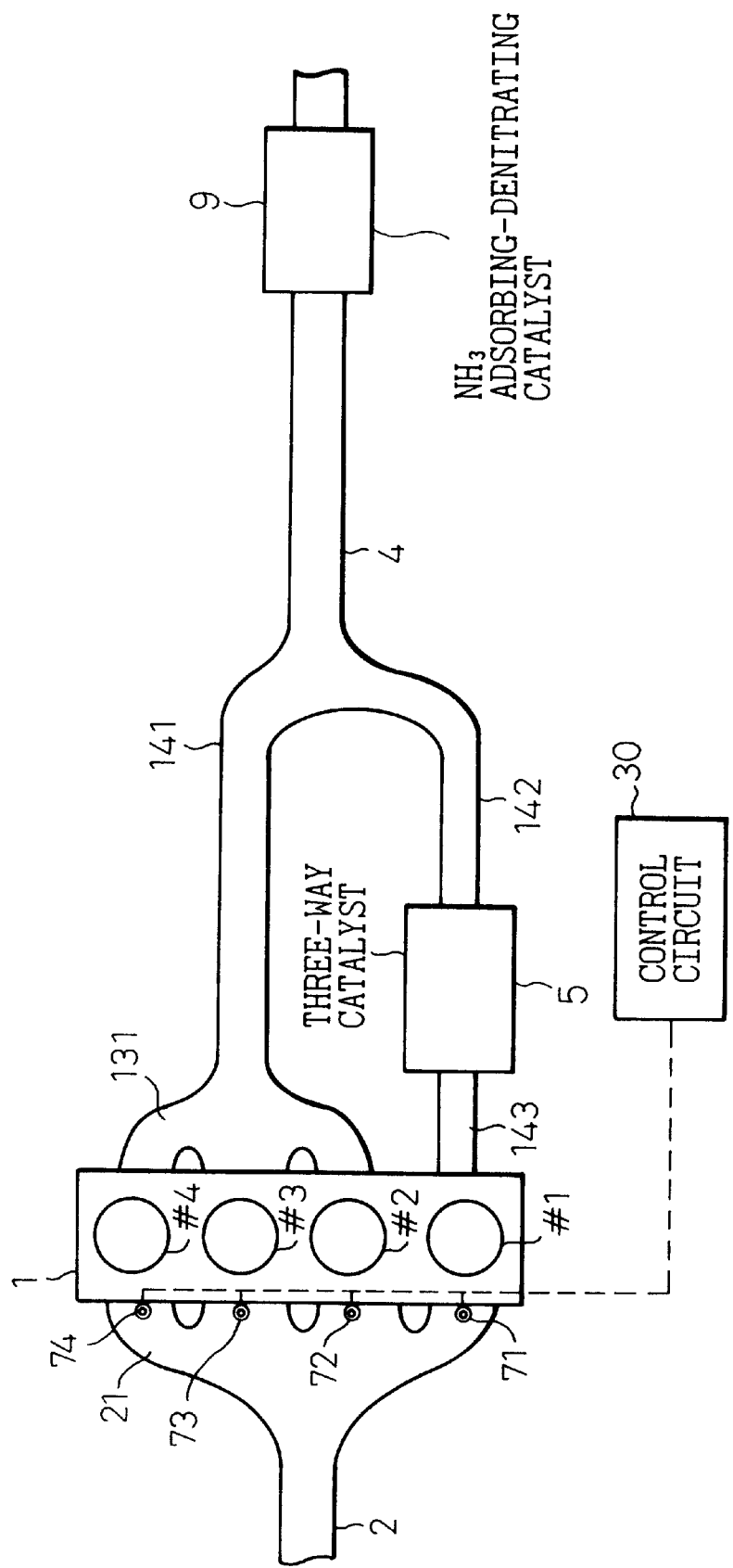
FIG. 16 schematically illustrates the general configuration of another embodiment of the exhaust gas purification device according to the present invention.

The embodiment in FIG. 16 has an arrangement similar to that of FIG. 15, except that the $NO_x$ absorbing-reducing catalyst 7 in FIG. 15 is omitted.

In this embodiment, either of the following two types of the exhaust gas purifying operations can be performed.

The first type of the exhaust gas purifying operation always performs the additional fuel injection of No. 1 cylinder in order to produce $NH_3$ at the three-way catalyst 5, and operates No. 2 through No. 4 cylinders at the excess air ratio where the amount of $NO_x$ produced by the combustion become small. In the first type of the exhaust gas purifying operation, thus the lean air-fuel ratio exhaust gas containing both $NO_x$ and $NH_3$ is always supplied to the $NH_3$ adsorbing-denitrating catalyst 9, and the $NO_x$ is reduced at the $NH_3$ adsorbing-denitrating catalyst 9 by reacting with $NH_3$. In this case, the primary fuel injection amount of No. 1 cylinder is set at a value so that the excess air ratio of the combustion becomes a value where the amount of $NO_x$ produced by the combustion becomes the maximum (i.e., $\lambda \cong 1.2$), and the additional fuel injection amount of No. 1 cylinder is set at a value so that the excess air ratio of the exhaust gas leaving No. 1 cylinder becomes a value where the amount of $NH_3$ Produced by the three-way catalyst 5 becomes the maximum (i.e., $\lambda \cong 0.95$). The rich spike operation is not performed on No. 2 through No. 4 cylinders.

In contrast to the above, in the second type of the exhaust gas purifying operation all the cylinders are operated at a lean air-fuel ratio during the normal operation of the engine, and $NO_x$ in the exhaust gas is purified at the $NH_3$ adsorbing-denitrating catalyst 9 using $NH_3$ stored therein. Further, when the amount of $NH_3$ stored in the $NH_3$ adsorbing-denitrating catalyst 9 decreases to a predetermined value, the rich spike operation of No. 1 cylinder is performed in order to replenish the $NH_3$ adsorbing-denitrating catalyst 9 with $NH_3$.

Figure 17:
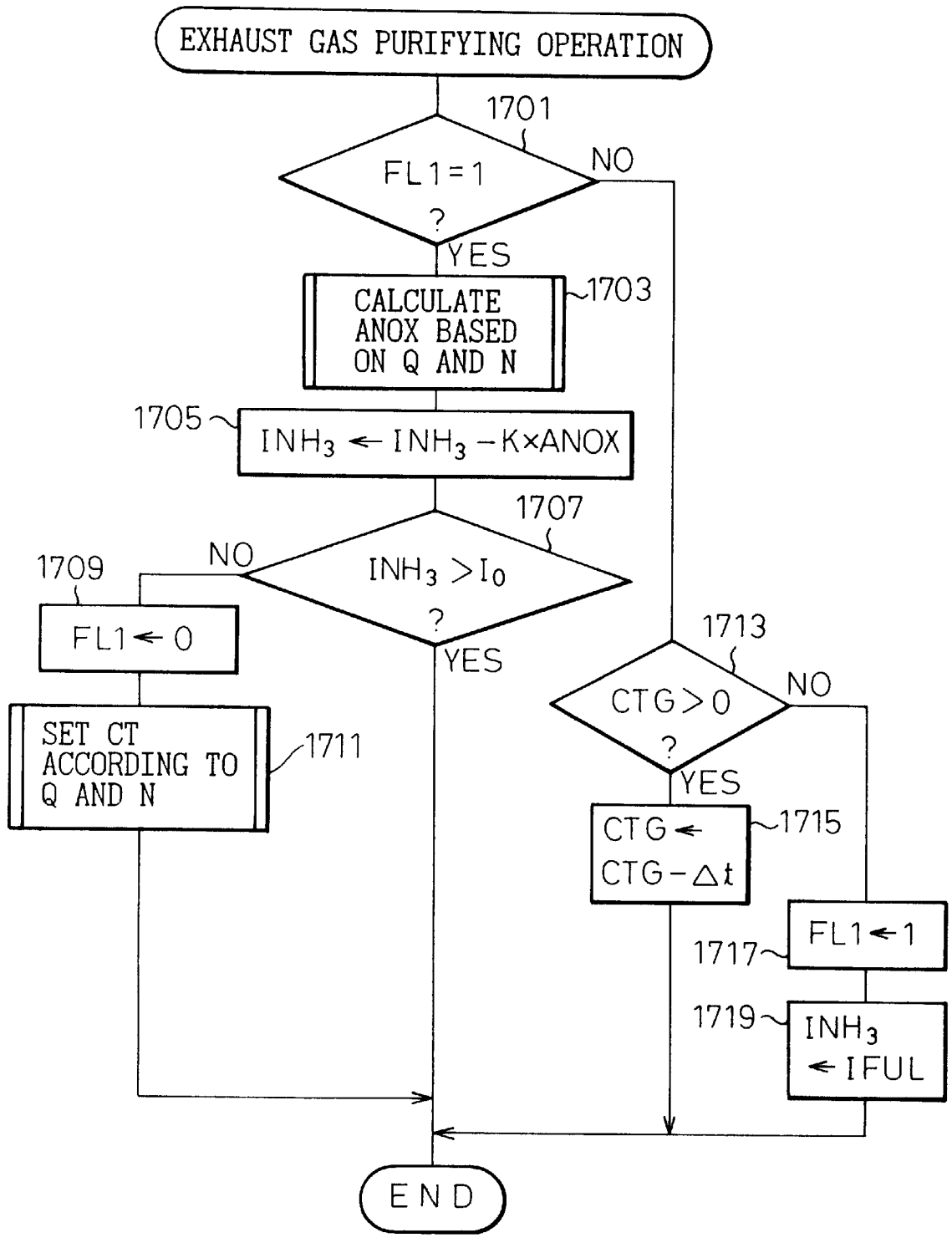
FIG. 17 is a flowchart explaining the exhaust gas purifying operation of the embodiment in FIG. 16.

FIG. 17 is a flowchart explaining the exhaust gas purifying operation of the second type. This operation is performed by a routine executed by the control circuit 30 at predetermined intervals.

In this operation, the amount $INH_3$ of $NH_3$ held in the $NH_3$ adsorbing-denitrating catalyst 9 is calculated by the method same as that explained in FIG. 11 (steps 1703 and 1705). Then, if the amount $INH_3$ has decreased to a predetermined value $I_0$, the operation sets a lean operation flag FL1 to 0. FL1 is a lean operation flag of No. 1 cylinder. Further, the operation performs the additional fuel injection of No. 1 cylinder for a predetermined period CTG, in order to increase the amount of $NH_3$ in the catalyst 9 to the value IFUL (steps 1707 through 1719). IFUL is, as explained before, the value near the saturation amount of $NH_3$ of the $NH_3$ adsorbing-denitrating catalyst 9.

Figure 18:
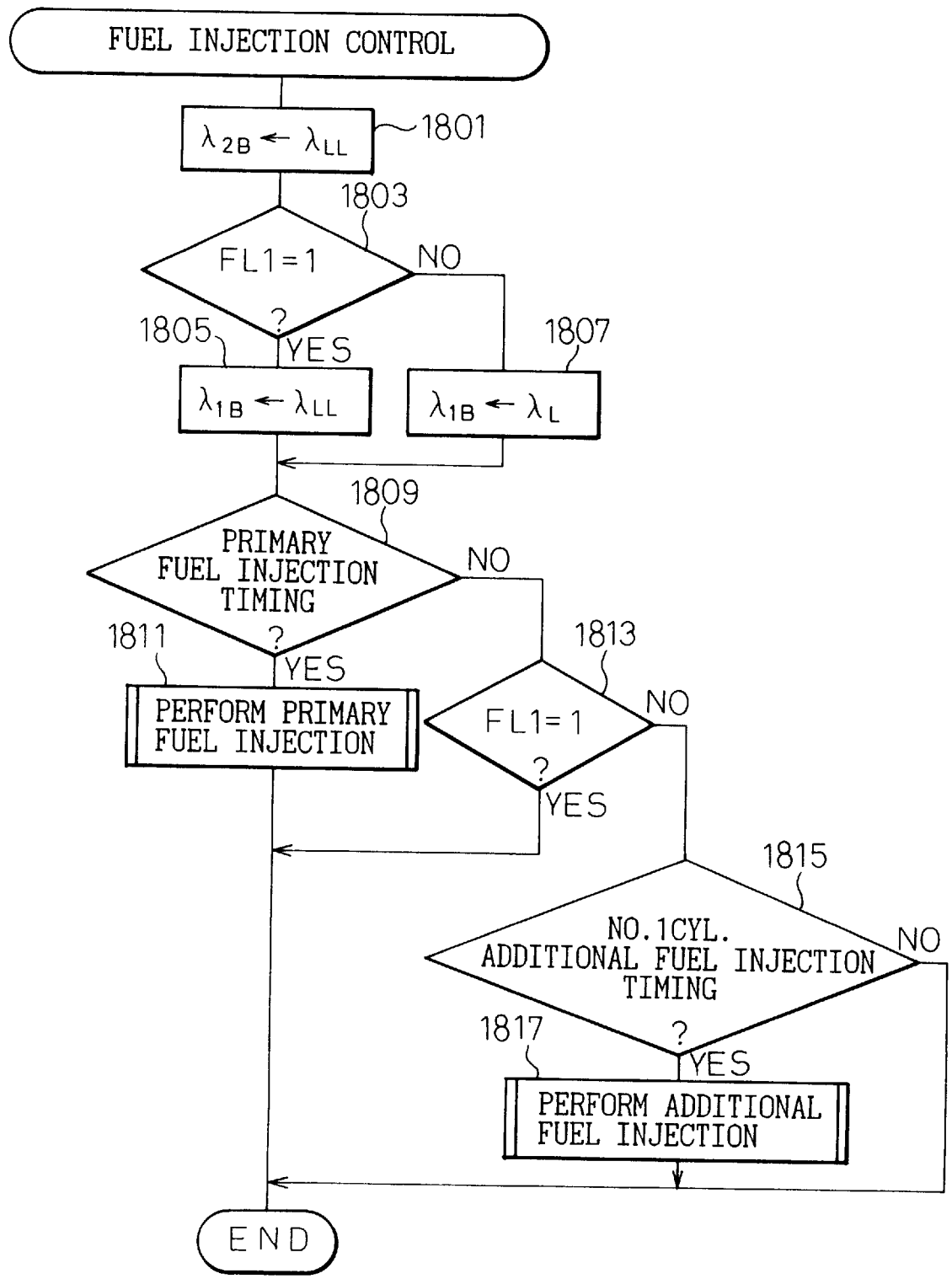
FIG. 18 is a flowchart explaining the fuel injection control operation performed in the exhaust gas purifying operation in FIG. 16.

FIG. 18 is a flowchart explaining the fuel injection control operation of the present embodiment. This operation is performed by a routine executed by the control circuit 30 at a predetermined rotation angle of the crankshaft of the engine. In this operation, the excess air ratio $\lambda_{2B}$ of the combustion in No. 2 through No. 4 cylinders is always set at $\lambda_{LL}$ ($\lambda_{LL} \cong 1.4$) where the amount of $NO_x$ produced by the combustion becomes the minimum (step 1801). The excess air ratio $\lambda_{1B}$ of the combustion in No. 1 cylinder is determined in accordance with the value of the lean operation flag FL1. Namely, if FL1=1 at step 1803, i.e., if the rich spike operation is not required, $\lambda_{1B}$ is set at $\lambda_{LL}$ at step 1805, and if FL1=0, i.e., if the rich spike operation is required, $\lambda_{1B}$ is set at $\lambda_L$ ($\lambda_L \cong 1.2$) where the amount of $NO_x$ produced by the combustion becomes the maximum (step 1807). Further, at step 1809, the operation determines whether it is the timing for the primary fuel injection of any one of the cylinders. If it is the timing, the primary fuel injection is performed on the corresponding cylinder at step 1811. If it is not the timing at step 1809, the operation determines whether the flag FL1 is set at 1 at step 1813, and if FL1=1, performs the additional fuel injection of No. 1 cylinder at the timing for the additional fuel injection of No. 1 cylinder (steps 1815 and 1817).

By the operations in FIGS. 17 and 18, the rich spike operation of No. 1 cylinder is performed when the amount of $NH_3$ held in the $NH_3$ adsorbing-denitrating catalyst 9 decreases to a predetermined value and, thereby, the amount of $NH_3$ in the catalyst 9 increases to the value IFUL near the saturating amount by the rich spike operation.

Next, another embodiment is explained with reference to FIG. 19. Similarly to the embodiment in FIG. 16, the embodiment in FIG. 19 performs the exhaust gas purifying operation using only the three-way catalyst 5 and the $NH_3$ adsorbing-denitrating catalyst 9. However, in this embodiment, the exhaust gas from No. 2 cylinder can be directed to either of the exhaust gas passage 143 (the three-way catalyst 5 side) and exhaust gas passage 141 in accordance with the amount of $NH_3$ held in the $NH_3$ adsorbing-denitrating catalyst 9.

Figure 19:
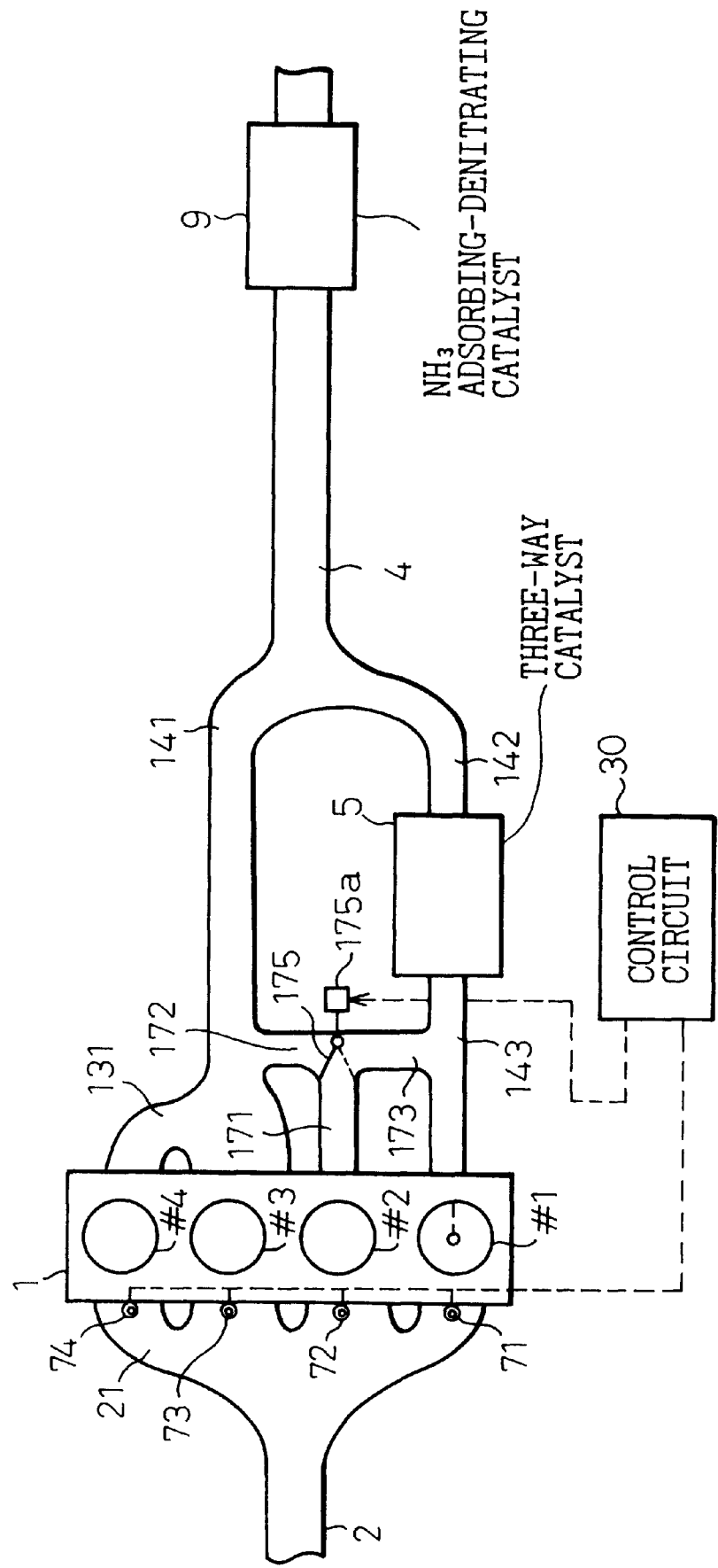
FIG. 19 schematically illustrates the general configuration of another embodiment of the exhaust gas purification device according to the present invention.

Namely, in FIG. 19, the exhaust port of No. 1 cylinder is directly connected to the exhaust gas passage 143, and the exhaust port of No. 2 cylinder is connected to an exhaust gas passage 171. The exhaust gas passage 171 of No. 2 cylinder diverges into branch exhaust gas passages 172 and 173. The branch exhaust gas passage 172 is connected to the exhaust gas passage 141, and the branch exhaust gas passage 173 is connected to the exhaust gas passage 143 upstream of the three-way catalyst 5. A switching valve 175 is provided on the exhaust gas passage 171 at the point where the branch passages 172 and 173 diverges. The switching valve 175 is provided with an appropriate actuator 175a, such as a solenoid actuator or a vacuum actuator, and takes a first position where the exhaust gas passage 171 is connected to the exhaust gas purifying catalyst 172 (i.e., the No. 3 and No. 4 cylinders side position) and a second position where the exhaust gas passage 171 is connected to the exhaust gas passage 173 (i.e., the three-way catalyst 5 side position) in response to a control signal from the control circuit 30. Therefore, the exhaust gas from No. 2 cylinder can be directed either to the three-way catalyst 5 or the exhaust gas passage 141. Thus, the amount of $NO_x$ supplied to the three-way catalyst 5 can be changed by switching the flow of the exhaust gas between the three-way catalyst side and the No. 3 and No. 4 cylinders side. Therefore, the amount of $NH_3$ produced at the three-way catalyst 5 can be changed in accordance with the operating condition of the engine.

In this embodiment, the excess air ratios of the combustion in No. 3 and No. 4 cylinders ($\lambda_{3B}$, $\lambda_{4B}$, respectively) are set at $\lambda_{LL}$ ($\lambda_{LL} \cong 1.4$) where the amount of $NO_x$ produced by the combustion becomes the minimum, and the additional fuel injection is not performed on No. 3 and No. 4 cylinders. The amount of $NH_3$ held in the $NH_3$ adsorbing-denitrating catalyst 9 in this embodiment is controlled by switching the valve 175. Namely, when the amount of $NH_3$ held in the $NH_3$ adsorbing-denitrating catalyst 9 becomes smaller than a predetermined lower limit $I_1$, the switching valve 175 is switched to the three-way catalyst side position to supply the exhaust gases from both No. 1 and No. 2 cylinders to the three-way catalyst 5. In this case, the excess air ratios of the primary fuel injections of No. 1 and No. 2 cylinders ($\lambda_{1B}$, $\lambda_{2B}$, respectively) are set at $\lambda_L$ ($\lambda_L \cong 1.2$) where the amount of $NO_x$ produced by the combustion becomes the maximum. Further, the additional fuel injection is performed on No. 1 and No. 2 cylinder to adjust the excess air ratio of the exhaust gas leaving these cylinders to $\lambda_R$ ($\lambda_R \cong 0.95$) where the amount of $NH_3$ produced at the three-way catalyst 5 becomes the maximum. Therefore, $NO_x$ produced by No. 1 and No. 2 cylinders is converted into $NH_3$ at the three-way catalyst 5 and the amount of $NH_3$ produced by the three-way catalyst 5 increases. This large amount of $NH_3$ is supplied to the $NH_3$ adsorbing-denitrating catalyst 9 disposed downstream of the three-way catalyst 5, and the amount of $NH_3$ adsorbed by the $NH_3$ adsorbing-denitrating catalyst 9 increases in a short time.

When the amount of $NO_x$ held in the $NH_3$ adsorbing-denitrating catalyst 9 is larger than the lower limit $I_1$, but smaller than an upper limit IFUL near the saturating amount, the switching valve 175 is switched to the No. 3 and No. 4 cylinders side position to supply the exhaust gas only from No. 1 cylinder to the three-way catalyst 5. In this case, the excess air ratio $\lambda_{2B}$ of No. 2 cylinder is set at $\lambda_{LL}$, and the additional fuel injection of the No. 2 cylinder is terminated. Therefore, since only $NO_x$ in the exhaust gas from No. 1 cylinder is converted into $NH_3$ at the three-way catalyst 5, the amount of $NH_3$ supplied to the $NH_3$ adsorbing-denitrating catalyst 9 becomes smaller and, thereby, the amount of $NH_3$ held in the $NH_3$ adsorbing-denitrating catalyst 9 increases (or decreases) slowly.

Further, when the amount of $NH_3$ held in the $NH_3$ adsorbing-denitrating catalyst 9 increases to the upper limit IFUL, the additional fuel injection of No. 1 cylinder is terminated, and the excess air ratio $\lambda_{1B}$ of the primary fuel injection of No. 1 cylinder is set to $\lambda_{LL}$ where the amount of $NO_x$ produced by the combustion becomes the minimum. In this case, since no $NH_3$ is produced at the three-way catalyst 5, the amount of $NH_3$ held in the $NH_3$ adsorbing-denitrating catalyst 9 decreases in a relatively short time.

Figure 20:
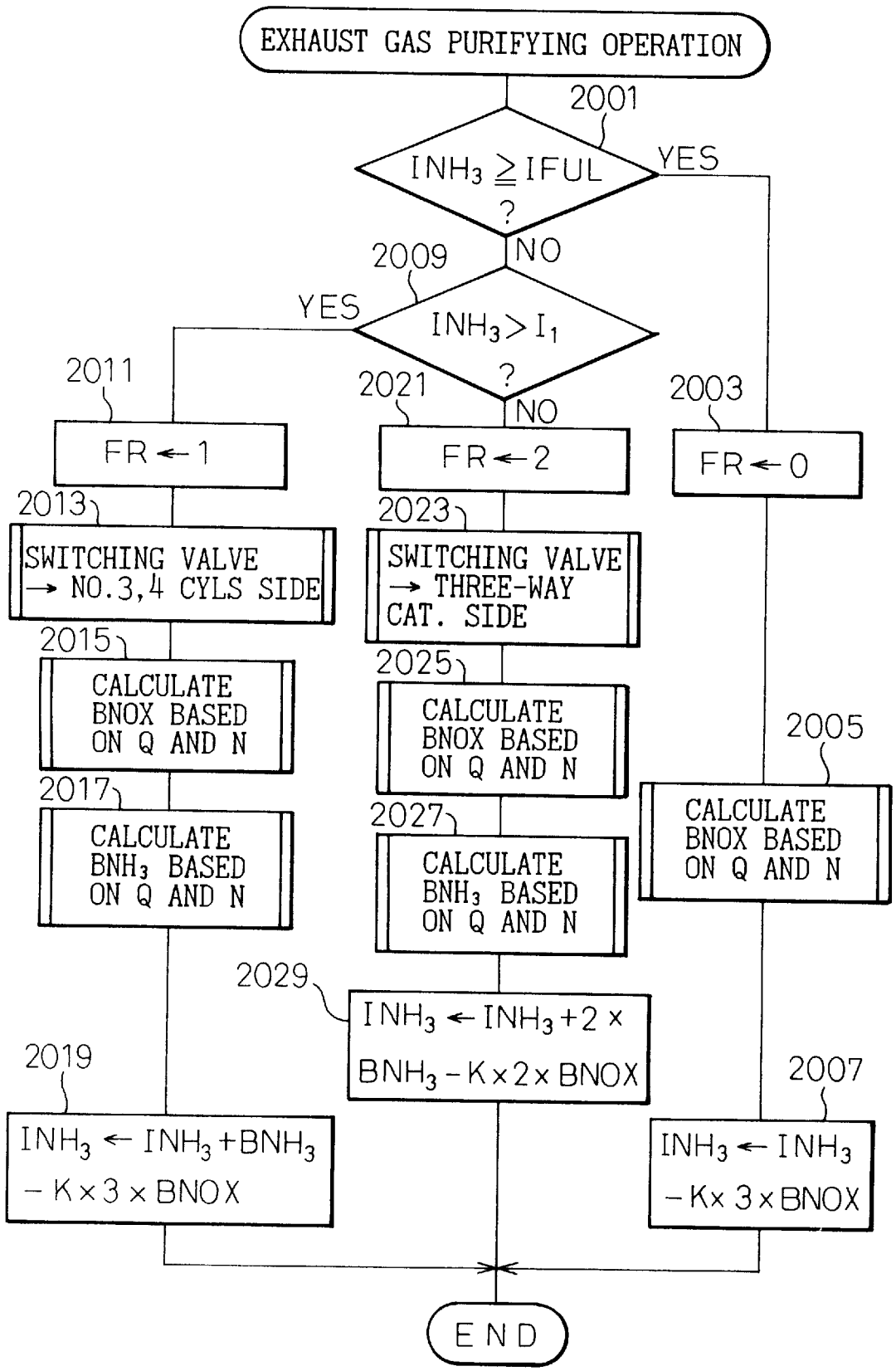
FIG. 20 is a flowchart explaining the exhaust gas purifying operation of the embodiment in FIG. 19.

FIG. 20 is a flowchart explaining the exhaust gas purifying operation of the present embodiment. This operation is performed by a routine executed by the control circuit 30 at predetermined intervals.

In FIG. 20, at step 2001, the operation determines whether the amount $INH_3$ of $NH_3$ held in the $NH_3$ adsorbing-denitrating catalyst 9 reaches the predetermined value IFUL (which is near the saturating amount of $NH_3$). If the amount $INH_3$ has reached IFUL, i.e., if $INH_3 \geq IFUL$ at step 2001, the operation sets the value of a flag FR to 0 at step 2003, and calculates the amount BNOX of $NO_x$ produced by the engine per unit time, based on the engine operating condition (the air intake amount Q and the speed N of the engine). As explained later, when the value of the flag FR is set to 0, the excess air ratio of the primary fuel injection of all the cylinders No. 1 through No. 4 is set at $\lambda_{LL}$, and the additional fuel injections of No. 1 and No. 2 cylinders are stopped by the fuel injection control operation performed by the control circuit 30 separately.

In this embodiment, the value BNOX is different from ANOX in the previous embodiments in that it represents the amount of $NO_x$ produced by one cylinder per unit time, and obtained previously by experiment. The values of BNOX are stored in the ROM of the control circuit 30 in the form of a numerical table using Q and N as parameters.

At step 2007, the amount $INH_3$ of $NH_3$ stored in the $NH_3$ adsorbing-denitrating catalyst 9 is calculated by $INH_3 = INH_3 - K \times 4 \times BNOX$. Namely, since $NH_3$ in the $NH_3$ adsorbing-denitrating catalyst 9 is used for reducing $NO_x$ produced by four cylinders, the amount of $NO_x$ in the $NH_3$ adsorbing-denitrating catalyst 9 decreases ($K \times 4 \times BNOX$) per unit time.

If $INH_3 < IFUL$ at step 2001, the operation proceeds to step 2009 to determine whether the amount $INH_3$ is smaller than the lower limit $I_1$. If $INH_3 > I_1$ at step 2009, the operation sets the value of the flag FR to 1 at step 2011, and switches the switching valve 175 to the No. 3 and No. 4 side position at step 2013. By this operation, only the exhaust gas from No. 1 cylinder is supplied to the three-way catalyst 5. At step 2015, the operation calculates the amount BNOX of $NO_x$ produced per one cylinder of No. 2 through No. 4 cylinders. Further, the operation calculates the amount $BNH_3$ of $NH_3$ produced by the three-way catalyst 5 per unit time based on the operating condition (air intake amount Q and speed N) of the engine 1. When the value of the flag FR is set to 1, the excess air ratio $\lambda_{1B}$ of the primary fuel injection of No. 1 cylinder is set to $\lambda_L$ and the additional fuel injection is performed on No. 1 cylinder. In this case, the excess air ratio of the primary fuel injection of No. 2 cylinder is set to $\lambda_{LL}$, i.e., the excess air ratio the same as that in No. 3 and No. 4 cylinders, and the additional fuel injection of No. 2 cylinder is stopped. Further, at step 2019, the amount $INH_3$ is calculated by $INH_3 = INH_3 + BNH_3 - K \times 3 \times BNOX$. Namely, in this case, the amount $INH_3$ increases by the amount $BNH_3$ of $NH_3$ produced by the three-way catalyst 5, and decreases by the amount ($K \times 3 \times BNOX$) required for reducing $NO_x$ produced by three cylinders.

If $INH_3 \leq I_1$ at step 2009, the operation sets the value of the flag FR to 2 at step 2021, and switches the switching valve 175 to the three-way catalyst 5 side. Thus, the exhaust gases from both No. 1 and No. 2 cylinders are supplied to three-way catalyst 5. Further, when the value of the flag FR is set at 2, the excess air ratio $\lambda_{2B}$ of No. 2 cylinder is set to $\lambda_L$, and the additional fuel injection is also performed on No. 2 cylinder.

Further, the amount $INH_3$ is calculated at steps 2025 through 2029 in the manner similar to that in steps 2015 through 2019. However, $INH_3$ is calculated by $INH_3 = INH_3 + 2 \times BNH_3 - K \times 2 \times BNOX$ in this case. Namely, the amount $INH_3$ increases by the amount of $NH_3$ produced from $NO_x$ supplied by two cylinders (No. 1 and No. 2 cylinders) and decreases by the amount required to reduce $NO_x$ contained in the exhaust gas from two cylinders (No. 3 and No. 4 cylinders).

Figure 21:
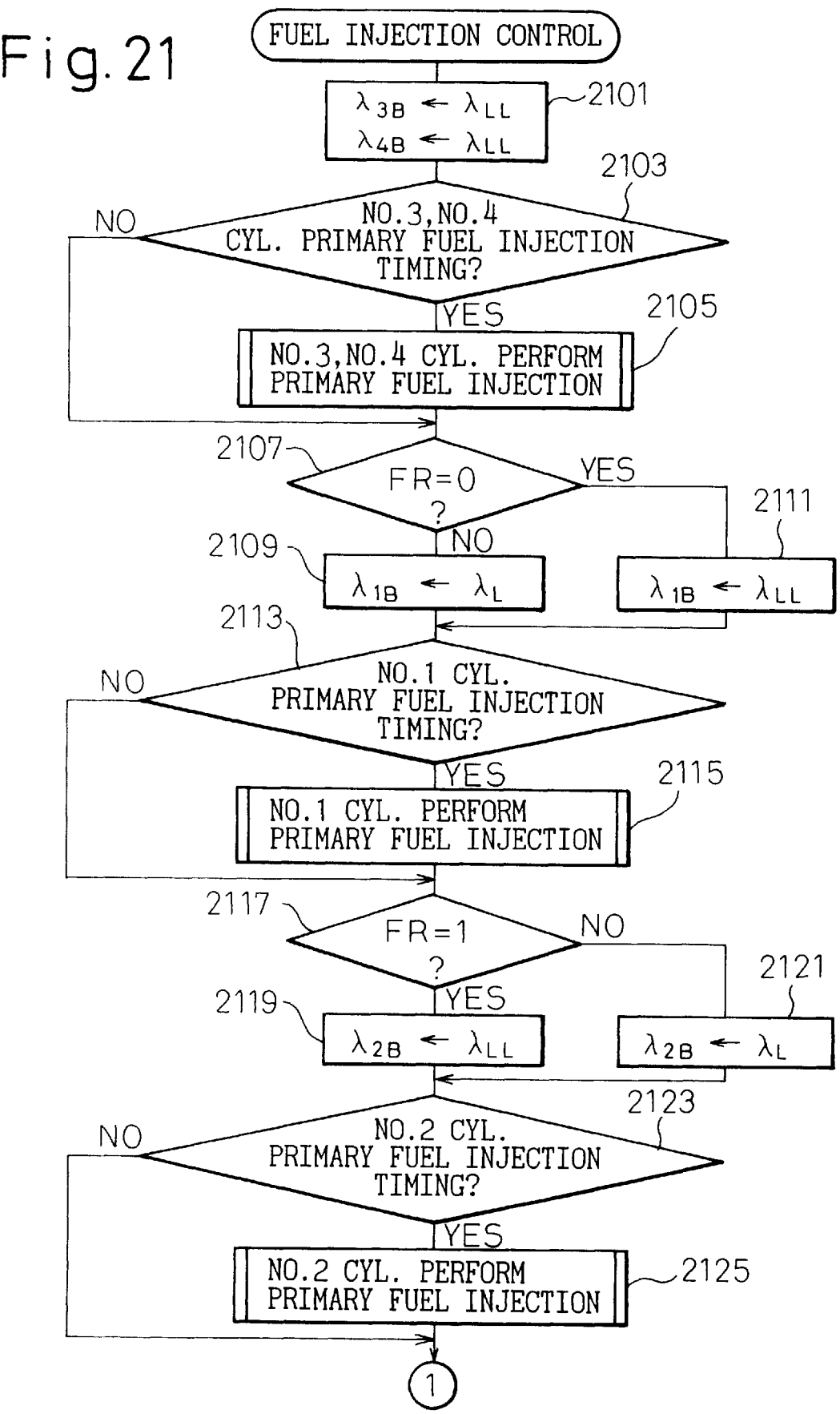
FIGS. 21 and 22 are a flowchart explaining the fuel injection control operation performed in the exhaust gas purifying operation in FIG. 19.
Figure 22:
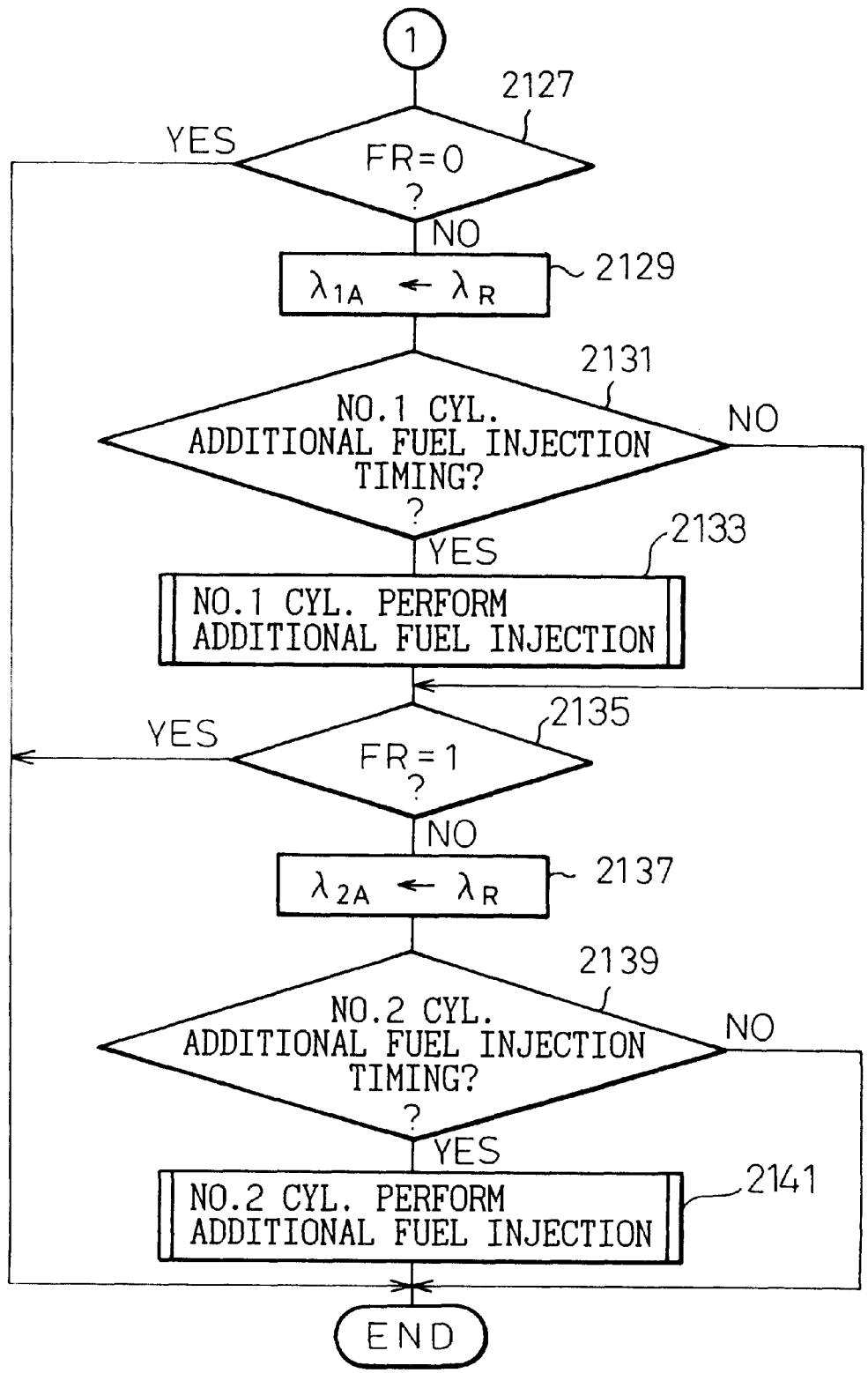

FIGS. 21 and 22 are a flowchart explaining the fuel injection control operation in this embodiment. This operation is performed by a routine executed by the control circuit 30 at a predetermined rotation angle of the crankshaft.

In FIG. 21, steps 2101 through 2125 represent the control operation of the primary fuel injection of the respective cylinders. Namely, the amounts of the primary fuel injection of No. 3 and No. 4 cylinders are set at step 2101 so that the excess air ratios $\lambda_{3B}$ and $\lambda_{4B}$ of the combustion in the No. 3 and No. 4 cylinders become $\lambda_{LL}$, and the primary fuel injections of No. 3 and No. 4 cylinders are performed at steps 2103 and 2105 at the fuel injection timing of these cylinders.

The excess air ratio $\lambda_{1B}$ of the primary fuel injection of No. 1 cylinder is set in accordance with whether the value of the flag FR is 0, and the primary fuel injection of No. 1 cylinder is performed when it becomes the fuel injection timing, at steps 2107 through 2115. The excess air ratio $\lambda_{1B}$ of No. 1 cylinder is set to $\lambda_L$ when the value of FR is 1 or 2 (step 2109), and to $\lambda_{LL}$ when the value of FR is 0 (step 2111).

Further, the excess air ratio $\lambda_{2B}$ Of the primary fuel injection of No. 2 cylinder is set in accordance with whether the value of the flag FR is 1, and the primary fuel injection of No. 2 cylinder is performed when it becomes the fuel injection timing at steps 2117 through 2125. The excess air ratio $\lambda_{2B}$ of No. 2 cylinder is set to $\lambda_{LL}$ when the value of FR is 1 (step 2119), and to $\lambda_L$ when the value of FR is 2 (step 2121).

After setting the excess air ratios of the respective cylinders, the control of the additional fuel injections of No. 1 and No. 2 cylinders are performed at steps 2127 through 2141. Namely, it is determined whether the value of the flag FR is 0 at step 2127 and, if FR=0, since the additional fuel injections are not required for No. 1 and No. 2 cylinders, the operation terminates immediately. On the other hand, if FR≠0 at step 2127 (i.e., if FR is 1 or 2), since the additional fuel injection is required on the No. 1 cylinder, the amount of the additional fuel injection of No. 1 cylinder is determined at step 2129 in such a manner that the excess air ratio $\lambda_{1A}$ of the exhaust gas leaving No. 1 cylinder becomes $\lambda_R$. The additional fuel injection is then performed at the additional fuel injection timing (steps 2131 and 2133). Further, the operation determines whether the value of the flag FR is 1 at step 2135 and, if FR=1 (i.e., if the additional fuel injection is not required for No. 2 cylinder), the operation terminates immediately. If FR≠1 at step 2135 (i.e., if FR=2), since this means that the additional fuel injection is required for No. 2 cylinder, the operation sets the amount of additional fuel injection at step 2137 so that the excess air ratio $\lambda_{2B}$ of the exhaust gas leaving No. 2 cylinder becomes $\lambda_R$, and performs additional fuel injection of No. 2 cylinder at steps 2139 and 2141.

According to the present embodiment, since the amount of $NH_3$ produced at the three-way catalyst 5 is controlled in such a manner that the amount of $NH_3$ held in the $NH_3$ adsorbing-denitrating catalyst 9 is always kept within a predetermined range, the shortage of $NH_3$ on the catalyst 9 or the saturation thereof with $NH_3$ determining operation not occur. Therefore, $NO_x$ in the exhaust gas is purified with high efficiency in this embodiment.

Next, other embodiments of the present invention will be explained. The previous embodiments in FIGS. 1, 8 through 10, 12, 15, 16 and 19 use the three-way catalyst 5 as the $NH_3$ conversion means. However, in the embodiments explained hereinafter, an $NO_x$ absorbing-reducing catalyst is used instead of three-way catalyst as $NH_3$ conversion means.

As explained before, the $NO_x$ absorbing-reducing catalyst absorbs $NO_x$ in the exhaust gas when the air-fuel ratio of the exhaust gas is lean, and releases and reduces the absorbed $NO_x$ when the air-fuel ratio of the exhaust gas becomes rich. However, it was found that the $NO_x$ absorbing-reducing catalyst also converts $NO_x$ into $NH_3$ when the air-fuel ratio of the exhaust gas is rich by the reaction the same as that of the three-way catalyst, i.e., $5H_2+2NO \rightarrow 2NH_3+2H_2O$. In this case, it was also found that both of the $NO_x$ in the exhaust gas and the $NO_x$ absorbed in the $NO_x$ absorbing-reducing catalyst are converted into $NH_3$. Therefore, when the $NO_x$ absorbing-reducing catalyst is used as the $NH_3$ conversion means, since the $NO_x$ absorbed in the $NO_x$ absorbing-reducing catalyst in addition to the $NO_x$ in the exhaust gas can be used for producing $NH_3$, the amount of the produced $NO_x$ becomes larger compared to the amount of $NO_x$ produced by the three-way catalyst provided other conditions are the same.

Figure 25:
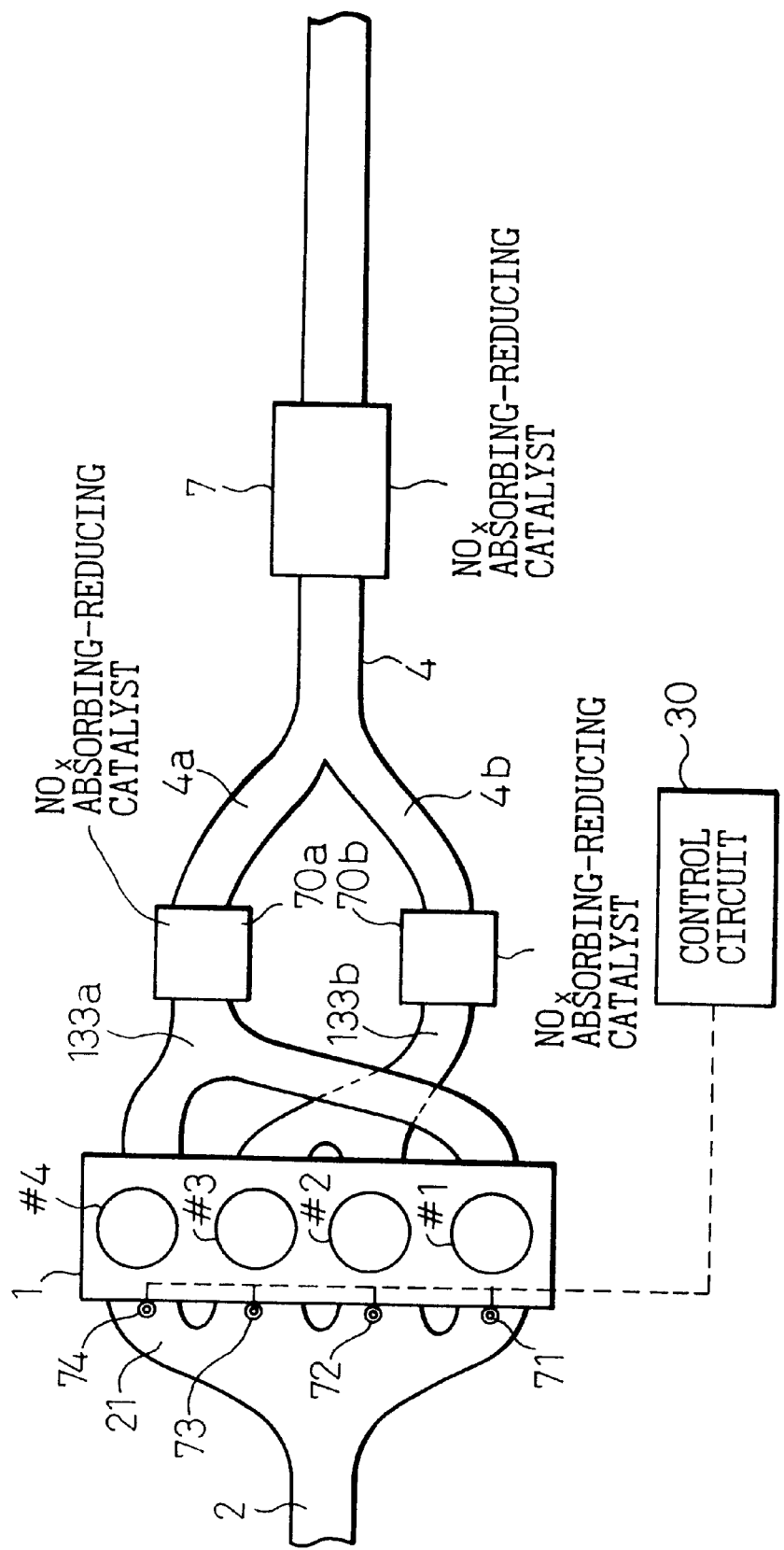
FIG. 25 schematically illustrates the general configuration of another embodiment of the exhaust gas purification device according to the present invention.
Figure 26:
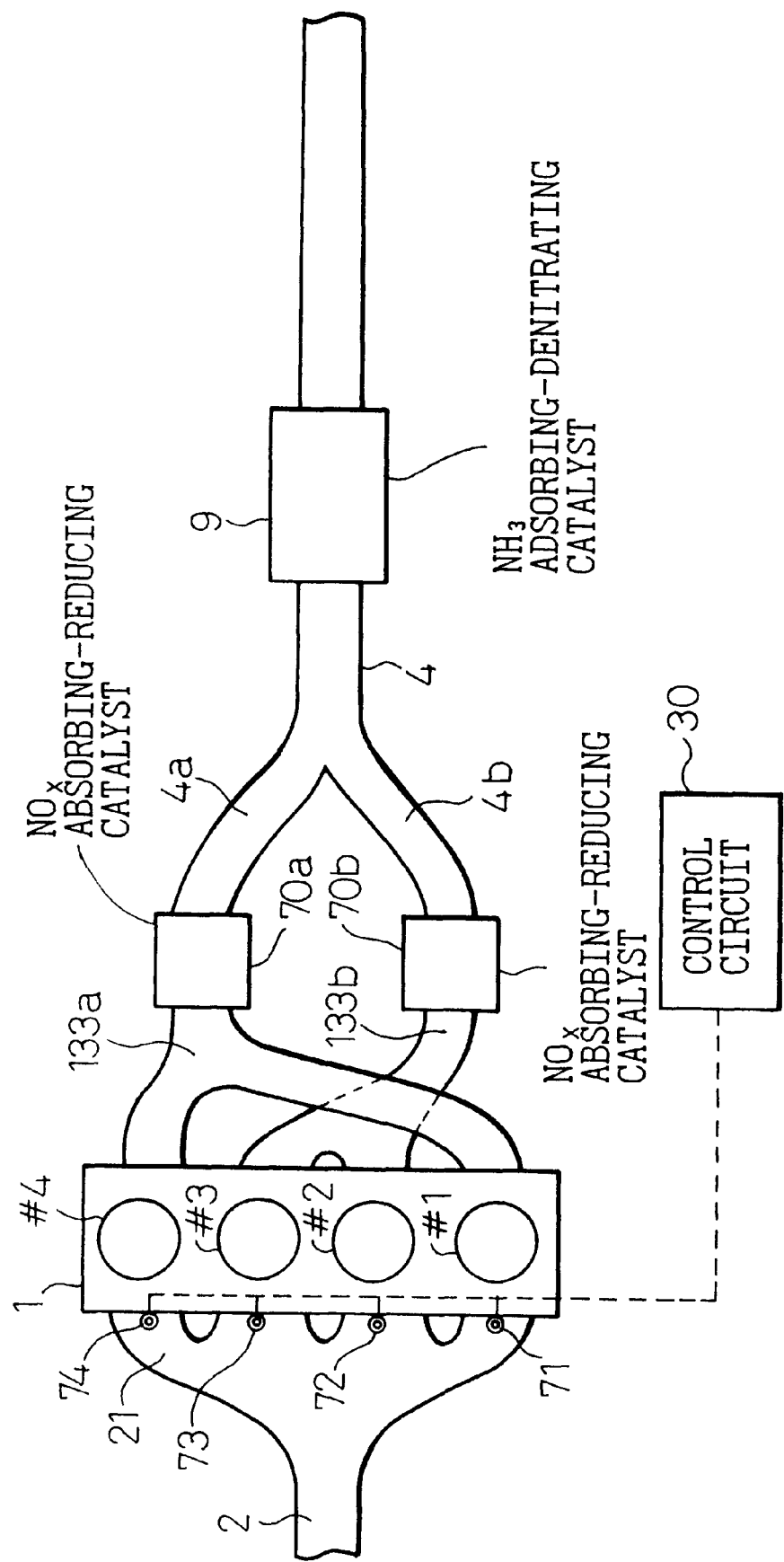
FIG. 26 schematically illustrates the general configuration of another embodiment of the exhaust gas purification device according to the present invention.
Figure 27:
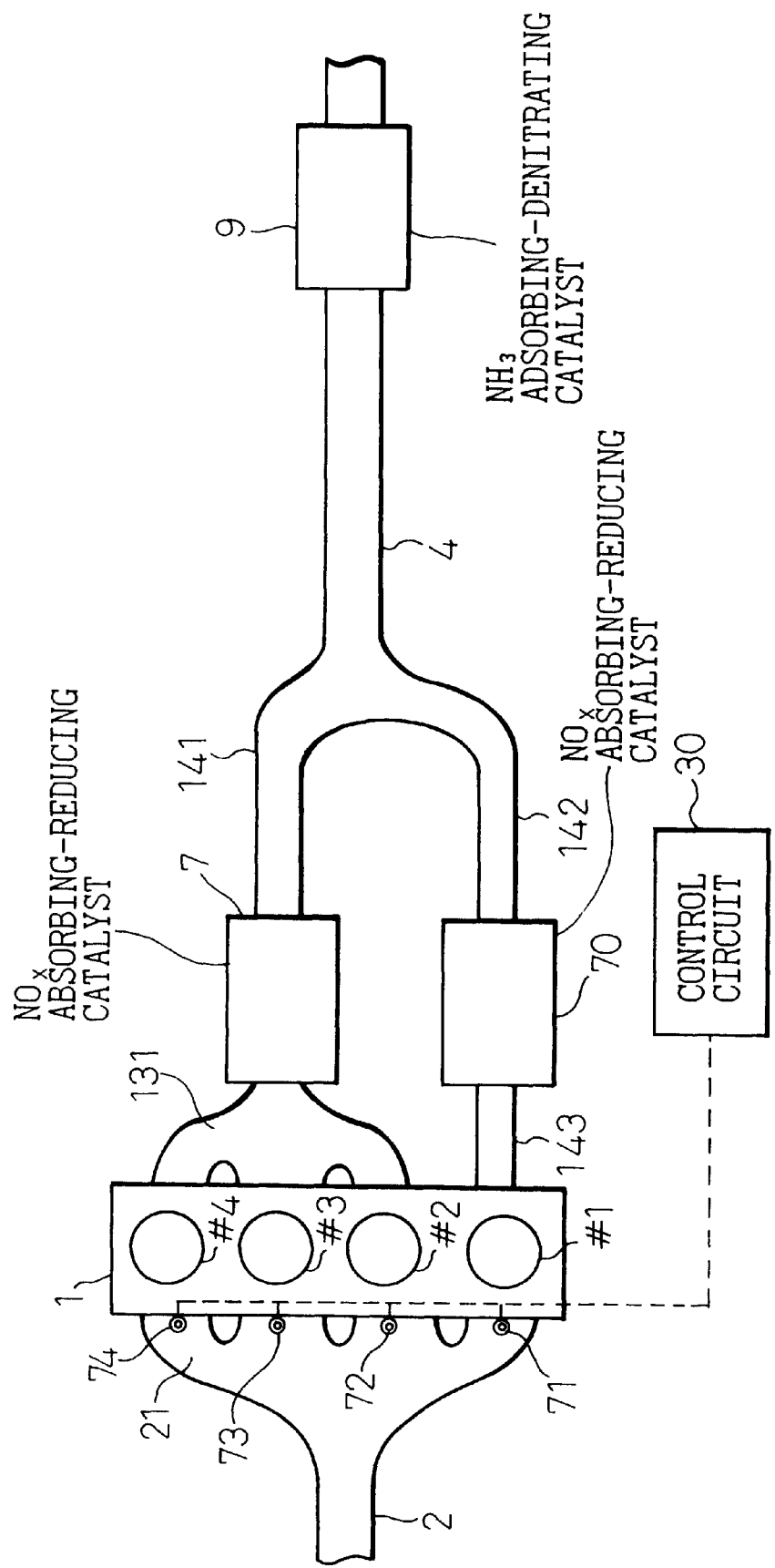
FIG. 27 schematically illustrates the general configuration of another embodiment of the exhaust gas purification device according to the present invention.

FIGS. 23 through 27 show the general configurations of embodiments of the exhaust gas purification device according to the present invention when the $NO_x$ absorbing-reducing catalysts are used as $NH_3$ conversion means. FIGS. 23 through 26 show the embodiments where exhaust gases from all the cylinders of the engine flow through the $NO_x$ absorbing-reducing catalyst used as the $NH_3$ conversion means, while FIG. 27 shows the embodiment where only the exhaust gas from the specific cylinder flows through the same. Reference numerals in FIGS. 23 through 27 which are the same as those in FIGS. 1, 8 through 10, 12, 15, 16 and 19 designate similar elements.

Figure 23:
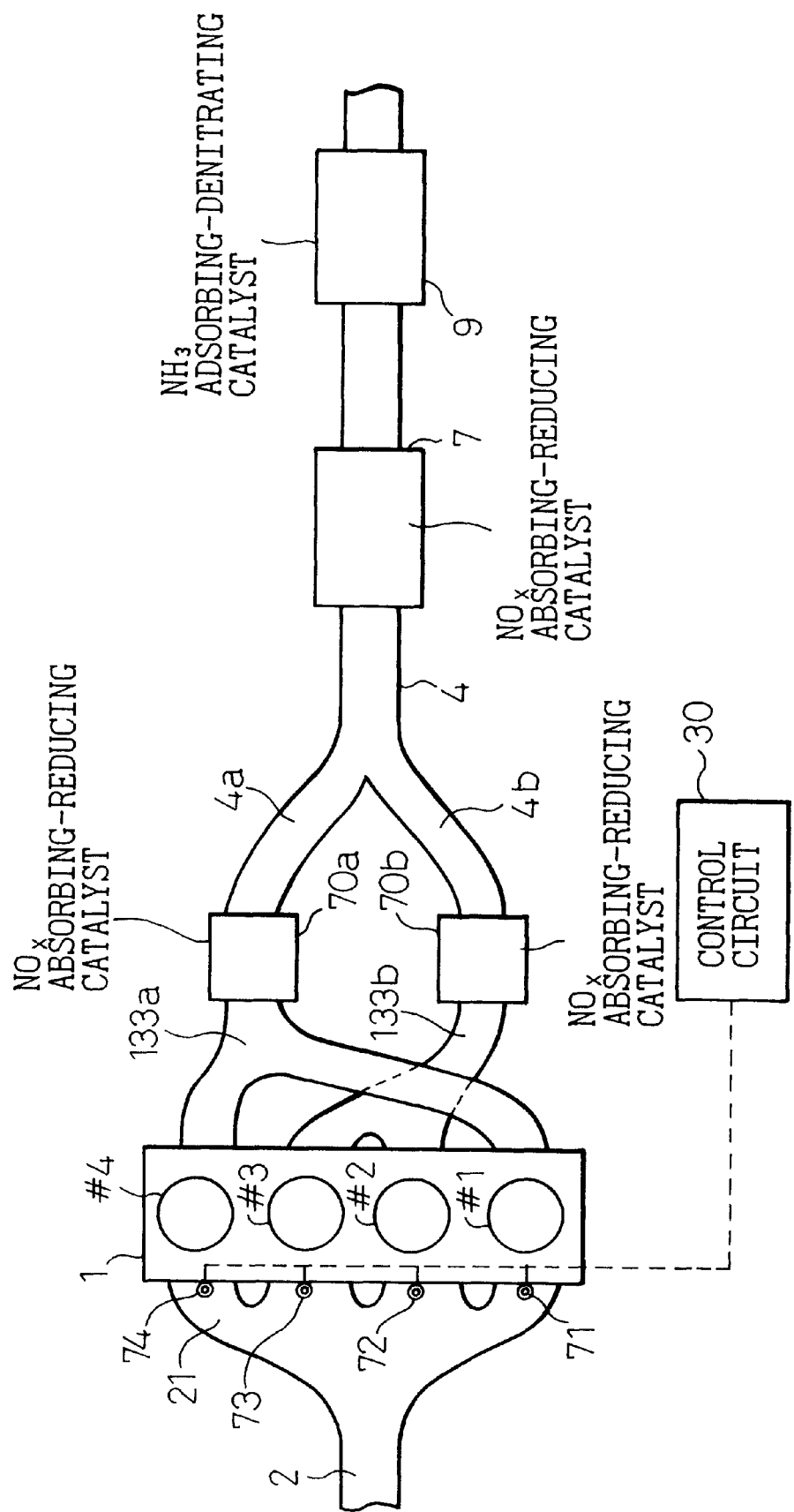
FIG. 23 schematically illustrates the general configuration of another embodiment of the exhaust gas purification device according to the present invention.

First, the embodiment in FIG. 23 will be explained.

In this embodiment, No. 1 and No. 4 cylinders are connected to a branch exhaust gas passage 4a by an exhaust manifold 133a, and No. 2 and No. 3 cylinders are connected to another branch exhaust gas passage 4b by an exhaust manifold 133b. The branch exhaust gas passages 4a and 4b merges each other to form a common exhaust gas passage 4 at downstream thereof. A $NO_x$ absorbing-reducing catalyst is disposed in each of the branch exhaust gas passage 4a and 4b in this embodiment. Since these $NO_x$ absorbing-reducing catalyst act as $NH_3$ conversion means, these $NO_x$ absorbing-reducing catalysts are designated by numerals 70a and 70b (or 70) in FIGS. 23 through 27 to distinguish them from the $NO_x$ absorbing-reducing catalyst mainly acting as the purification means. In the common exhaust gas passage 4, a $NO_x$ absorbing-reducing catalyst 7 which mainly acts as the purification means and the $NH_3$ adsorbing-denitrating catalyst 9 are disposed in this order from the upstream end.

In this embodiment, all the cylinders are always operated at the same excess air ratio. Namely, though two groups of cylinders are formed, and a branch exhaust gas passage is connected to each group of cylinders in order to decrease the exhaust back pressure by avoiding interference of exhaust gases from the respective cylinders, the configuration of the embodiment in FIG. 23 is substantially the same as that in FIG. 1 since the $NH_3$ conversion means (the $NO_x$ absorbing-reducing catalysts 70a and 70b) are disposed in both branch exhaust gas passages 4a and 4b.

Further, the exhaust gas purifying operation of the present embodiment is the same as the operation of the embodiment in FIG. 1, i.e., the operations in FIGS. 6 and 7 are also performed in this embodiment. Namely, all the cylinders of the engine 1 are operated at a lean air-fuel ratio during the normal operation. In the normal operation, the upstream $NO_x$ absorbing-reducing catalysts 70a and 70b, as well as the downstream $NO_x$ absorbing-reducing catalyst 7 absorb $NO_x$ in the exhaust gas. When the amount of $NO_x$ absorbed in the downstream $NO_x$ absorbing-reducing catalyst 7 increased to a predetermined value, the rich spike operation is performed on all cylinders. Therefore, a rich air-fuel ratio exhaust gas containing a relatively large amount of $NO_x$ flows into the upstream $NO_x$ absorbing-reducing catalysts 70a, 70b acting as the $NH_3$ conversion means. When the rich air-fuel ratio exhaust gas is supplied to the upstream $NO_x$ absorbing-reducing catalysts 70a and 70b, $NO_x$ absorbed in the catalysts 70a and 70b are released. This released $NO_x$ as well as $NO_x$ contained in the exhaust gas from the engine, is converted into $NH_3$ at the upstream $NO_x$ absorbing-reducing catalysts 70a and 70b, and a large amount of $NH_3$ is produced. Thus, a rich air-fuel ratio exhaust gas containing a large amount of $NH_3$ flows into the downstream $NO_x$ absorbing-reducing catalyst 7 and, thereby, $NO_x$ is released from the catalyst 7 and reduced to $N_2$ by reacting with $NH_3$ in the exhaust gas.

Figure 28:
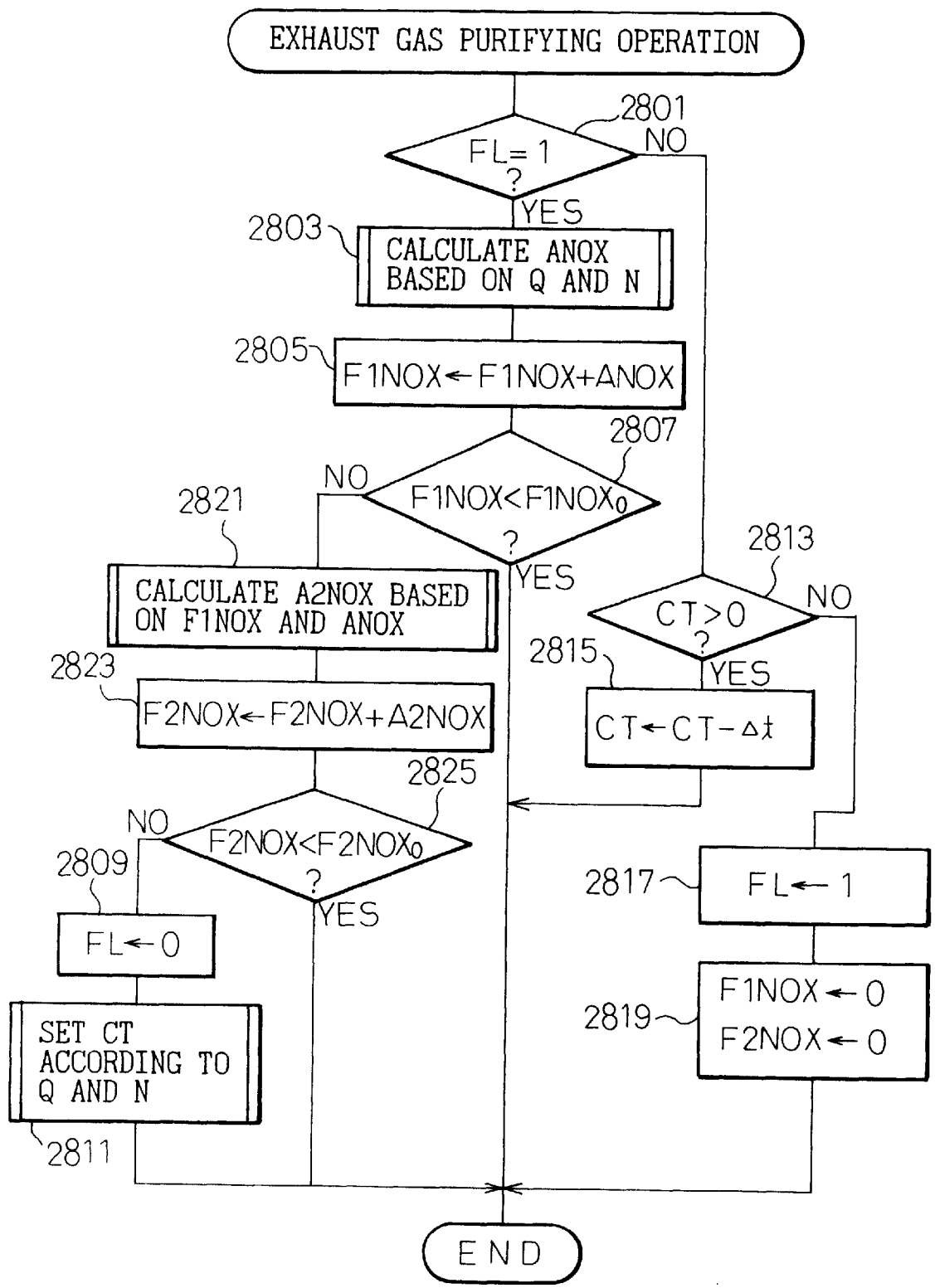
FIG. 28 is a flowchart explaining the exhaust gas purifying operation of the embodiment in FIG. 23.

In the operation in FIG. 6, it is assumed that the upstream $NO_x$ absorbing-reducing catalysts 70a performs only the function as the $NH_3$ conversion means, i.e., the function exactly the same as the three-way catalyst 5 in FIG. 1. Therefore, the absorbing and releasing of $NO_x$ by the $NO_x$ absorbing-reducing catalysts 70a and 70b is ignored. However, since the upstream $NO_x$ absorbing-reducing catalysts 70a and 70b also absorb $NO_x$ in the exhaust gas during the normal operation, the actual amount of $NO_x$ absorbed in the downstream $NO_x$ absorbing-reducing catalyst 7 becomes smaller in this embodiment compared to the embodiment in FIG. 1. Therefore, it is preferable to take the absorbing and releasing operation of the upstream $NO_x$ absorbing-reducing catalysts 70a and 70b into consideration. The exhaust gas purifying operation which takes the absorbing and releasing operation of the upstream $NO_x$ absorbing-reducing catalysts into consideration will be explained later (FIG. 28).

Figure 24:
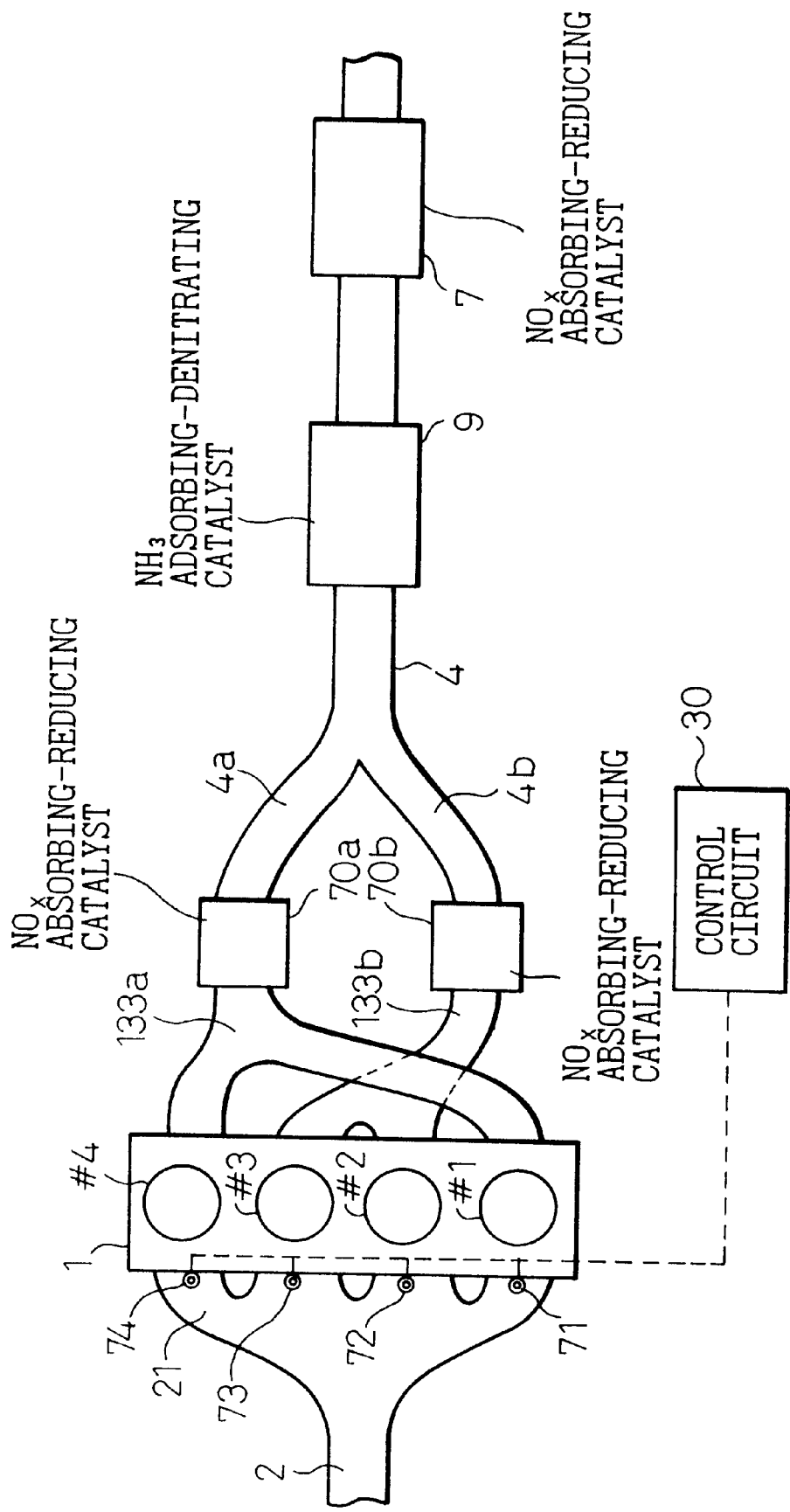
FIG. 24 schematically illustrates the general configuration of another embodiment of the exhaust gas purification device according to the present invention.

FIG. 24 shows an embodiment where the $NO_x$ absorbing-reducing catalysts 70a and 70b are used as $NH_3$ conversion means, and the $NH_3$ adsorbing-denitrating catalyst 9 and the downstream $NO_x$ absorbing-reducing catalyst 7 are disposed in the exhaust gas passage 4 in this order from the upstream end. As can be seen from FIG. 24 and FIG. 8, the embodiment in FIG. 24 is substantially the same as the embodiment in FIG. 8. Since the exhaust gas purifying operation of the embodiment in FIG. 24 is also the same as the operation in the embodiment in FIG. 8, a detailed explanation is omitted.

FIG. 25 shows an embodiment where only the downstream $NO_x$ absorbing-reducing catalyst 7 is provided on the exhaust gas passage 4 downstream of the upstream $NO_x$ absorbing-reducing catalysts 70a and 70b. FIG. 26 shows an embodiment where only the $NH_3$ adsorbing-denitrating catalyst 9 is disposed in the exhaust gas passage 4 downstream of the $NO_x$ absorbing-reducing catalysts 70a and 70b. The embodiments in FIGS. 25 and 26 are substantially the same as the embodiments in FIGS. 9 and 10, respectively. The exhaust gas purifying operations in the embodiments in FIGS. 25 and 26 are also the same as those in the embodiments in FIGS. 9 and 10.

FIG. 27 shows an embodiment in which only the exhaust gas from the specific cylinder is supplied to the $NO_x$ absorbing-reducing catalyst 70 which acts as the $NH_3$ conversion means. This embodiment only replaces the three-way catalyst 5 in the embodiment in FIG. 12 with the $NO_x$ absorbing-reducing catalyst 70 and substantially the same as the embodiment in FIG. 12. The exhaust gas purifying operation of the embodiment in FIG. 27 is also exactly the same as the operation in the embodiment in FIG. 12. Further, though not shown by drawings, it is possible to replace the three-way catalyst 5 in the embodiments in FIGS. 15, 16 and 19 with the $NO_x$ absorbing-reducing catalyst 7, and the exhaust gas purifying operations do not change even if the three-way catalyst 5 is replaced with the $NO_x$ absorbing-reducing catalyst 7 in the embodiments in FIGS. 15, 16 and 19.

Next, another embodiment of the exhaust gas purifying operation where the $NO_x$ absorbing-reducing catalyst is used as the $NH_3$ conversion means will be explained. In the embodiments in FIGS. 23 through 27, though the $NO_x$ absorbing-reducing catalysts are used as the $NH_3$ conversion means, the exhaust gas purifying operations are the exactly the same as the exhaust gas purifying operations where the three-way catalysts are used as the $NH_3$ conversion means. However, though the three-way catalyst only allows $NO_x$ to pass through, the $NO_x$ absorbing-reducing catalyst absorbs $NO_x$ in the exhaust gas when the exhaust gas is at a lean air-fuel ratio. In this embodiment, this $NO_x$ absorbing and releasing operation is utilized effectively even though the $NO_x$ absorbing-reducing catalyst is used as the $NH_3$ conversion means.

FIG. 28 is a flowchart explaining the embodiment of the exhaust gas purifying operation. Although this exhaust gas purifying operation can be performed in any embodiment of FIG. 23 through 27, the case in FIG. 23 is considered for the purpose of explanation.

The operation in FIG. 28 is performed by a routine executed by the control circuit 30 at predetermined intervals.

Similarly to the operation in FIG. 6, in this operation, the amount of $NO_x$ absorbed in the downstream $NO_x$ absorbing-reducing catalyst 7 is calculated and, when the calculated amount of $NO_x$ increases to a predetermined value, the rich spike operation is performed, to produce $NH_3$, by the upstream $NO_x$ absorbing-reducing catalysts 70a and 70b. However, since the upstream $NO_x$ absorbing-reducing catalysts 70a and 70b also absorb $NO_x$ in the exhaust gas during the normal operation, the amount of $NO_x$ in the exhaust gas flowing into the downstream $NO_x$ absorbing-reducing catalyst 7 is very small compared to that in the embodiment in FIG. 1. However, the upstream $NO_x$ absorbing-reducing catalysts 70a and 70b in this embodiment are relatively small in size, and the capacity for absorbing $NO_x$ thereof is relatively small. As is well known, when the amount of $NO_x$ absorbed in the $NO_x$ absorbing-reducing catalyst increases, the amount of $NO_x$ passing through the catalyst without being absorbed gradually increases as the amount of the absorbed $NO_x$ approaches to the saturating amount. Therefore, as the amount of the absorbed $NO_x$ in the $NO_x$ absorbing-reducing catalysts 70a and 70b increases and approaches to the saturating amount, the amount of $NO_x$ absorbed by the downstream $NO_x$ absorbing-reducing catalyst 7 gradually increases. In this embodiment, it is assumed that the amount of $NO_x$ absorbed in the downstream $NO_x$ absorbing-reducing catalyst 7 does not increase when the amount of absorbed $NO_x$ in the upstream $NO_x$ absorbing-reducing catalysts 70a and 70b is small, since it is thought that $NO_x$ in the exhaust gas does not pass through the upstream catalysts 70a and 70b when the amount of the $NO_x$ absorbed therein is small. Further, it is also assumed that a part of $NO_x$ starts to pass through the upstream $NO_x$ absorbing-reducing catalysts 70a and 70b when the amount of the absorbed $NO_x$ in the upstream catalysts 70a and 70b reaches a predetermined value and the amount of $NO_x$ absorbed in the downstream catalyst 7 also starts to increase. Therefore, in this embodiment, the time required for the $NO_x$ absorbed in the downstream $NO_x$ absorbing-reducing catalyst 7 to increase to the upper limit value is longer compared to that in the embodiment in FIG. 1. Therefore, by considering the amount of $NO_x$ absorbed by the upstream $NO_x$ absorbing-reducing catalysts 70a and 70b, the interval between the rich spike operation of the engine can be set longer in this embodiment.

The flowchart in FIG. 28 will be explained briefly. The flowchart in FIG. 28 is similar to the flowchart in FIG. 6 except that steps 2821 through 2825 are added to FIG. 6.

In this operation, the amount ANOX of $NO_x$ produced by the engine per unit time during the lean air-fuel ratio operation (step 2801) is calculated (step 2803) in the manner the same as step 603 in FIG. 6. At step 2805 the value of the counter F1NOX is increased by ANOX. The counter F1NOX represents the amount of $NO_x$ absorbed in the upstream $NO_x$ absorbing-reducing catalyst 70a and 70b. At step 2807 the operation determines whether the value of the counter F1NOX reaches a predetermined value $F1NOX_0$. $F1NOX_0$ is the amount of $NO_x$ absorbed in the upstream $NO_x$ absorbing-reducing catalysts 70a and 70b where $NO_x$ in the exhaust gas passes through the catalysts 70a and 70b due to increase in the amount of $NO_x$ absorbed therein. The value of $F1NOX_0$ is set at a value about the same as $FNOX_0$ in FIG. 6 (for example, about 70% of the saturating amount). If the amount F1NOX has not reached the value $F1NOX_0$ at step 2807, the operation immediately terminates. In this case, the value of the counter F2NOX which represents the amount of the $NO_x$ absorbed in the downstream $NO_x$ absorbing-reducing catalyst 7 is not increased.

If the value of F1NOX has reached $F1NOX_0$ at step 2807, since this means that a part of $NO_x$ flowing into the upstream $NO_x$ absorbing-reducing catalysts 70a and 70b passes through without being absorbed by the upstream catalysts 70a and 70b, the operation calculates the amount A2NOX of $NO_x$ passing through the upstream catalysts 70a and 70b per unit time at step 2811. The value of A2NOX becomes larger as the amount of $NO_x$ absorbed in the $NO_x$ absorbing-reducing catalysts 70a and 70b approaches to the saturating amount. Further, the value of A2NOX increases as the amount of $NO_x$ produced by the engine per unit time increases. In this embodiment, the amount A2NOX is previously measured under various conditions of the amount F1NOX of $NO_x$ absorbed in the $NO_x$ absorbing-reducing catalysts 70a, 70b, and the amount ANOX of $NO_x$ produced by the engine per unit time. The measured result is stored in the ROM of the control circuit 30 in the form of a numerical table using F1NOX and ANOX as parameters. The value of A2NOX is determined from the F1NOX and ANOX using this numerical table at step 2821. Since the amount A2NOX of $NO_x$ passes through the upstream $NO_x$ absorbing-reducing catalyst 70a and 70b and is absorbed by the downstream $NO_x$ absorbing-reducing catalyst 7, the amount of $NO_x$ held in the downstream $NO_x$ absorbing-reducing catalyst increases A2NOX per unit time. Therefore, the value of the counter F2NOX which represents the amount of $NO_x$ absorbed in the downstream $NO_x$ absorbing-reducing catalyst 7 is increased by ANOX at step 2823. In this operation when the value of F2NOX reaches a predetermined value $F2NOX_0$ at step 2825, the rich spike operation of the cylinders starts at steps 2809 and 2811.

Step 2809 (the resetting of the flag FL), step 2811 (the setting of the rich spike operation period CT) are the operation exactly the same as steps 609 and 611 in FIG. 6, respectively. Further, steps 2813 through 2819 are the operations same as steps 613 through 619. Therefore, the detailed explanation of these steps is omitted here.

Figure 29:
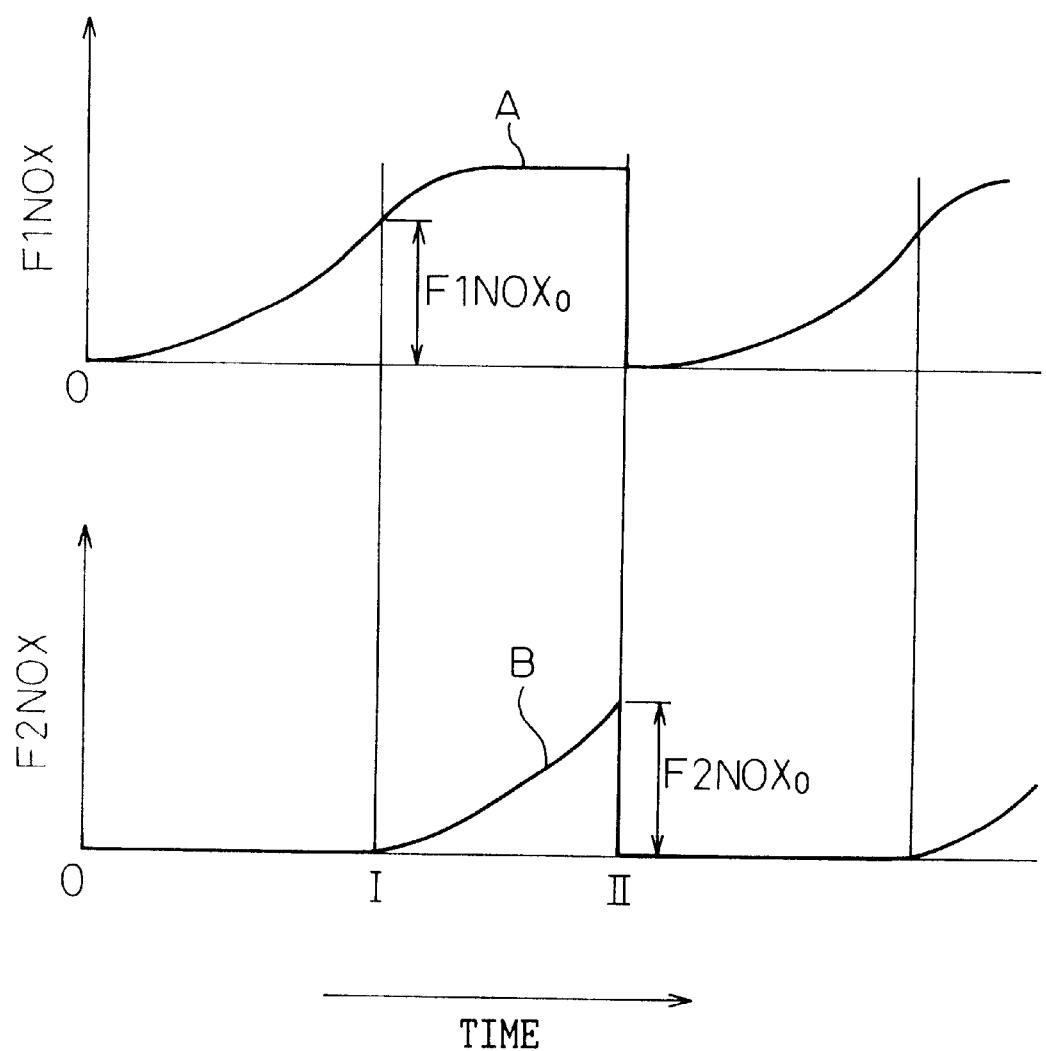
FIG. 29 is a diagram explaining the changes in the amounts of $NO_x$ absorbed in the $NO_x$ absorbing-reducing catalysts during the exhaust gas purifying operation in FIG. 28.

FIG. 29 is a diagram illustrating the change in the amounts of $NO_x$ absorbed in the upstream catalysts 70a, 70b and the downstream catalyst 7 during the exhaust gas purifying operation of the present embodiment. In FIG. 29, the curve A represents the amount F1NOX of $NO_x$ absorbed in the upstream $NO_x$ absorbing-reducing catalysts 70a and 70b, and the curve B represents the amount F2NOX of $NO_x$ absorbed in the downstream $NO_x$ absorbing-reducing catalyst 7. As can be seen from the curve A in FIG. 29, when the amount F1NOX increases and reaches the value $F1NOX_0$ (the time point I in FIG. 29), a part of $NO_x$ starts to pass through the upstream catalysts 70a and 70b. Therefore, the amount F2NOX of $NO_x$ absorbed in the downstream $NO_x$ absorbing-reducing catalyst 7 starts to increase (the time point I in FIG. 29). The amount of $NO_x$ passing through the upstream $NO_x$ absorbing-reducing catalysts 70a, 70b increases as the amount F1NOX increases, and after the amount F1NOX has reached the saturating amount of the catalysts 70a, 70b, all of the $NO_x$ produced by the engine passes through the upstream catalysts 70a, 70b and is absorbed by the downstream $NO_x$ absorbing-reducing catalyst 7. Therefore, the rate of the increase in the amount F2NOX of $NO_x$ absorbed in the downstream $NO_x$ absorbing-reducing catalyst becomes larger as time elapses. When the amount F2NOX of the $NO_x$ absorbed in the downstream $NO_x$ absorbing-reducing catalyst 7 reaches the amount of $F2NOX_0$, the rich spike operation is performed by the operation shown in FIG. 28 (the time point II in FIG. 29) and, thereby, all the $NO_x$ absorbed in the upstream catalysts 70a, 70b and the downstream catalyst 7 is released and reduced. Therefore, the amounts F1NOX and F2NOX become 0 after the rich spike operation has completed.

As explained above, according to the present embodiment, since the timing for performing the rich spike operation is determined taking the $NO_x$ absorbing capability of the upstream $NO_x$ absorbing-reducing catalyst 70a and 70b (i.e., the $NH_3$ conversion means), the interval between the rich spike operation can be set longer compared to the case where the three-way catalyst is used as the $NH_3$ conversion means.

We claim:

1. An exhaust gas purification device for an internal combustion engine capable of operating on lean air-fuel combustion, the engine being provided with a direct cylinder injection valve for injecting fuel directly into a cylinder thereof and an exhaust gas passage extending through which exhaust gas travels away from the cylinder, said device comprising:

exhaust gas air-fuel ratio adjusting means for adjusting an air-fuel ratio of exhaust gas produced by lean air-fuel ratio combustion in the cylinder from a lean air-fuel ratio to a rich air-fuel ratio by injecting additional fuel into the cylinder from the direct cylinder injection valve during one of an expansion stroke and an exhaust stroke of the cylinder;

$NH_3$ conversion means disposed in the exhaust gas passage downstream of the cylinder wherein, when additional fuel is injected to the cylinder by the exhaust gas air-fuel ratio adjusting means, the exhaust gas air-fuel ratio adjusting means provides rich air-fuel ratio exhaust gas to the $NH_3$ conversion means, the $NH_3$ conversion means producing $NH_3$ by converting at least a portion of $NO_x$ contained in the exhaust gas to $NH_3$; and purification means disposed in the exhaust gas passage downstream of the $NH_3$ conversion means for purifying both $NO_x$ and $NH_3$ included in the exhaust gas by reacting the $NO_x$ with the $NH_3$.

2. An exhaust gas purification device as set forth in claim 1, wherein the exhaust gas air-fuel ratio adjusting means controls an amount of $NH_3$ produced by the $NH_3$ conversion means by changing a length of a period of time during which the air-fuel ratio of the exhaust gas is adjusted to a rich air-fuel ratio.

3. An exhaust gas purification device as set forth in claim 1, wherein the engine includes a plurality of cylinders and wherein the exhaust gas air-fuel ratio adjusting means controls an amount of $NH_3$ produced by the $NH_3$ conversion means by changing a length of a number of cylinders to which additional fuel is directly injected during the one of the expansion and exhaust strokes.

4. An exhaust gas purification device as set forth in claim 1, wherein the exhaust gas air-fuel ratio adjusting means controls an amount of $NH_3$ produced by the $NH_3$ conversion means by changing the air-fuel ratio to which the air-fuel ratio of the exhaust gas after is adjusted.

5. An exhaust gas purification device as set forth in claim 1, wherein the exhaust gas air-fuel ratio adjusting means controls an amount of $NH_3$ produced by the $NH_3$ conversion means in accordance with an operating condition of the engine.

6. An exhaust gas purification device as set forth in claim 1, wherein the purification means comprises an $NH_3$ adsorbing-denitrating catalyst which adsorbs $NH_3$ in the exhaust gas and reduces $NO_x$ in the exhaust gas using one of the adsorbed $NH_3$ and the $NH_3$ in the exhaust gas.

7. An exhaust gas purification device as set forth in claim 1, wherein the purification means comprises an $NO_x$ absorbing-reducing catalyst which absorbs $NO_x$ in the exhaust gas when the exhaust gas is at a lean air-fuel ratio and releases and reduces absorbed $NO_x$ when the air-fuel ratio of the exhaust gas becomes a rich air-fuel ratio.

8. An exhaust gas purification device as set forth in claim 1, wherein the purification means comprises both of an $NH_3$ adsorbing-denitrating catalyst which adsorbs $NH_3$ in the exhaust gas and reduces $NO_x$ in the exhaust gas using one of the adsorbed $NH_3$ and the $NH_3$ in the exhaust gas and an $NO_x$ absorbing-reducing catalyst which absorbs $NO_x$ in the exhaust gas when the exhaust gas is at a lean air-fuel ratio and releases and reduces absorbed $NO_x$ when the air-fuel ratio of the exhaust gas becomes a rich air-fuel ratio.

9. An exhaust gas purification device as set forth in claim 8, wherein the $NO_x$ absorbing-reducing catalyst is disposed in the exhaust gas passage upstream of the $NH_3$ adsorbing-denitrating catalyst.

10. An exhaust gas purification device as set forth in claim 8, wherein the $NO_x$ absorbing-reducing catalyst is disposed in the exhaust gas passage downstream of the $NH_3$ adsorbing-denitrating catalyst.

11. An exhaust gas purification device as set forth in claim 2, wherein the purification means comprises an $NH_3$ adsorbing-denitrating catalyst which adsorbs $NH_3$ in the exhaust gas and reduces $NO_x$ in the exhaust gas using one of the adsorbed $NH_3$ and the $NH_3$ in the exhaust gas and wherein the exhaust gas air-fuel ratio adjusting means controls an amount of $NH_3$ produced by the $NH_3$ conversion means in accordance with an amount of $NO_x$ emitted from the engine.

12. An exhaust gas purification device as set forth in claim 5, wherein the purification means comprises an $NH_3$ adsorbing-denitrating catalyst which adsorbs $NH_3$ in the exhaust gas and reduces $NO_x$ in the exhaust gas using one of the adsorbed $NH_3$ and the $NH_3$ in the exhaust gas and wherein the exhaust gas air-fuel ratio adjusting means controls an amount of $NH_3$ produced by the $NH_3$ conversion means in accordance with an amount of $NO_x$ emitted from the engine.

13. An exhaust gas purification device as set forth in claim 2, wherein the purification means comprises an $NO_x$ absorbing-reducing catalyst which absorbs $NO_x$ in the exhaust gas when the exhaust gas is at a lean air-fuel ratio and releases and reduces absorbed $NO_x$ when the air-fuel ratio of the exhaust gas becomes a rich air-fuel ratio and wherein the exhaust gas air-fuel ratio adjusting means controls an amount of $NH_3$ produced by the $NH_3$ conversion means in accordance with an amount of $NO_x$ emitted from the engine.

14. An exhaust gas purification device as set forth in claim 5, wherein the purification means comprises an $NO_x$ absorbing-reducing catalyst which absorbs $NO_x$ in the exhaust gas when the exhaust gas is at a lean air-fuel ratio and releases and reduces absorbed $NO_x$ when the air-fuel ratio of the exhaust gas becomes a rich air-fuel ratio and wherein the exhaust gas air-fuel ratio adjusting means controls an amount of $NH_3$ produced by the $NH_3$ conversion means in accordance with an amount of $NO_x$ emitted from the engine.

15. An exhaust gas purification device as set forth in claim 1, wherein the purification means comprises an $NH_3$ adsorbing-denitrating catalyst which adsorbs $NH_3$ in the exhaust gas and reduces $NO_x$ in the exhaust gas using one of the adsorbed $NH_3$ and the $NH_3$ in the exhaust gas and wherein the exhaust gas air-fuel ratio adjusting means adjusts the exhaust gas air-fuel ratio to a rich air-fuel ratio when an amount of $NH_3$ adsorbed in the $NH_3$ adsorbing-denitrating catalyst becomes smaller than a predetermined value.

16. An exhaust gas purification device as set forth in claim 1, wherein the purification means comprises an $NO_x$ absorbing-reducing catalyst which absorbs $NO_x$ in the exhaust gas when the exhaust gas is at a lean air-fuel ratio and releases and reduces absorbed $NO_x$ when the air-fuel ratio of the exhaust gas becomes a rich air-fuel ratio and wherein the exhaust gas air-fuel ratio adjusting means adjusts the exhaust gas air-fuel ratio to a rich air-fuel ratio when an amount of $NO_x$ absorbed in the $NO_x$ absorbing-reducing catalyst becomes larger than a predetermined value.

17. An exhaust gas purification device as set forth in claim 1, wherein the $NH_3$ conversion means comprises a three-way reducing and oxidizing catalyst.

18. An exhaust gas purification device as set forth in claim 1, wherein the $NH_3$ conversion means comprises an $NO_x$ absorbing-reducing catalyst which absorbs $NO_x$ in the exhaust gas when the exhaust gas is at a lean air-fuel ratio and releases and reduces absorbed $NO_x$ when the air-fuel ratio of the exhaust gas becomes a rich air-fuel ratio.

* * * * *